(12) United States Patent
Chaganti et al.

(10) Patent No.: US 12,143,421 B2
(45) Date of Patent: Nov. 12, 2024

(54) OUTCOME-BASED COMPLIANCE AND SECURITY CONFIGURATIONS FOR INFORMATION TECHNOLOGY ENVIRONMENTS

(71) Applicant: Dell Products L.P., Round Rock, TX (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 405 days.

(21) Appl. No.: 17/680,915

(22) Filed: Feb. 25, 2022

(65) Prior Publication Data

US 2023/0275925 A1      Aug. 31, 2023

(51) Int. Cl.
*H04L 9/40*     (2022.01)
(52) U.S. Cl.
CPC .................................... *H04L 63/20* (2013.01)
(58) Field of Classification Search
CPC ............................ H04L 63/20; H04L 63/1433
See application file for complete search history.

(56) References Cited

U.S. PATENT DOCUMENTS

| | | | |
|---|---|---|---|
| 2016/0285732 A1* | 9/2016 | Brech | H04L 41/40 |
| 2020/0089892 A1* | 3/2020 | Ojha | H04L 63/1466 |
| 2020/0356354 A1* | 11/2020 | Mitra | G06F 16/903 |
| 2021/0409437 A1* | 12/2021 | Roach | H04L 63/1433 |

FOREIGN PATENT DOCUMENTS

WO    WO-2016090485 A1 *   6/2016    ............... G06F 9/46

* cited by examiner

*Primary Examiner* — Sm A Rahman
(74) *Attorney, Agent, or Firm* — Chamberlain, Hrdlicka, White, Williams & Aughtry; Aly Dossa

(57) ABSTRACT

A method and system for outcome-based compliance and security configurations for IT environments. Existing solutions directed to implementing multi-tier configurations on bare-metal IT infrastructure tend to require specialized tools and skills on a tier-by-tier basis. A more unified approach, where a single or singleton configuration that defines and implements the desired state (or outcome) of one or more tiers, is sought and thus proposed. Within this disclosure, implementation of security and regulatory compliance policies, is emphasized.

16 Claims, 30 Drawing Sheets

OUTCOME-BASED COMPLIANCE AND SECURITY CONFIGURATIONS FOR INFORMATION TECHNOLOGY ENVIRONMENTS

BACKGROUND

Existing solutions directed to implementing multi-tier configurations on bare-metal information technology (IT) infrastructure tend to require specialized tools and skills on a tier-by-tier basis. A more unified approach, where a single or singleton configuration that defines and implements the desired state (or outcome) of one or more tiers, is sought.

SUMMARY

In general, in one aspect, the invention relates to a method for implementing outcome-based compliance and security configurations. The method includes receiving an outcome statement including a set of desired outcomes; identifying an outcome type associated with the outcome statement, wherein the outcome type reflects a compliance and security type; producing, based on the outcome type, a desired compliance and security outcome definition; generating a singleton configuration derived from the desired compliance and security outcome definition; and implementing, onto a target infrastructure, the set of desired outcomes using the singleton configuration.

In general, in one aspect, the invention relates to a non-transitory computer readable medium (CRM). The non-transitory CRM includes computer readable program code, which when executed by a computer processor, enables the computer processor to perform a method for implementing outcome-based compliance and security configurations. The method includes receiving an outcome statement including a set of desired outcomes; identifying an outcome type associated with the outcome statement, wherein the outcome type reflects a compliance and security type; producing, based on the outcome type, a desired compliance and security outcome definition; generating a singleton configuration derived from the desired compliance and security outcome definition; and implementing, onto a target infrastructure, the set of desired outcomes using the singleton configuration.

In general, in one aspect, the invention relates to a system. The system includes a target infrastructure; and a singleton configuration service operatively connected to the target infrastructure, wherein the singleton configuration service includes a computer processor programmed to perform a method for implementing outcome-based compliance and security configurations. The method includes receiving an outcome statement including a set of desired outcomes; identifying an outcome type associated with the outcome statement, wherein the outcome type reflects a compliance and security type; producing, based on the outcome type, a desired compliance and security outcome definition; generating a singleton configuration derived from the desired compliance and security outcome definition; and implementing, onto the target infrastructure, the set of desired outcomes using the singleton configuration.

Other aspects of the invention will be apparent from the following description and the appended claims.

BRIEF DESCRIPTION OF DRAWINGS

FIGS. 8C-8F show a flowchart describing a method for applying a desired compliance and security outcome onto a target infrastructure using a singleton configuration in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-10, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to outcome-based compliance and security configurations for IT environments. Existing solutions directed to implementing multi-tier configurations on bare-metal IT infrastructure tend to require specialized tools and skills on a tier-by-tier basis. A more unified approach, where a single or singleton configuration that defines and implements the desired state (or outcome) of one or more tiers, is sought and thus proposed. Within this disclosure, implementation of security and regulatory compliance policies, is emphasized.

Figure 1:
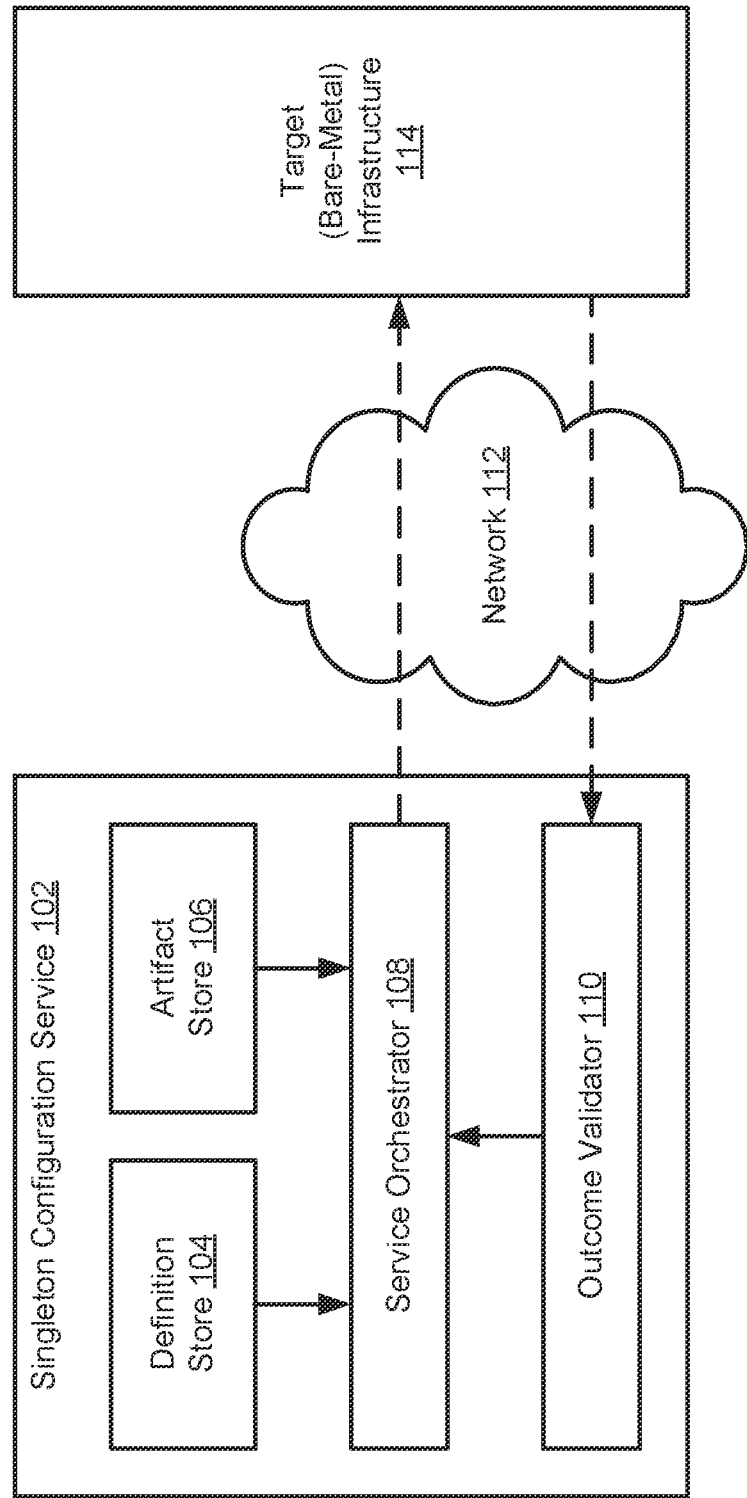
FIG. 1 shows a system in accordance with one or more embodiments of the invention.

FIG. 1 shows a system in accordance with one or more embodiments of the invention. The system (100) may include a singleton configuration service (102) operatively connected to a target infrastructure (114) through a network (112). Each of these system (100) components is described below.

In one embodiment of the invention, the singleton configuration service (102) may represent any enterprise IT service designed to facilitate implementation of desired multi-tier outcomes on or directed to bare-metal IT infrastructure using a singleton configuration (described below) (see e.g., FIG. 4). A bare-metal IT infrastructure (e.g., the target infrastructure (114)) may refer to any granularity of IT infrastructure (e.g., one or more data centers, one or more network servers, etc.) yet to be configured for a given purpose; and often, yet to be configured with an operating system (OS), software application(s), service(s), policies, and/or other operational and managerial features thereon. To that end, the singleton configuration service (102) may include functionality to perform the methods shown and described in further detail with respect to FIGS. 5A-9B, below. One of ordinary skill, however, will appreciate that the singleton configuration service (102) may perform other functionalities without departing from the scope of the invention.

In one embodiment of the invention, the singleton configuration service (102) may be implemented through on-premises infrastructure, cloud computing infrastructure, or any hybrid infrastructure thereof. The singleton configuration service (102), accordingly, may be implemented using one or more network servers (not shown), where each network server may represent a physical or a virtual network server. Additionally, or alternatively, the singleton configuration service (102) may be implemented using one or more computing systems similar to the exemplary computing system shown and described with respect to FIG. 10, below. Moreover, the singleton configuration service (102) may include, but is not limited to, a definition store (104), an artifact store (106), a service orchestrator (108), and an outcome validator (110). Each of these singleton configuration service (102) subcomponents is described below.

In one embodiment of the invention, the definition store (104) may refer to physical storage (or logical storage occupying at least a portion of the physical storage) on the singleton configuration service (102), where any number of outcome definitions may be consolidated. An outcome definition may refer to a schema or data structure through which a desired outcome (or state) to-be-implemented on or to-be-directed to the target infrastructure (114) may be defined. A variety of outcome definitions are shown and described in further detail with respect to FIGS. 3A-3D, below. Further, the definition store (104) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the artifact store (106) may refer to physical storage (or logical storage occupying at least a portion of the physical storage) on the singleton configuration service (102), where any number of artifacts may be consolidated. An artifact may refer to an element or item needed to effect one or more given tasks pertinent to the implementation of a desired multi-tier outcome on or directed to the target infrastructure (114)— examples of which may include, but are not limited to, computer readable instructions (i.e., computer program code) and a software tool (i.e., a computer program). Further, the artifact store (106) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the service orchestrator (108) may refer to a computer program that may execute on the underlying hardware of the singleton configuration service (102), which may be responsible for orchestrating the implementation of desired multi-tier outcomes on or directed to the target infrastructure (114) using singleton configurations. To that end, the service orchestrator (108) may include functionality to: receive outcome statement(s) from service user(s) (described below); identify desired outcome type(s) from the received outcome statement(s); select default outcome definition(s) linked to the identified desired outcome type(s) and from the definition store (104); configure and/or prompt the service user(s) to configure and/or tune a set of profiles relevant to the selected default outcome definition(s); update the selected default outcome definition(s) using the configured and/or tuned set of profiles to produce desired outcome definition(s); generate singleton configuration(s) based on the produced desired outcome definition(s); and apply the desired outcome(s) onto or directed to the target infrastructure (114) using the generated singleton configuration(s). Further, any subset of the aforementioned functionalities may rely on input(s) and/or validation result(s) (described below) provided by the outcome validator (110). One of ordinary skill, however, will appreciate that the service orchestrator (108) may perform other functionalities without departing from the scope of the invention.

In one embodiment of the invention, the outcome validator (110) may refer to a computer program that may execute on the underlying hardware of the singleton configuration service (102), which may be responsible for validating the implementation of any outcome, or stages (also referred to herein as profiles) thereof, onto the target infrastructure (114). To that end, the outcome validator (110) may include functionality to: verify whether any higher ranking outcome (see e.g., FIG. 2) can be supported by their respective underlying (or lower ranking) outcome(s) (if any), or in the case of an infrastructure outcome (i.e., the lowest ranking outcome), verify whether the infrastructure outcome can be supported by an infrastructure inventory for the target infrastructure (114); verify whether any outcome profile(s) for any outcome, and sequentially given an appropriate implementation order, had been implemented onto the target infrastructure (114) without issues; and perform outcome post-checks for any outcome following the issue-free implementation of the respective outcome profile(s), sequentially given the appropriate implementation order, onto the target infrastructure (114). Further, results obtained from any subset of the aforementioned functionalities may be provided to the service orchestrator (108) to assist in the fulfillment of its functionalities (described above). One of ordinary skill, however, will appreciate that the outcome validator (110) may perform other functionalities without departing from the scope of the invention.

In one embodiment of the invention, the target infrastructure (114) may represent any bare-metal enterprise IT environment typically belonging to a single enterprise IT customer or tenant. An enterprise IT customer or tenant, in turn, may refer to any organization or entity whom may procure and employ any number of enterprise IT products and/or services such as, for example, the implementation of desired multi-tier outcome(s) using singleton configuration(s) provided by the singleton configuration service (102). Further, the target infrastructure (114) may be implemented using one or more physical network servers (not shown). Additionally, or alternatively, the target infrastructure (114) may be implemented using one or more computing systems similar to the exemplary computing system shown and described in further detail with respect to FIG. 10, below.

In one embodiment of the invention, the above-mentioned system (100) components may communicate with one another through the network (112) (e.g., a local area network (LAN), a wide area network (WAN) such as the Internet, a mobile network, any other communication network type, or a combination thereof). The network (112) may be implemented using any combination of wired and/or wireless connections. Further, the network (112) may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components and/or subcomponents, other system (100) configurations may be used without departing from the scope of the invention. For example, in one embodiment of the invention, the system (100) may further include at least one other target infrastructure (also referred to as one or more alternative target infrastructures), which may also operatively connect to the singleton configuration service (102) through the network (112). By way of another example, in one embodiment of the invention, the system (100) may further include an admin device, which may operatively connect to at least the singleton configuration service (102) via the network (112).

In the latter above-mentioned embodiment, the admin device (not shown) may represent any physical appliance or computing system operated by one or more administrators (also referred herein as service users) of the target infrastructure (114). An administrator (or service user) may refer to an individual or entity whom may be responsible for overseeing target infrastructure (114) operations and maintenance. Further, the admin device (not shown) may be implemented using, for example, a desktop computer, a laptop computer, a tablet computer, a smartphone, or any other computing system similar to the exemplary computing system shown and described in further detail with respect to FIG. 10, below.

Figure 2:
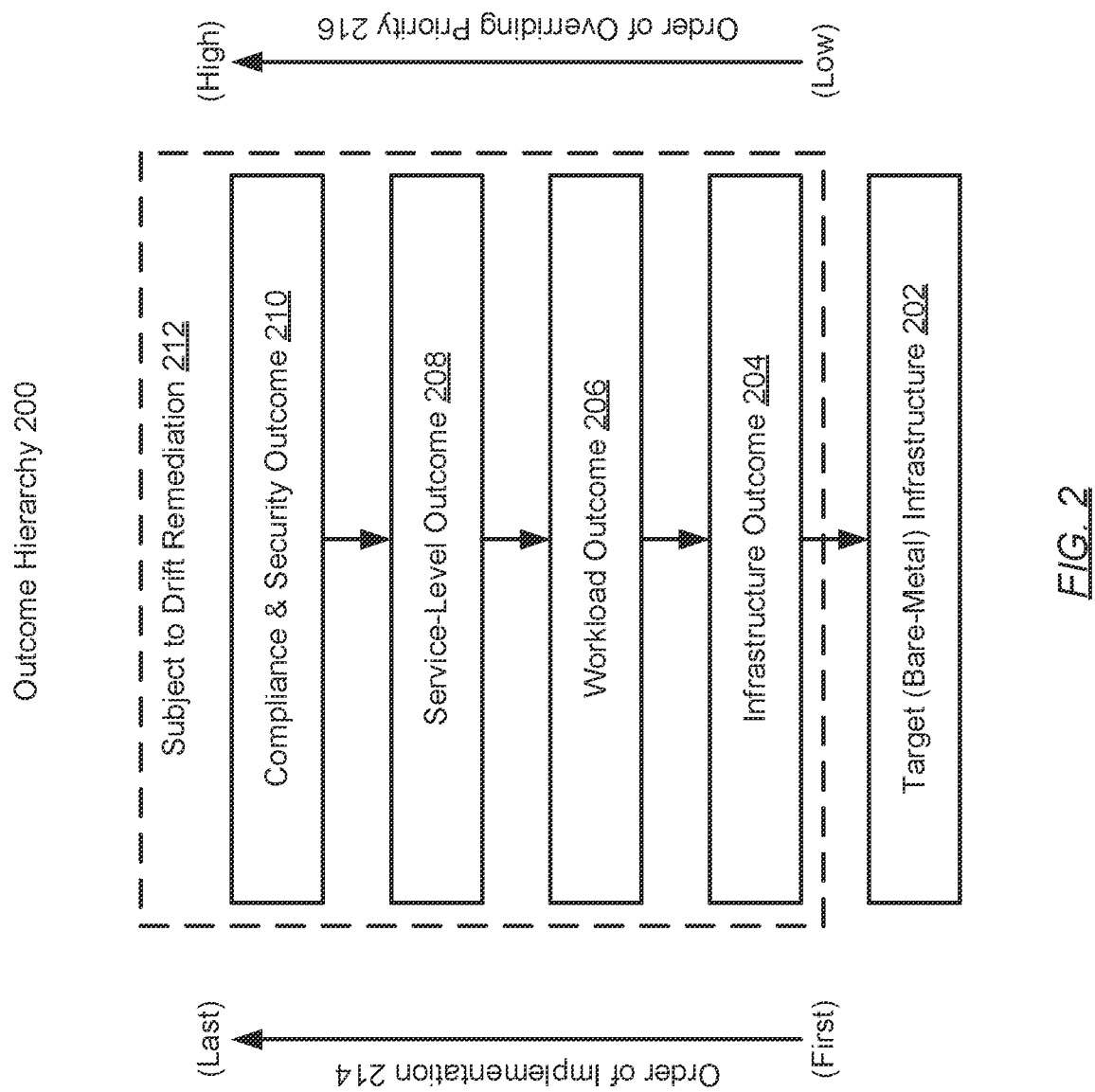
FIG. 2 shows an outcome hierarchy in accordance with one or more embodiments of the invention.

FIG. 2 shows an outcome hierarchy in accordance with one or more embodiments of the invention. The outcome hierarchy (200) may represent an arrangement of outcomes ranked from bottom to top according to an order of over-riding priority (216) (described below). An outcome may refer to a state that may be implemented onto a target (bare-metal) infrastructure (202). In turn, as defined above (see e.g., FIG. 1), a bare-metal IT infrastructure (e.g., a target infrastructure (202)) may refer to any granularity of IT infrastructure (e.g., one or more data centers, one or more network servers, etc.) yet to be configured for a given purpose; and often, yet to be configured with an operating system (OS), software application(s), service(s), policies, and/or other operational and managerial features thereon.

In one embodiment of the invention, the sequence of outcomes that may be implemented over the target infrastructure (202) may include an infrastructure outcome (204), a workload outcome (206), a service-level outcome (208), and a compliance and security outcome (210). Each of these outcome types is described below.

In one embodiment of the invention, an infrastructure outcome (204) may represent an outcome type that may be implemented directly over any bare-metal IT infrastructure, such as the target infrastructure (202). Accordingly, in an order of implementation (214), or a proper sequence through which the outcome(s) must be applied, an infrastructure outcome (204) may be implemented first. Further, an infrastructure outcome (204) may represent state that may result from at least the following configurations: one or more preliminary hardware configurations, including the installation of appropriate firmware and/or drivers; one or more network cluster configurations, including network server interconnection and data sharing settings; and one or more operating system (OS) configurations.

In one embodiment of the invention, a workload outcome (206) may represent an outcome type that may be implemented directly over, and thus relies on the existing implementation of, an infrastructure outcome (204). Accordingly, in an order of implementation (214), a workload outcome (206) may be implemented second. Further, a workload outcome (206) may represent state that may result from at least the following configurations: one or more application deployment configurations, including the installation of appropriate software programs and utilities; and one or more workload optimization configurations, including overrides to the underlying infrastructure outcome (204) for optimal workload outcome (206) operation and performance.

In one embodiment of the invention, a service-level outcome (208) may represent an outcome type that may be implemented directly over, and thus relies on the existing implementation of, a workload outcome (206). Accordingly, in an order of implementation (214), a service-level outcome (208) may be implemented third. Further, a service-level outcome (208) may represent state that may result from at least the following configurations: one or more service-level agreement (SLA) configurations, including service tier and/or performance requirements; and one or more service-level provisioning configurations, including overrides to the underlying workload and/or infrastructure outcome(s) (206, 204) for optimal provisioning of the service-level outcome (208).

In one embodiment of the invention, a compliance and security outcome (210) may represent an outcome type that may be implemented directly over, and thus relies on the existing implementation of, a service-level outcome (208). Accordingly, in an order of implementation (214), a compliance and security outcome (210) may be implemented fourth or last. Further, a compliance and security outcome (210) may represent state that may result from at least the following configurations: one or more security configurations, including the deployment of network security and data encryption practices; one or more regulatory compliance configurations, including data placement and privacy policies; and one or more compliance and security provisioning configurations, including overrides to the underlying service-level, workload, and infrastructure outcome(s) (208, 206, 204) for optimal provisioning of the compliance and security outcome (210).

In one embodiment of the invention, following implementation of any proper sequence (i.e., based on the order of implementation (214)) of one or more outcomes (204, 206, 208, 210) onto the target infrastructure (202), the implemented outcome(s) may be subjected to drift remediation (212). Drift remediation (212) may refer to the dynamic correction of one or more outcome drifts. where an outcome drift may refer to a change from a desired state on the target infrastructure (202) that had been implemented thereon by one or more outcomes. Examples of drift remediation may range from the rudimentary correction of one or more configuration parameters pertinent to the outcome(s) implemented on the target infrastructure (202), to the migration of the outcome(s) from the target infrastructure (202) to an alternative target infrastructure (not shown) (if available).

In one embodiment of the invention, as briefly mentioned above, each outcome (204, 206, 208, 210), from bottom to top, may be ranked according to an order of overriding priority (216). The overriding priority, with which any given outcome (204, 206, 208, 210) may be associated, may reference a tier or level of dominance or authority the given outcome (204, 206, 208, 210) holds in relation to other outcome(s) (204, 206, 208, 210). To that end, an infrastructure outcome (204) may be associated with the lowest overriding priority (216) as it cannot override any of the other outcomes (206, 208, 210). Further, a workload outcome (206) may be associated with the second lowest or third highest overriding priority (216) as it can only override existing state (e.g., configuration parameter(s) and/or task(s)) implemented on the target infrastructure (202) by the infrastructure outcome (204). Meanwhile, a service-level outcome (208) may be associated with the third lowest or second highest overriding priority (216) as it can override existing state implemented on the target infrastructure (202) by the workload and infrastructure outcomes (206, 204). Moreover, a compliance and security outcome (210) may be associated with the highest overriding priority (216) as it can override existing state implemented on the target infrastructure (202) by all of the other outcomes (208, 206, 204).

While FIG. 2 shows a configuration of components and/or subcomponents, other outcome hierarchy (200) configurations may be used without departing from the scope of the invention.

Figure 3A:
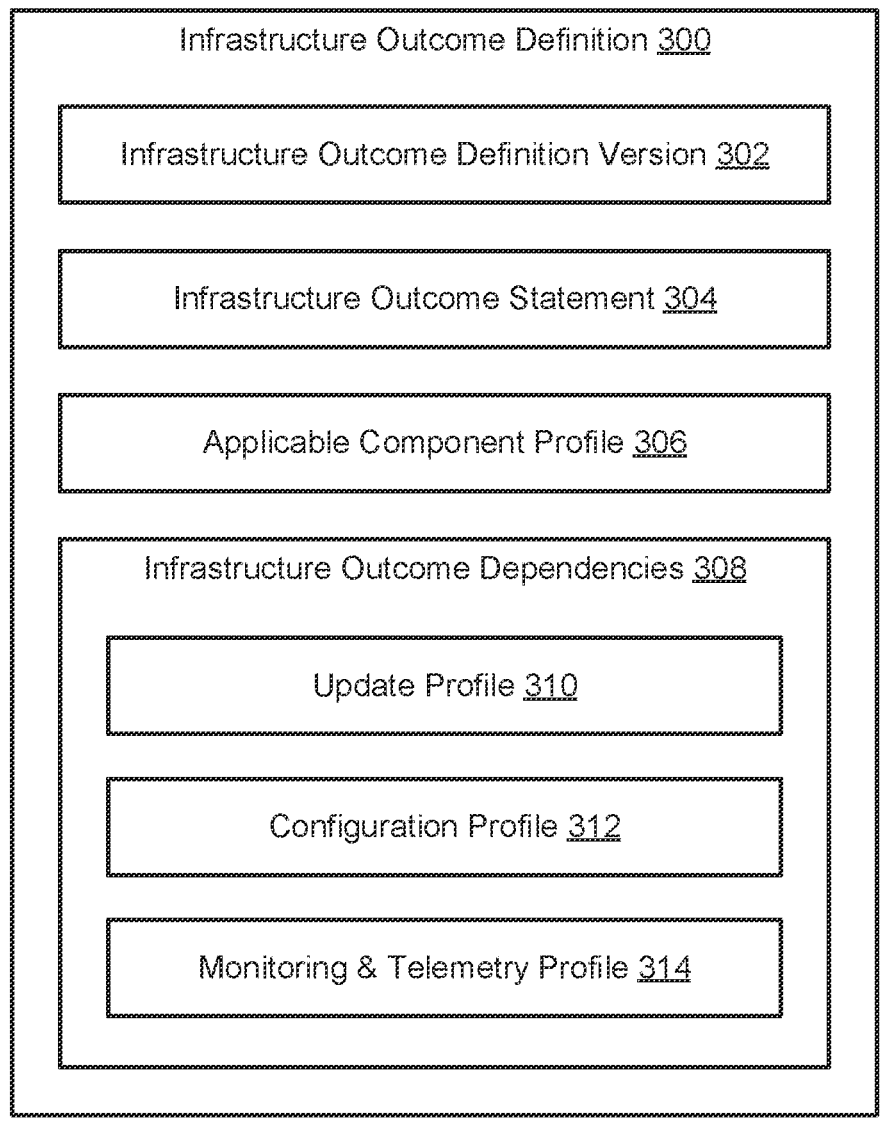
FIG. 3A shows an infrastructure outcome definition in accordance with one or more embodiments of the invention.

FIG. 3A shows an infrastructure outcome definition in accordance with one or more embodiments of the invention. The infrastructure outcome definition (300) may generally refer to a schema or data structure through which an outcome of the infrastructure type (see e.g., FIG. 2) may be defined. To that end, the infrastructure outcome definition (300) may include an infrastructure outcome definition version (302), an infrastructure outcome statement (304), an applicable component profile (306), and a set of infrastructure outcome dependencies (308). Each of these infrastructure outcome definition (300) components is described below.

In one embodiment of the invention, the infrastructure outcome definition version (302) may refer to a character string assigned to, and that uniquely identifies, the infrastructure outcome definition (300). The character string may reflect any arbitrary number of characters, which may include any subset or all of the following character categories: letters, numbers, and symbols.

In one embodiment of the invention, the infrastructure outcome statement (304) may refer to a sentence that may express or identify a given infrastructure outcome defined by the infrastructure outcome definition (300). By way of an example, the sentence "deploy a hyper-converged infrastructure (HCI) cluster" may be representative of an infrastructure outcome statement (302), where transforming a target (bare-metal) infrastructure into a HCI cluster expresses the given infrastructure outcome.

In one embodiment of the invention, the applicable component profile (306) may refer to a description of components, features, and/or capabilities that a target infrastructure may be required to have or support in order to, at least in part, implement the given infrastructure outcome associated with the infrastructure outcome definition (300). Examples of the component(s), feature(s), and/or capability(ies) that may be specified in the applicable component profile (306) may include, but is/are not limited to, a network server model or version associated with one or more network servers forming the target infrastructure; a hardware model or version associated with one or more physical (hardware) resources (e.g., computer processors, data storage, networking, etc.) available throughout the target infrastructure; and a technology class of one or more technologies deployed across the target infrastructure.

In one embodiment of the invention, the set of infrastructure outcome dependencies (308) may refer to at least one other profile relied on to, at least in part, implement the given infrastructure outcome associated with the infrastructure outcome definition (300). To that end, the set of infrastructure outcome dependencies (308) may include an update profile (310), a configuration profile (312), and a monitoring and telemetry profile (314). Each of these infrastructure outcome dependencies (308) is described below.

In one embodiment of the invention, the update profile (310) may refer to a description of updates, via an update catalog, that a target infrastructure may need to, at least in part, implement the given infrastructure outcome associated with the infrastructure outcome definition (300). Examples of the update(s) that may be specified in the update profile (310) may include, but is/are not limited to, operating system updates, software application updates, and network fabric updates. Further, based on an order of implementation for the set of infrastructure outcome dependencies (308), the update profile (310) may be implemented first.

In one embodiment of the invention, the configuration profile (312) may refer to a description of preliminary configurations that a target infrastructure may need to, at least in part, implement the given infrastructure outcome associated with the infrastructure outcome definition (300). Examples of the preliminary configuration(s) specified in the configuration profile (312) may include, but is/are not limited to, those pertaining to: a basic input-output system (BIOS), a baseboard management controller (BMC), a network interface card (NIC), an operating system, a network cluster, and network security. Further, based on an order of implementation for the set of infrastructure outcome dependencies (308), the configuration profile (312) may be implemented second, or following the completed implementation of the update profile (310).

In one embodiment of the invention, the monitoring and telemetry profile (314) may refer to a description of mandatory and opt-in monitoring and telemetry resources that a target infrastructure may need to, at least in part, implement the given infrastructure outcome associated with the infrastructure outcome definition (300). Examples of the mandatory and opt-in monitoring and telemetry resources specified in the monitoring and telemetry profile (314) may include, but is/are not limited to, event logs, notifications and alerts, and metrics. Further, based on an order of implementation for the set of infrastructure outcome dependencies (308), the monitoring and telemetry profile (314) may be implemented last, or following the completed implementation of the configuration profile (312).

While FIG. 3A shows a configuration of components and/or subcomponents, other infrastructure outcome definition (300) configurations may be used without departing from the scope of the invention.

Figure 3B:
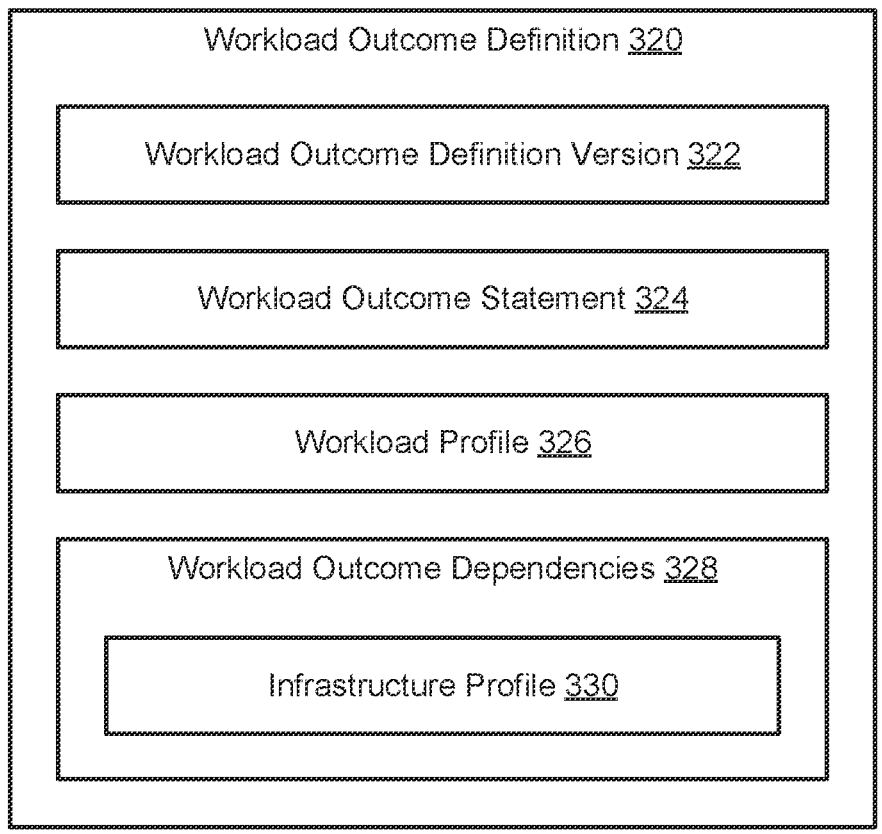
FIG. 3B shows a workload outcome definition in accordance with one or more embodiments of the invention.

FIG. 3B shows a workload outcome definition in accordance with one or more embodiments of the invention. The workload outcome definition (320) may generally refer to a schema or data structure through which an outcome of the workload type (see e.g., FIG. 2) may be defined. To that end, the workload outcome definition (320) may include a workload outcome definition version (322), a workload outcome statement (324), a workload profile (326), and a set of workload outcome dependencies (328). Each of these workload outcome definition (320) components is described below.

In one embodiment of the invention, the workload outcome definition version (322) may refer to a character string assigned to, and that uniquely identifies, the workload outcome definition (320). The character string may reflect any arbitrary number of characters, which may include any subset or all of the following character categories: letters, numbers, and symbols.

In one embodiment of the invention, the workload outcome statement (324) may refer to a sentence that may express or identify a given workload outcome and a given infrastructure outcome defined by the workload outcome definition (320). By way of an example, the sentence "deploy a database-as-a-service instance on a hyper-converged infrastructure (HCI) cluster" may be representative of a workload outcome statement (324), where: transforming a target (bare-metal) infrastructure into a HCI cluster expresses the given infrastructure outcome; and running a database-as-a-service instance on the implemented HCI cluster expresses the given workload outcome.

In one embodiment of the invention, the workload profile (326) may refer to a description of the workload(s) (intended to run on the target infrastructure) and any relevant constraints needed to, at least in part, implement the given workload outcome associated with the workload outcome definition (320). Examples of the workload(s) and the relevant constraints specified in the workload profile (326) may include, but is/are not limited to, a reference (e.g., name and/or version) to one or more sought workloads (e.g., -as-a-service service(s), software application(s), etc.); a network server type (e.g., hybrid) associated with the network server(s) on which the sought workload(s) may run; a network cluster type (e.g., HCI) associated with the network cluster(s) on which the sought workload(s) may run; and a set of minimum or preferred requirements (e.g., network server count, platform type, etc.) necessary to run the sought workload(s) on the target infrastructure.

In one embodiment of the invention, the set of workload outcome dependencies (328) may refer to at least one other profile relied on to, at least in part, implement the given workload outcome associated with the workload outcome definition (320). To that end, the set of workload outcome dependencies (328) may include an infrastructure profile (330), which is described below.

In one embodiment of the invention, the infrastructure profile (330) may refer to a description of an infrastructure outcome baseline needed to, at least in part, implement the given infrastructure outcome; and of a set of infrastructure-relevant overrides (if any) needed to, at least in part, implement the given workload outcome, associated with the workload outcome definition (320). The infrastructure outcome baseline specified in the infrastructure profile (330) may include a reference (e.g., an infrastructure outcome definition version) to an existing infrastructure outcome definition (described above) (see e.g., FIG. 3A). Further, the set of infrastructure-relevant overrides (if any) specified in the infrastructure profile (330) may include workload-optimal changes to the infrastructure outcome dependencies (i.e., update profile, configuration profile, and/or monitoring and telemetry profile) of the infrastructure outcome baseline.

While FIG. 3B shows a configuration of components and/or subcomponents, other workload outcome definition (320) configurations may be used without departing from the scope of the invention.

Figure 3C:
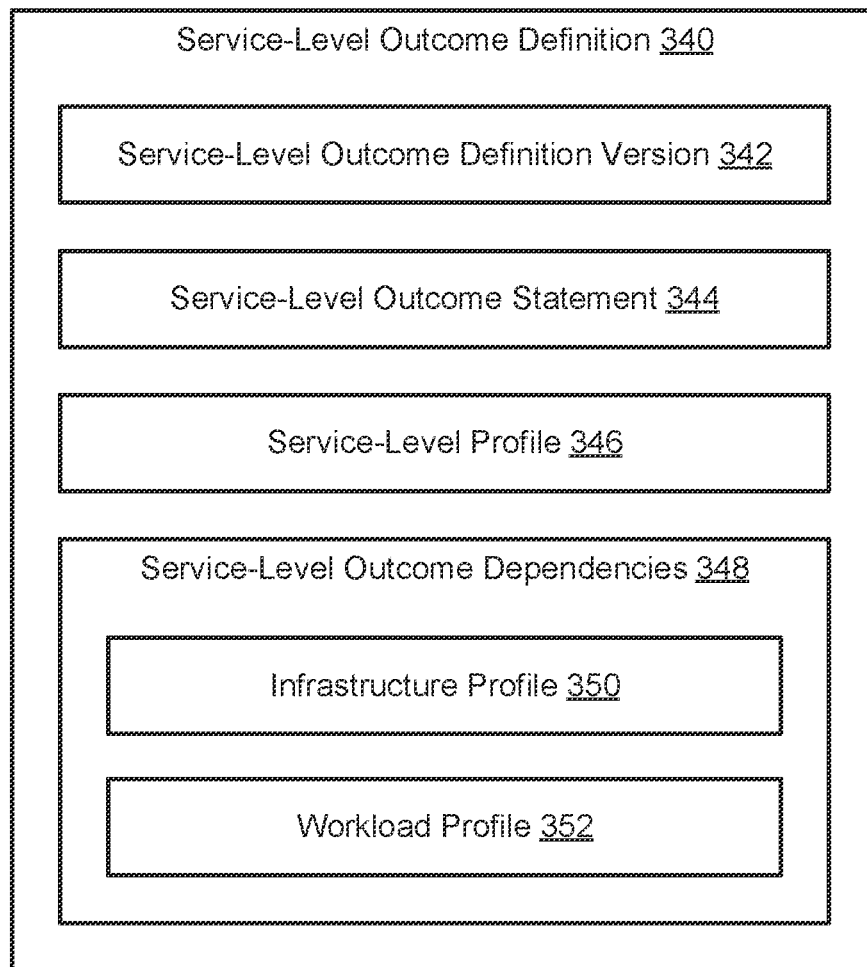
FIG. 3C shows a service-level outcome definition in accordance with one or more embodiments of the invention.

FIG. 3C shows a service-level outcome definition in accordance with one or more embodiments of the invention. The service-level outcome definition (340) may generally refer to a schema or data structure through which an outcome of the service-level type (see e.g., FIG. 2) may be defined. To that end, the service-level outcome definition (340) may include a service-level outcome definition version (342), a service-level outcome statement (344), a service-level profile (346), and a set of service-level outcome dependencies (348). Each of these service-level outcome definition (340) components is described below.

In one embodiment of the invention, the service-level outcome definition version (342) may refer to a character string assigned to, and that uniquely identifies, the service-level outcome definition (340). The character string may reflect any arbitrary number of characters, which may include any subset or all of the following character categories: letters, numbers, and symbols.

In one embodiment of the invention, the service-level outcome statement (344) may refer to a sentence that may express or identify a given service-level outcome, a given workload outcome, and a given infrastructure outcome defined by the service-level outcome definition (340). By way of an example, the sentence "deploy a database-as-a-service instance optimized to run 100K transactions per second with a 1 nanosecond (ns) response time on a hyper-converged infrastructure (HCI) cluster" may be representative of a service-level outcome statement, where: transforming a target (bare-metal) infrastructure into a HCI cluster expresses the given infrastructure outcome; running a database-as-a-service instance on the implemented HCI cluster expresses the given workload outcome; and optimizing the implemented database-as-a-service instance to handle the specified number of transactions and have the required response time expresses the given service-level outcome.

In one embodiment of the invention, the service-level profile (346) may refer to a description of service-level agreement (SLA) or performance requirements needed to, at least in part, implement the given service-level outcome associated with the service-level outcome definition (340). Examples of the SLA/performance requirements specified in the service-level profile (346) may include, but is/are not limited to, a service tier (e.g., performance-optimized) identifying a class of service and capabilities thereof sought to maintain the workload(s) running on the target infrastructure; a resiliency configuration (e.g., always-available) sought to be associated with the workload(s) running on the target infrastructure; and other performance pertinent characteristics (e.g., usage threshold, instance scaling, etc.) sought to be applied to the workload(s) running on the target infrastructure.

In one embodiment of the invention, the set of service-level outcome dependencies (348) may refer to at least one other profile relied on to, at least in part, implement the given service-level outcome associated with the service-level outcome definition (340). To that end, the set of service-level outcome dependencies (348) may include an infrastructure profile (350) and a workload profile (352). Each of these service-level outcome dependencies (348) is described below.

In one embodiment of the invention, the infrastructure profile (350) may refer to a description of an infrastructure outcome baseline needed to, at least in part, implement the given infrastructure outcome; and of a set of infrastructure-relevant overrides (if any) needed to, at least in part, implement the given workload outcome, associated with the service-level outcome definition (340). The infrastructure outcome baseline specified in the infrastructure profile (350) may include a reference (e.g., an infrastructure outcome definition version) to an existing infrastructure outcome definition (described above) (see e.g., FIG. 3A). Further, the set of infrastructure-relevant overrides (if any) specified in the infrastructure profile (350) may include workload-optimal changes to the infrastructure outcome dependencies (i.e., update profile, configuration profile, and/or monitoring and telemetry profile) of the infrastructure outcome baseline.

In one embodiment of the invention, the workload profile (352) may refer to a description of a workload outcome baseline needed to, at least in part, implement the given workload outcome; and of a set of workload-relevant overrides (if any) needed to, at least in part, implement the given service-level outcome, associated with the service-level outcome definition (340). The workload outcome baseline specified in the workload profile (352) may include a reference (e.g., a workload outcome definition version) to an existing workload outcome definition (described above) (see e.g., FIG. 3B). Further, the set of workload-relevant overrides (if any) specified in the workload profile (352) may include service-level-optimal changes to the workload outcome dependencies (i.e., infrastructure profile) of the workload outcome baseline.

While FIG. 3C shows a configuration of components and/or subcomponents, other service-level outcome definition (340) configurations may be used without departing from the scope of the invention.

Figure 3D:
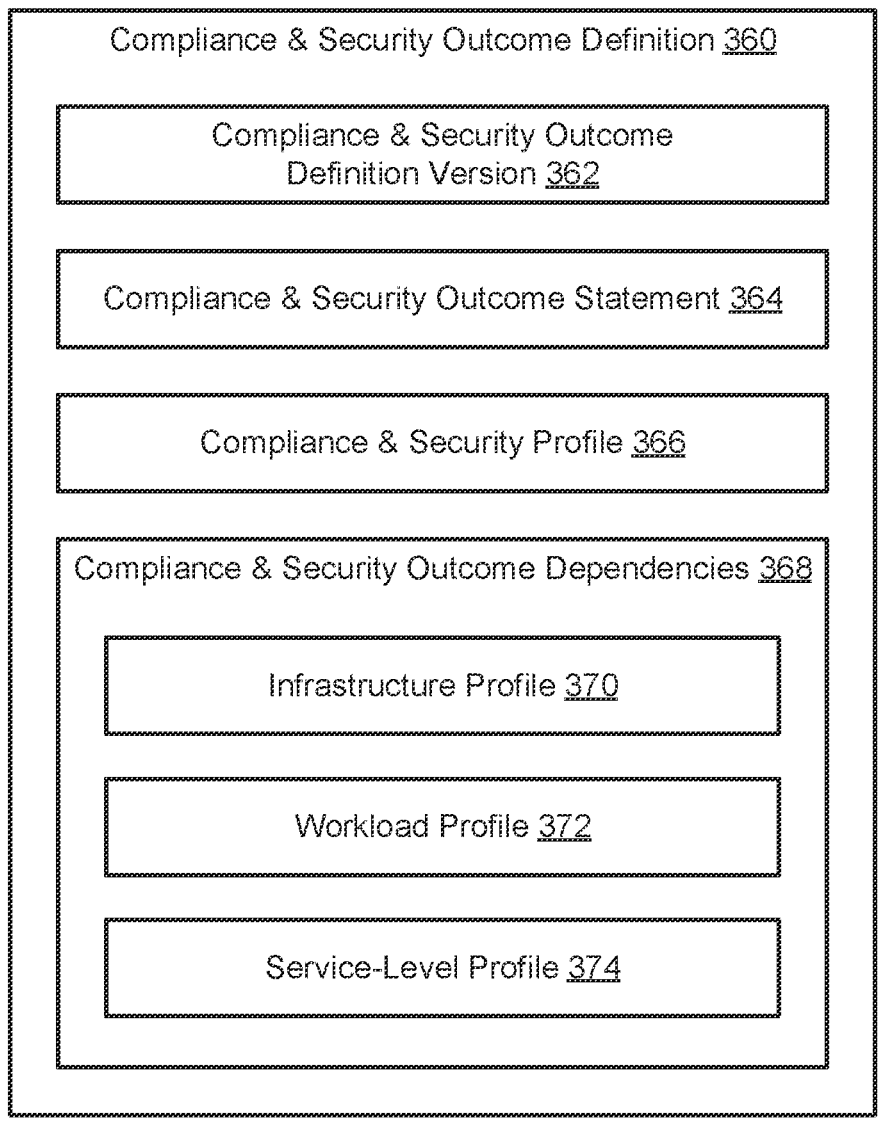
FIG. 3D shows a compliance and security outcome definition in accordance with one or more embodiments of the invention.

FIG. 3D shows a compliance and security outcome definition in accordance with one or more embodiments of the invention. The compliance and security outcome definition (360) may generally refer to a schema or data structure through which an outcome of the compliance and security type (see e.g., FIG. 2) may be defined. To that end, the compliance and security outcome definition (360) may include a compliance and security outcome definition version (362), a compliance and security outcome statement (364), a compliance and security profile (366), and a set of compliance and security outcome dependencies (368). Each of these compliance and security outcome definition (360) components is described below.

In one embodiment of the invention, the compliance and security outcome definition version (362) may refer to a character string assigned to, and that uniquely identifies, the compliance and security outcome definition (360). The character string may reflect any arbitrary number of characters, which may include any subset or all of the following character categories: letters, numbers, and symbols.

In one embodiment of the invention, the compliance and security outcome statement (364) may refer to a sentence that may express or identify a given compliance and security outcome, a given service-level outcome, a given workload outcome, and a given infrastructure outcome defined by the compliance and security outcome definition (360). By way of an example, the sentence "deploy a database-as-a-service instance optimized to run 100K transactions per second with a 1 nanosecond (ns) response time on a hyper-converged infrastructure (HCI) cluster with five-nines data availability and data to be encrypted using Secure Hash Algorithm (SHA)-256 and to be placed in accordance with General Data Protection Regulation (GDPR) policies" may be representative of a compliance and security outcome statement, where: transforming a target (bare-metal) infrastructure into a HCI cluster expresses the given infrastructure outcome; running a database-as-a-service instance on the implemented HCI cluster expresses the given workload outcome; optimizing the implemented database-as-a-service instance to handle the specified number of transactions and have the required response time expresses the given service-level outcome; and constraining the overall implemented system to the specified data availability and data encryption standards, as well as to the required regulatory policies, expresses the given compliance and security outcome.

In one embodiment of the invention, the compliance and security profile (366) may refer to a description of security and/or regulatory constraints needed to, at least in part, implement the given compliance and security outcome associated with the compliance and security outcome definition (360). Examples of the security and/or regulatory constraint(s) specified in the compliance and security profile (366) may include, but is/are not limited to, one or more data encryption policies indicating the sought enablement or disablement of data encryption to be imposed on data throughout the target infrastructure, and the sought data encryption algorithm (if encryption is enabled); one or more data accessibility policies indicating the sought data accessibility scheme (e.g., authorization token, etc.) to be imposed on data throughout the target infrastructure; and one or more data placement policies indicating the sought enablement or disablement of the compliance to regulatory privacy laws to be imposed on data throughout the target infrastructure, and the sought regulatory privacy laws (e.g., the European Union's GDPR, etc.) (if compliance is enabled).

In one embodiment of the invention, the set of compliance and security outcome dependencies (368) may refer to at least one other profile relied on to, at least in part, implement the given compliance and security outcome associated with the compliance and security outcome definition (360). To that end, the set of compliance and security outcome dependencies (348) may include an infrastructure profile (370), a workload profile (372), and a service-level profile (374). Each of these compliance and security outcome dependencies (368) is described below.

In one embodiment of the invention, the infrastructure profile (370) may refer to a description of an infrastructure outcome baseline needed to, at least in part, implement the given infrastructure outcome; and of a set of infrastructure-relevant overrides (if any) needed to, at least in part, implement the given workload outcome, associated with the compliance and security outcome definition (360). The infrastructure outcome baseline specified in the infrastructure profile (370) may include a reference (e.g., an infrastructure outcome definition version) to an existing infrastructure outcome definition (described above) (see e.g., FIG. 3A). Further, the set of infrastructure-relevant overrides (if any) specified in the infrastructure profile (370) may include workload-optimal changes to the infrastructure outcome dependencies (i.e., update profile, configuration profile, and/or monitoring and telemetry profile) of the infrastructure outcome baseline.

In one embodiment of the invention, the workload profile (372) may refer to a description of a workload outcome baseline needed to, at least in part, implement the given workload outcome; and of a set of workload-relevant overrides (if any) needed to, at least in part, implement the given service-level outcome, associated with the compliance and security outcome definition (360). The workload outcome baseline specified in the workload profile (372) may include a reference (e.g., a workload outcome definition version) to an existing workload outcome definition (described above) (see e.g., FIG. 3B). Further, the set of workload-relevant overrides (if any) specified in the workload profile (372) may include service-level-optimal changes to the workload outcome dependencies (i.e., infrastructure profile) of the workload outcome baseline.

In one embodiment of the invention, the service-level profile (374) may refer to a description of a service-level outcome baseline needed to, at least in part, implement the given service-level outcome; and of a set of service-level-relevant overrides (if any) needed to, at least in part, implement the given compliance and security outcome, associated with the compliance and security outcome definition (360). The service-level outcome baseline specified in the service-level profile (374) may include a reference (e.g., a service-level outcome definition version) to an existing service-level outcome definition (described above) (see e.g., FIG. 3C). Further, the set of service-level-relevant overrides (if any) specified in the service-level profile (374) may include compliance and security optimal changes to the service-level outcome dependencies (i.e., infrastructure profile and/or workload profile) of the service-level outcome baseline.

While FIG. 3D shows a configuration of components and/or subcomponents, other compliance and security outcome definition (360) configurations may be used without departing from the scope of the invention.

Figure 4:
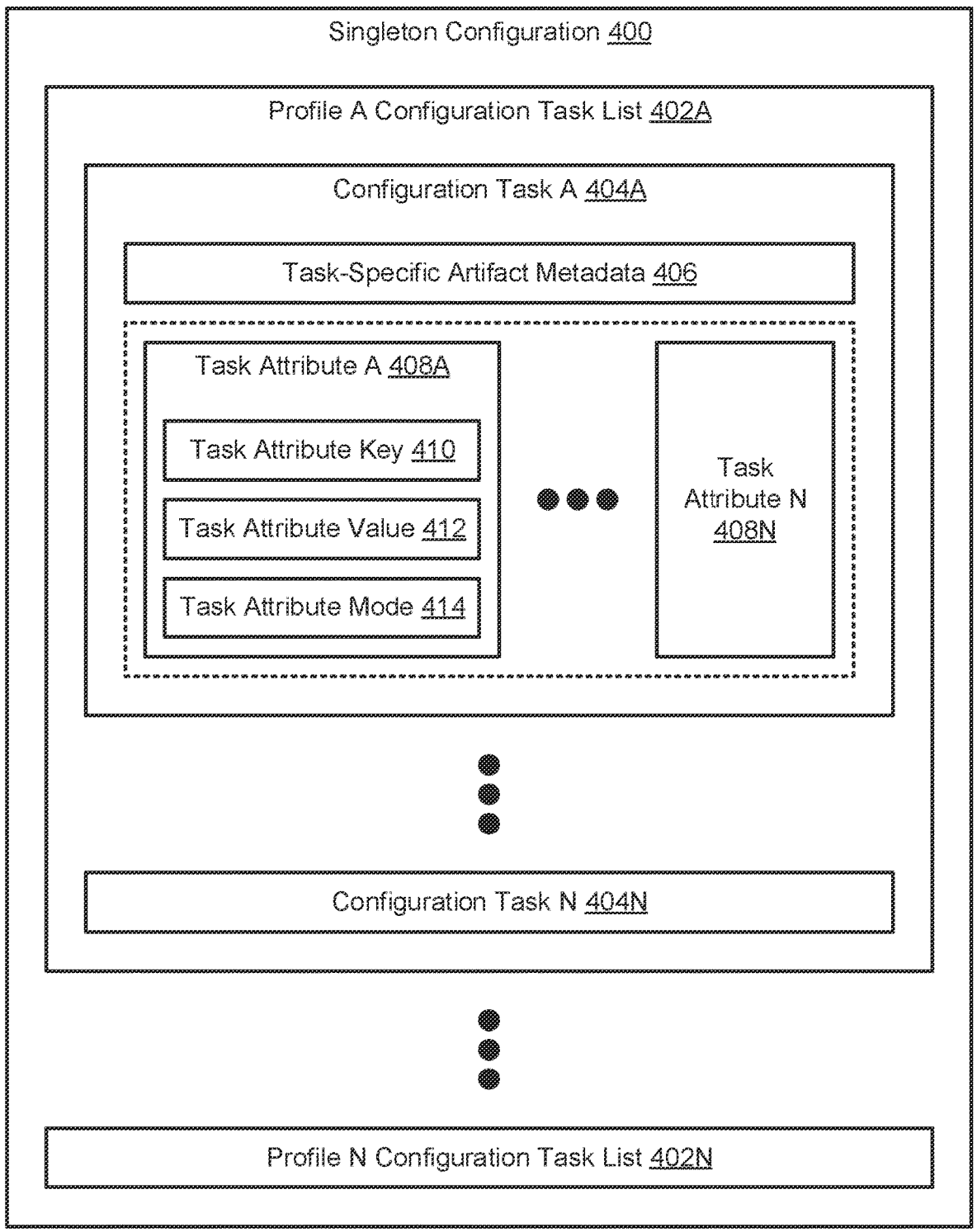
FIG. 4 shows a singleton configuration in accordance with one or more embodiments of the invention.

FIG. 4 shows a singleton configuration in accordance with one or more embodiments of the invention. The singleton configuration (400) may generally refer to a schema or data structure through which implementation of one or more outcomes (described above) (see e.g., FIG. 2) onto a target (bare-metal) infrastructure may be outlined. To that end, the singleton configuration (400) may include a set of profile configuration task lists (402A-402N). Each of these singleton configuration (400) components is described below.

In one embodiment of the invention, a profile configuration task list (402A-402N) may refer to a set of configuration tasks (404A-404N) (described below) necessary to implement a given profile of a given desired outcome definition from which the singleton configuration (400) may be derived. For example, should the given desired outcome definition reflect a desired infrastructure outcome definition (see e.g., FIG. 3A), then the singleton configuration (400) may specify a profile configuration task list (402A-402N) for each of an update profile, a configuration profile, a monitoring and telemetry profile, and an applicable component profile—all of which may be pertinent to the implementation of a desired infrastructure outcome onto a target infrastructure. By way of another example, should the given desired outcome definition reflect a desired workload outcome definition (see e.g., FIG. 3B), then the singleton configuration (400) may specify a profile configuration task list (402A-402N) for each of an infrastructure profile and a workload profile—all of which may be pertinent to the implementation of desired infrastructure and workload outcomes onto a target infrastructure. By way of another example, should the given desired outcome definition reflect a desired service-level outcome definition (see e.g., FIG. 3C), then the singleton configuration (400) may specify a profile configuration task list (402A-402N) for each of an infrastructure profile, a workload profile, and a service-level profile—all of which may be pertinent to the implementation of desired infrastructure, workload, and service-level outcomes onto a target infrastructure. Further, by way of yet another example, should the given desired outcome definition reflect a desired compliance and security outcome definition (see e.g., FIG. 3D), then the singleton configuration (400) may specify a profile configuration task list (402A-402N) for each of an infrastructure profile, a workload profile, a service-level profile, and a compliance and security profile—all of which may be pertinent to the implementation of desired infrastructure, workload, service-level, and compliance and security outcomes onto a target infrastructure.

In one embodiment of the invention, a configuration task (404A-404N), of or within a given profile configuration task list (402A-402N), may refer to an activity or process through which the given profile may, at least in part, be implemented. To that end, any given configuration task (404A-404N) may include task-specific artifact metadata (406) and a set of task attributes (408A-408N). Each of these configuration task (404A-404N) subcomponents is described below.

In one embodiment of the invention, the task-specific artifact metadata (406) may refer to information descriptive of an artifact needed to implement the given configuration task (404A-404N). An artifact, accordingly, may refer to an element or item needed to effect the given configuration task (404A-404N)—examples of which may include, but are not limited to, computer readable instructions (i.e., computer program code) and a software tool (i.e., a computer program). Further, said descriptive information may include, but is not limited to, a storage location within an artifact store (see e.g., FIG. 1) where the artifact may be stored; and operational instructions for employing the artifact, including a set of inputs pertinent to the operation of the artifact.

In one embodiment of the invention, a task attribute (408A-408N) may refer to a configuration parameter pertinent to the given configuration task (404A-404N). Said configuration parameter may also represent one of the set of inputs pertinent to the operation of an artifact referenced by the task-specific artifact metadata (406). To that end, any given task attribute (408A-408N) may include a task attribute key (410), a task attribute value (412), and a task attribute mode (414). Each of these task attribute (408A-408N) subcomponents is described below.

In one embodiment of the invention, the task attribute key (410) may refer to a unique identifier assigned to the given task attribute (408A-408N). For example, the identifier "minNodeCount" may be used to uniquely identify a task attribute (408A-408N) that pertains to a minimum number of nodes or network servers of a target infrastructure required to form a network cluster.

In one embodiment of the invention, the task attribute value (412) may refer to a variable or data consistent with a nature of the given task attribute (408A-408N). Following the above-mentioned example, the variable/data "4" may be used to specify a compatible value representative of the minimum number of nodes or network servers of a target infrastructure required to form a network cluster.

In one embodiment of the invention, the task attribute mode (414) may refer to a mutability status (e.g., read-only versus read-write) assigned to the given task attribute (408A-408N). For example, if the task attribute mode (414) of a task attribute (408A-408N) reflects that the latter has been assigned the read-only mode, then the associated task attribute value (412) remains immutable once initially set. Accordingly, the task attribute value (412) of any given task attribute (408A-408N) assigned a read-only task attribute mode (414) cannot be overridden by any outcome despite their overriding priority (see e.g., FIG. 2) rank. Particularly, when any outcome seeks to modify the task attribute value (412) of such a given task attribute (408A-408N) in order to optimally implement the outcome, said attempt to modify the task attribute value (412) may be denied, and a service user may be notified of said denial and the subsequent inability to implement the outcome. By way of another example, if the task attribute mode (414) of a task attribute (408A-408N) alternatively reflects that the latter has been assigned the read-write mode, then the associated task attribute value (412) remains mutable throughout a life or employment of the task attribute (408A-408N). Accordingly, the task attribute value (412) of any given task attribute (408A-408N) assigned a read-write task attribute mode (414) can be overridden by any outcome with sufficient overriding priority (see e.g., FIG. 2). In this context, when any appropriately ranked outcome seeks to modify the task attribute value (412) of such a given task attribute (408A-408N), said attempt to modify the task attribute value (414) may be permitted.

While FIG. 4 shows a configuration of components and/or subcomponents, other singleton configuration (400) configurations may be used without departing from the scope of the invention.

Figure 5A:
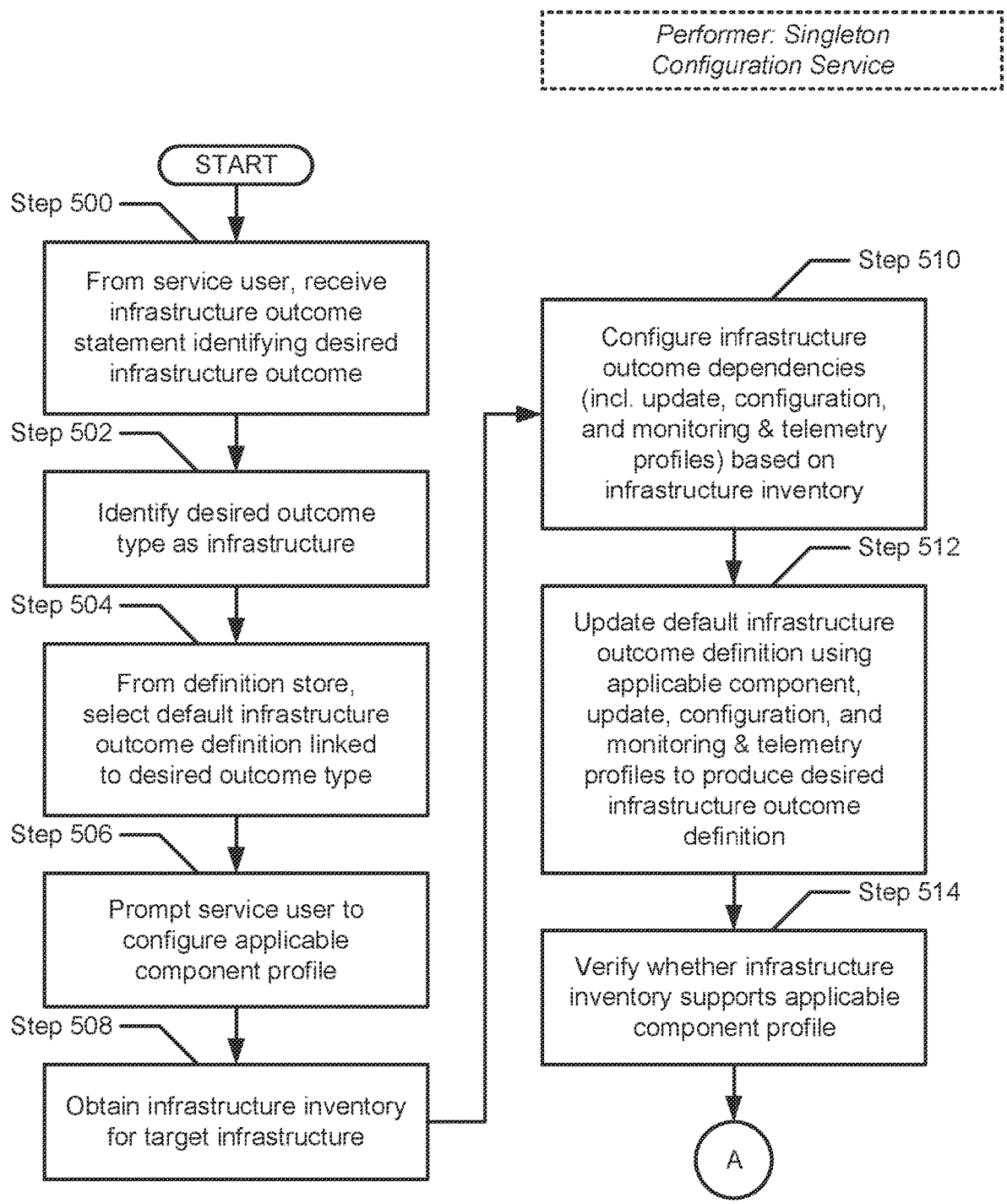
FIGS. 5A and 5B show a flowchart describing a method for outcome-based infrastructure configurations for information technology environments in accordance with one or more embodiments of the invention.
Figure 5B:
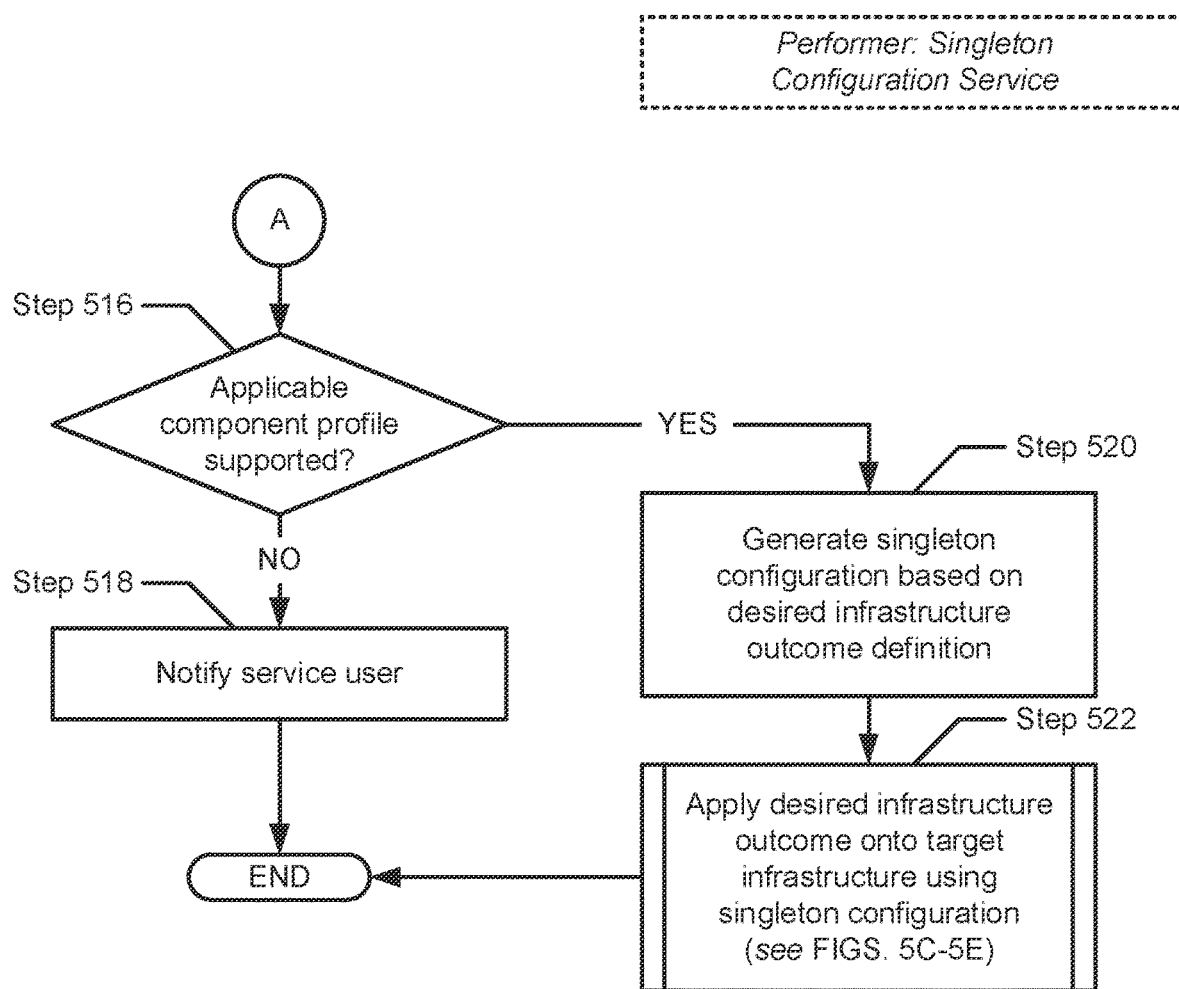

FIGS. 5A and 5B show a flowchart describing a method for outcome-based infrastructure configurations for information technology environments in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, an infrastructure outcome statement is received from a service user. In one embodiment of the invention, the infrastructure outcome statement may refer to a vocal or written sentence that may express or identify the desired infrastructure outcome sought by the service user. By way of an example, the sentence "deploy a hyper-converged infrastructure (HCI) cluster" may be representative of an infrastructure outcome statement, where transforming a target (bare-metal) infrastructure into a HCI cluster expresses the desired infrastructure outcome.

In Step 502, a desired outcome type is identified from the infrastructure outcome statement (received in Step 500). In one embodiment of the invention, with only one desired outcome—i.e., a desired infrastructure outcome—being referenced in the infrastructure outcome statement, the desired outcome type reflects that of the one desired outcome—i.e., an infrastructure type.

In Step 504, a default infrastructure outcome definition is selected from a definition store (see e.g., FIG. 1). In one embodiment of the invention, the default infrastructure outcome definition may be linked to the desired outcome type (identified in Step 502). An infrastructure outcome definition (see e.g., FIG. 3A) may generally refer to a schema or data structure through which an outcome of the infrastructure type may be defined. Further, the default infrastructure outcome definition may outline a generic starting template or baseline from which any desired infrastructure outcome definition may be derived.

In Step 506, the service user is prompted to configure an applicable component profile (see e.g., FIG. 3A). In one embodiment of the invention, the applicable component profile may refer to a description of components, features, and/or capabilities that a target infrastructure may be required to have or support in order to, at least in part, implement the desired infrastructure outcome. Examples of the component(s), feature(s), and/or capability(ies) that may be specified in the applicable component profile may include, but is/are not limited to, a network server model or version associated with one or more network servers forming the target infrastructure; a hardware model or version associated with one or more physical (hardware) resources (e.g., computer processors, data storage, networking, etc.) available throughout the target infrastructure; and a technology class of one or more technologies deployed across the target infrastructure.

In Step 508, an infrastructure inventory, for a target infrastructure, is obtained. In one embodiment of the invention, the infrastructure inventory may refer to a data file or a data structure within which any number of hardware components, available throughout the target infrastructure, may be specified, along with respective metadata descriptive of each hardware component. For any given target infrastructure, the infrastructure inventory may, for example, specify any subset or all of the following hardware components and associated metadata: computer processor(s) (metadata—e.g., clock frequency, instructions per cycle, cache, number of cores, etc.); computer data storage (metadata—e.g., technology, volatility, latency, data mutability, capacity, etc.); and networking (metadata—e.g., connection type, uplink/downlink speed rating, bandwidth usage, throughput, latency, etc.).

In Step 510, a set of infrastructure outcome dependencies is/are configured based on the infrastructure inventory (obtained in Step 508). In one embodiment of the invention, the set of infrastructure outcome dependencies may include an update profile, a configuration profile, and a monitoring and telemetry profile (see e.g., FIG. 3A).

In Step 512, the default infrastructure outcome definition (selected in Step 504) is updated using the applicable component profile (configured in Step 506) and the set of infrastructure outcome dependencies (configured in Step 510). In one embodiment of the invention, in updating (or populating) the default infrastructure outcome definition, a desired infrastructure outcome definition may be produced.

In Step 514, a verification is performed with respect to whether the applicable component profile (configured in Step 506) is supported by the infrastructure inventory (obtained in Step 508). In one embodiment of the invention, the verification may entail cross-checking the physical (hardware) resources specified in the infrastructure inventory with the component(s), feature(s), and/or capability(ies) specified in the applicable component profile. Should the physical (hardware) resources, or any portion thereof, in the infrastructure inventory meet all the component(s), feature(s), and/or capability(ies) in the applicable component profile, then the infrastructure inventory supports the applicable component profile. On the other hand, should the physical (hardware) resources, or any portion thereof, in the infrastructure inventory meet less than all the component(s), feature(s), and/or capabilities in the applicable component profile, then the infrastructure inventory does not support the applicable component profile.

Turning to FIG. 5B, in Step 516, a determination is made as to whether the verification (performed in Step 514) rendered that the infrastructure inventory (obtained in Step 508) supports the applicable component profile (configured in Step 506). In one embodiment of the invention, if it is determined that the applicable component profile is not supported, then the method proceeds to Step 518. On the other hand, in another embodiment of the invention, if it is alternatively determined that the applicable component profile is supported, then the method alternatively proceeds to Step 520.

In Step 518, following the determination (made in Step 516) that the infrastructure inventory (obtained in Step 508) does not support the applicable component profile (configured in Step 506), the service user is notified of the determination and the method does not proceed further.

In Step 520, following the alternative determination (made in Step 516) that the infrastructure inventory (obtained in Step 508) does support the applicable component profile (configured in Step 506), a singleton configuration is generated. In one embodiment of the invention, generation of the singleton configuration may rely on the desired infrastructure outcome definition (produced in Step 512). Details outlining the generation of a singleton configuration from any outcome definition is described with respect to FIG. 4, above.

In Step 522, the desired infrastructure outcome (expressed in Step 500) is applied onto the target infrastructure using the singleton configuration (generated in Step 520). Said application of the desired infrastructure outcome is described in further detail with respect to FIGS. 5C-5E, below.

Figure 5C:
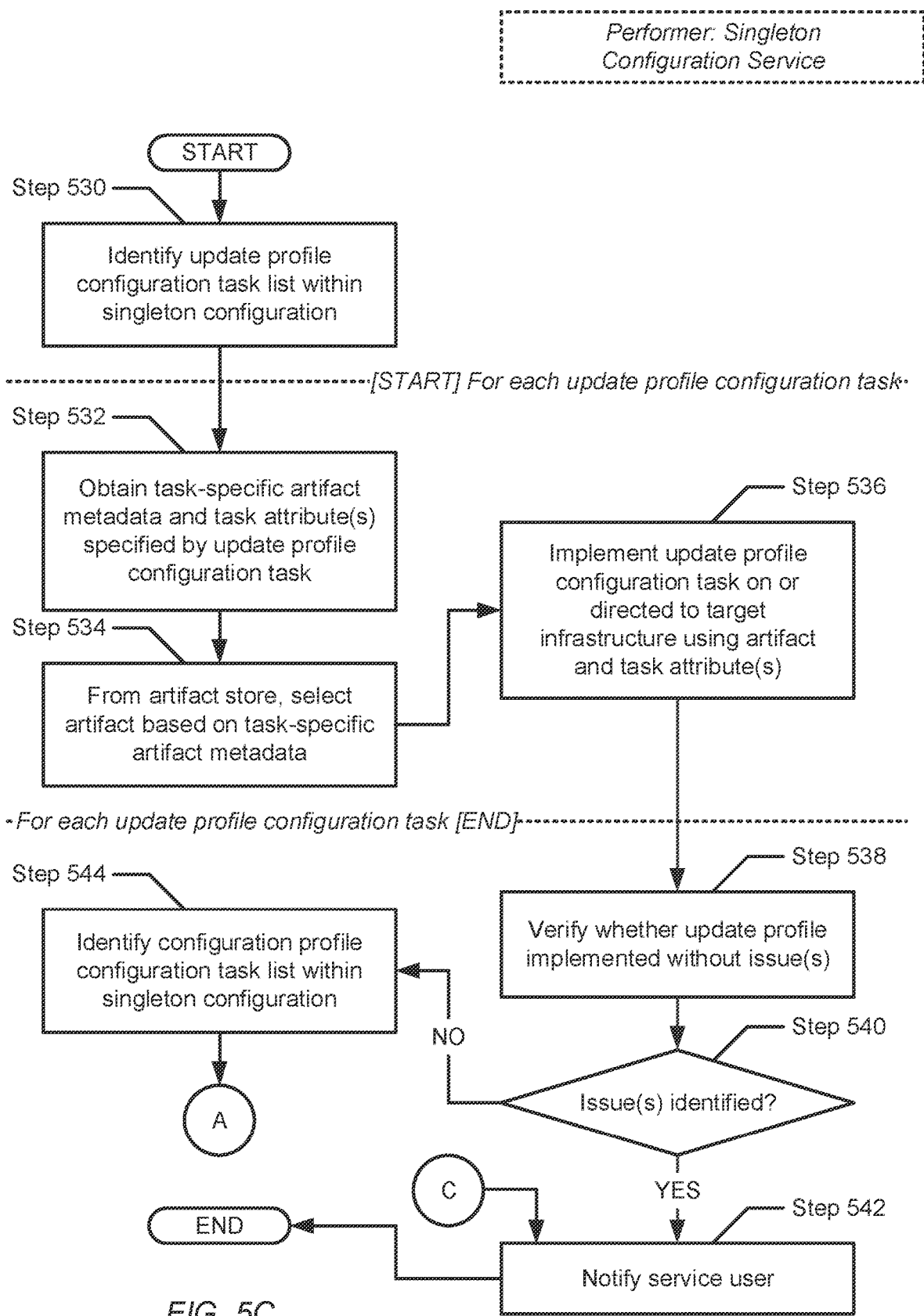
FIGS. 5C-5E show a flowchart describing a method for applying a desired infrastructure outcome onto a target infrastructure using a singleton configuration in accordance with one or more embodiments of the invention.
Figure 5D:
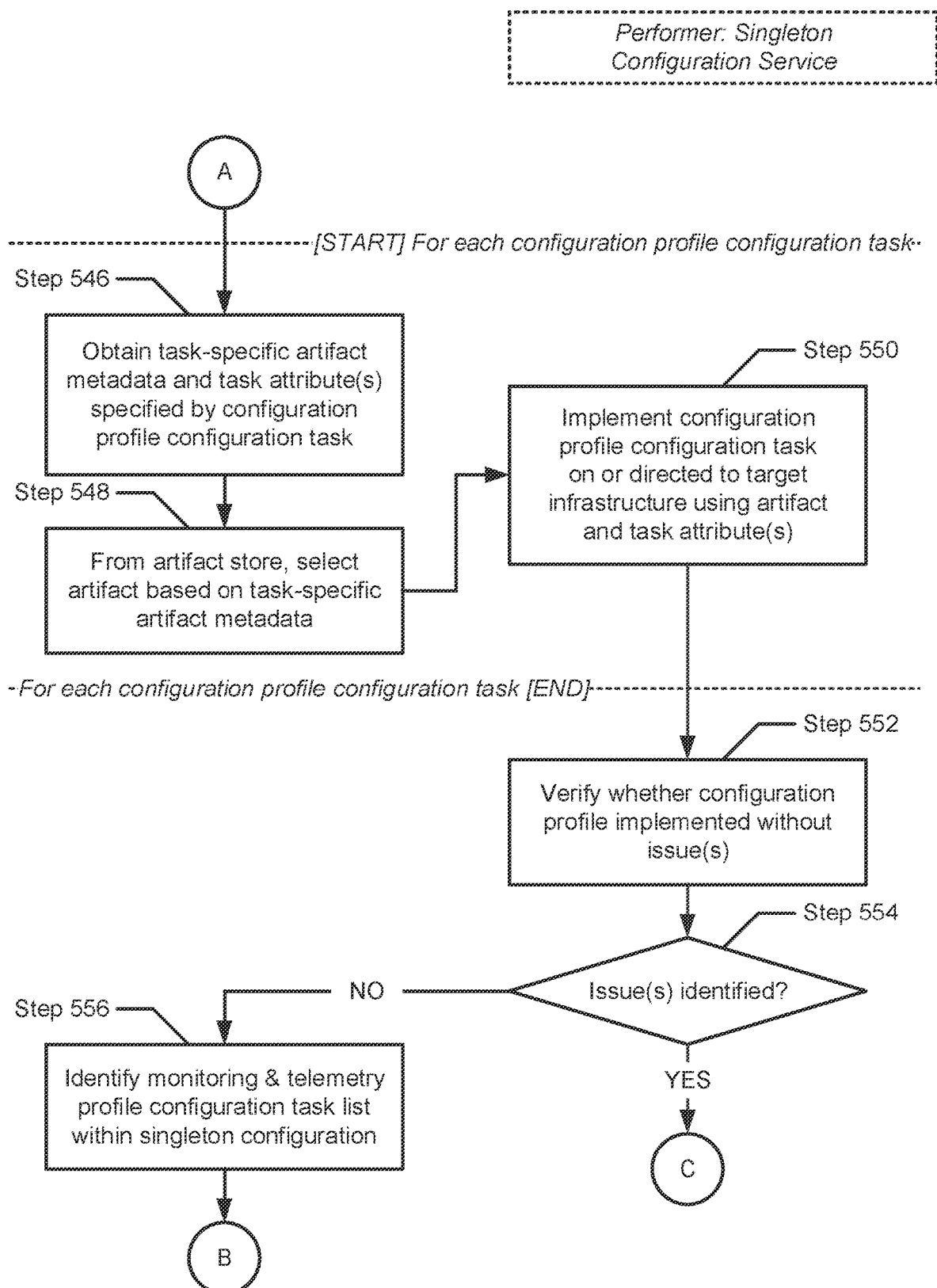
Figure 5E:
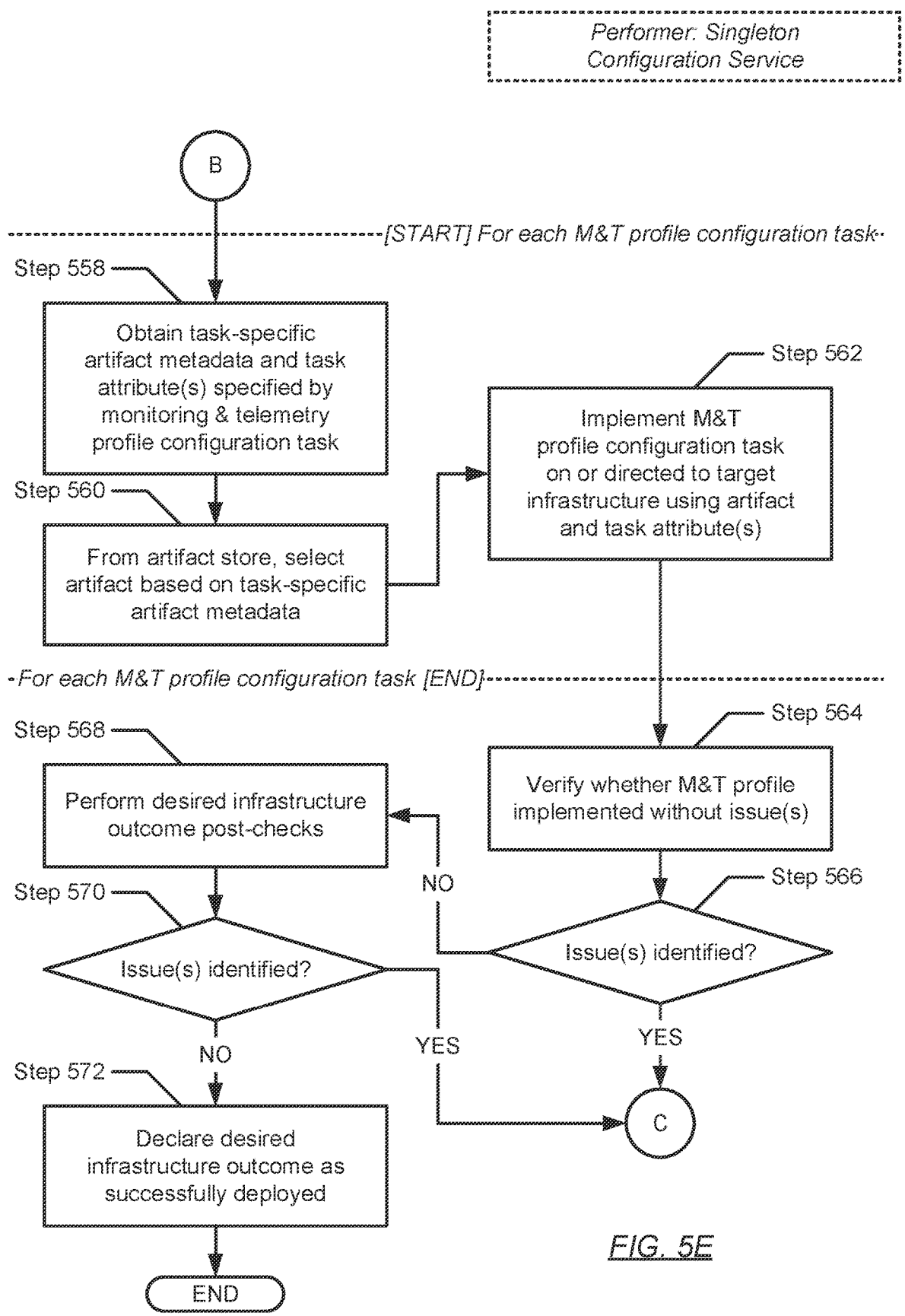

FIGS. 5C-5E show a flowchart describing a method for applying a desired infrastructure outcome onto a target infrastructure using a singleton configuration in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5C, in Step 530, an update profile configuration task list is identified within a singleton configuration. In one embodiment of the invention, the singleton configuration may pertain to the application of a desired infrastructure outcome onto a target infrastructure. Further, the update profile configuration task list may refer to a set of configuration tasks necessary to implement an update profile of a desired infrastructure outcome definition (see e.g., FIG. 3A).

The following three steps (i.e., Step 532, 534, and 536) are to be performed sequentially, thus forming an iteration, for each configuration task of the update profile configuration task list (identified in Step 530). That is, a first iteration of these three steps may be performed for a first configuration task; a second iteration of these steps may be performed for a second configuration task; and so forth, including a last iteration of these steps that may be performed for a last configuration task.

In Step 532, an update profile configuration task is assessed to obtain task-specific artifact metadata and a set of task attributes specified there-within. In one embodiment of the invention, the task-specific artifact metadata may refer to information descriptive of an artifact needed to implement the update profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the update profile configuration task. Said configuration parameter may also represent one of the set of inputs pertinent to the operation of the artifact referenced by the task-specific artifact metadata.

In Step 534, an artifact is selected from the artifact store based on at least a portion (i.e., the above-mentioned storage location) of the task-specific artifact metadata (obtained in Step 532).

In Step 536, the update profile configuration task is implemented on or directed to the target infrastructure using the artifact (selected in Step 534) and the set of task attributes (obtained in Step 532), which may serve as input(s) for the artifact.

In Step 538, a verification is performed with respect to whether the update profile had been implemented without issue(s). In one embodiment of the invention, an issue may generally refer to a problem that may arise or manifest from an action (e.g., the implementation of update profile configuration task list (identified in Step 530)). Examples of said issues may include, but are not limited to, the failure of an update due to a corrupt binary image and the failure of an update due to one or many component functionality issues. Further, when incurred, the issue(s) may shift the target infrastructure into a non-functional or non-compliant state depending on the target infrastructure component.

In Step 540, a determination is made as to whether one or more issues had been identified as a result of the verification (performed in Step 538). In one embodiment of the invention, if it is determined that at least one issue had been identified, then the method proceeds to Step 542. On the other hand, in another embodiment of the invention, if it is alternatively determined that zero issues had been identified, then the method alternatively proceeds to Step 544.

In Step 542, following the determination (made in Step 540) that at least one issue had been identified as a result of the verification (performed in Step 538), a service user is notified of the issue(s) and the method does not proceed further.

In Step 544, following the alternative determination (made in Step 540) that zero issues had been identified as a result of the verification (performed in Step 538), a configuration profile configuration task list is identified within the singleton configuration. In one embodiment of the invention, configuration profile configuration task list may refer to a set of configuration tasks necessary to implement a configuration profile of the desired infrastructure outcome definition (see e.g., FIG. 3A).

Turning to FIG. 5D, the following three steps (i.e., Step 546, 548, and 550) are to be performed sequentially, thus forming an iteration, for each configuration task of the configuration profile configuration task list (identified in Step 544) (see e.g., FIG. 5C). That is, a first iteration of these three steps may be performed for a first configuration task; a second iteration of these steps may be performed for a second configuration task; and so forth, including a last iteration of these steps that may be performed for a last configuration task.

In Step 546, a configuration profile configuration task is assessed to obtain task-specific artifact metadata and a set of task attributes specified there-within. In one embodiment of the invention, the task-specific artifact metadata may refer to information descriptive of an artifact needed to implement the configuration profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the configuration profile configuration task. Said configuration parameter may also represent one of the set of inputs pertinent to the operation of the artifact referenced by the task-specific artifact metadata.

In Step 548, an artifact is selected from the artifact store based on at least a portion (i.e., the above-mentioned storage location) of the task-specific artifact metadata (obtained in Step 546).

In Step 550, the configuration profile configuration task is implemented on or directed to the target infrastructure using the artifact (selected in Step 548) and the set of task attributes (obtained in Step 546), which may serve as input(s) for the artifact.

In Step 552, a verification is performed with respect to whether the configuration profile had been implemented without issue(s). In one embodiment of the invention, an issue may generally refer to a problem that may arise or manifest from an action (e.g., the implementation of the configuration profile configuration task list (identified in Step 544)). Examples of said issues may include, but are not limited to, the incorrect input of configuration parameters provided through human error and the detection of error(s) in any automation packages. Further, when incurred, the issue(s) may shift cluster component(s) into a non-functional or non-compliant state, as well as induce performance issues within the cluster(s).

In Step 554, a determination is made as to whether one or more issues had been identified as a result of the verification (performed in Step 552). In one embodiment of the invention, if it is determined that at least one issue had been identified, then the method proceeds to Step 542 (described above) (see e.g., FIG. 5C). On the other hand, in another embodiment of the invention, if it is alternatively determined that zero issues had been identified, then the method alternatively proceeds to Step 556.

In Step 556, following the alternative determination (made in Step 554) that zero issues had been identified as a result of the verification (performed in Step 552), a monitoring and telemetry profile configuration task list is identified within the singleton configuration. In one embodiment of the invention, monitoring and telemetry profile configuration task list may refer to a set of configuration tasks necessary to implement a monitoring and telemetry profile of the desired infrastructure outcome definition (see e.g., FIG. 3A).

Turning to FIG. 5E, the following three steps (i.e., Step 558, 560, and 562) are to be performed sequentially, thus forming an iteration, for each configuration task of the monitoring and telemetry profile configuration task list (identified in Step 556) (see e.g., FIG. 5D). That is, a first iteration of these three steps may be performed for a first configuration task; a second iteration of these steps may be performed for a second configuration task; and so forth, including a last iteration of these steps that may be performed for a last configuration task.

In Step 558, a monitoring and telemetry profile configuration task is assessed to obtain task-specific artifact metadata and a set of task attributes specified there-within. In one embodiment of the invention, the task-specific artifact metadata may refer to information descriptive of an artifact needed to implement the monitoring and telemetry profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the monitoring and telemetry profile configuration task. Said configuration parameter may also represent one of the set of inputs pertinent to the operation of the artifact referenced by the task-specific artifact metadata.

In Step 560, an artifact is selected from the artifact store based on at least a portion (i.e., the above-mentioned storage location) of the task-specific artifact metadata (obtained in Step 558).

In Step 562, the monitoring and telemetry profile configuration task is implemented on or directed to the target infrastructure using the artifact (selected in Step 560) and the set of task attributes (obtained in Step 558), where the latter may service as input(s) to the artifact.

In Step 564, a verification is performed with respect to whether the monitoring and telemetry profile had been implemented without issue(s). In one embodiment of the invention, an issue may generally refer to a problem that may arise or manifest from an action (e.g., the implementation of the monitoring and telemetry configuration task list (identified in Step 556)). Examples of said issues may include, but are not limited to, the incorrect input of configuration parameters provided through human error and the detection of error(s) in any automation packages. Further, when incurred, the issue(s) may lead to an inability to monitor the target infrastructure (e.g., for outcome drift), as well as an inability to collect relevant telemetry that may be used for future analysis(es) and/or forecasting.

In Step 566, a determination is made as to whether one or more issues had been identified as a result of the verification (performed in Step 564). In one embodiment of the invention, if it is determined that at least one issue had been identified, then the method proceeds to Step 542 (described above) (see e.g., FIG. 5C). On the other hand, in another embodiment of the invention, if it is alternatively determined that zero issues had been identified, then the method alternatively proceeds to Step 568.

In Step 568, following the alternative determination (made in Step 566) that zero issues had been identified as a result of the verification (performed in Step 564), a set of desired infrastructure outcome post-checks is performed. Examples of the desired infrastructure outcome post-check(s) may include, but are not limited to, checking overall target infrastructure functionality.

Further, in performing the set of desired infrastructure outcome post-checks, zero or more issues may be identified. An issue may generally refer to a problem that may arise or manifest from an action (e.g., performance of the desired infrastructure outcome post-checks). Examples of said issues may include, but are not limited to, performance issue(s), compatibility issue(s), and functionality issue(s).

In Step 570, a determination is made as to whether one or more issues had been identified as a result of the desired infrastructure outcome post-checks (performed in Step 568). In one embodiment of the invention, if it is determined that at least one issue had been identified, then the method proceeds to Step 542 (described above) (see e.g., FIG. 5C). On the other hand, in another embodiment of the invention, if it is alternatively determined that zero issues had been identified, then the method alternatively proceeds to Step 572.

In Step 572, following the alternative determination (made in Step 570) that zero issues had been identified as a result of the desired infrastructure outcome post-checks (performed in Step 568), the desired infrastructure outcome, now implemented on the target infrastructure, is declared as successfully deployed.

Figure 6A:
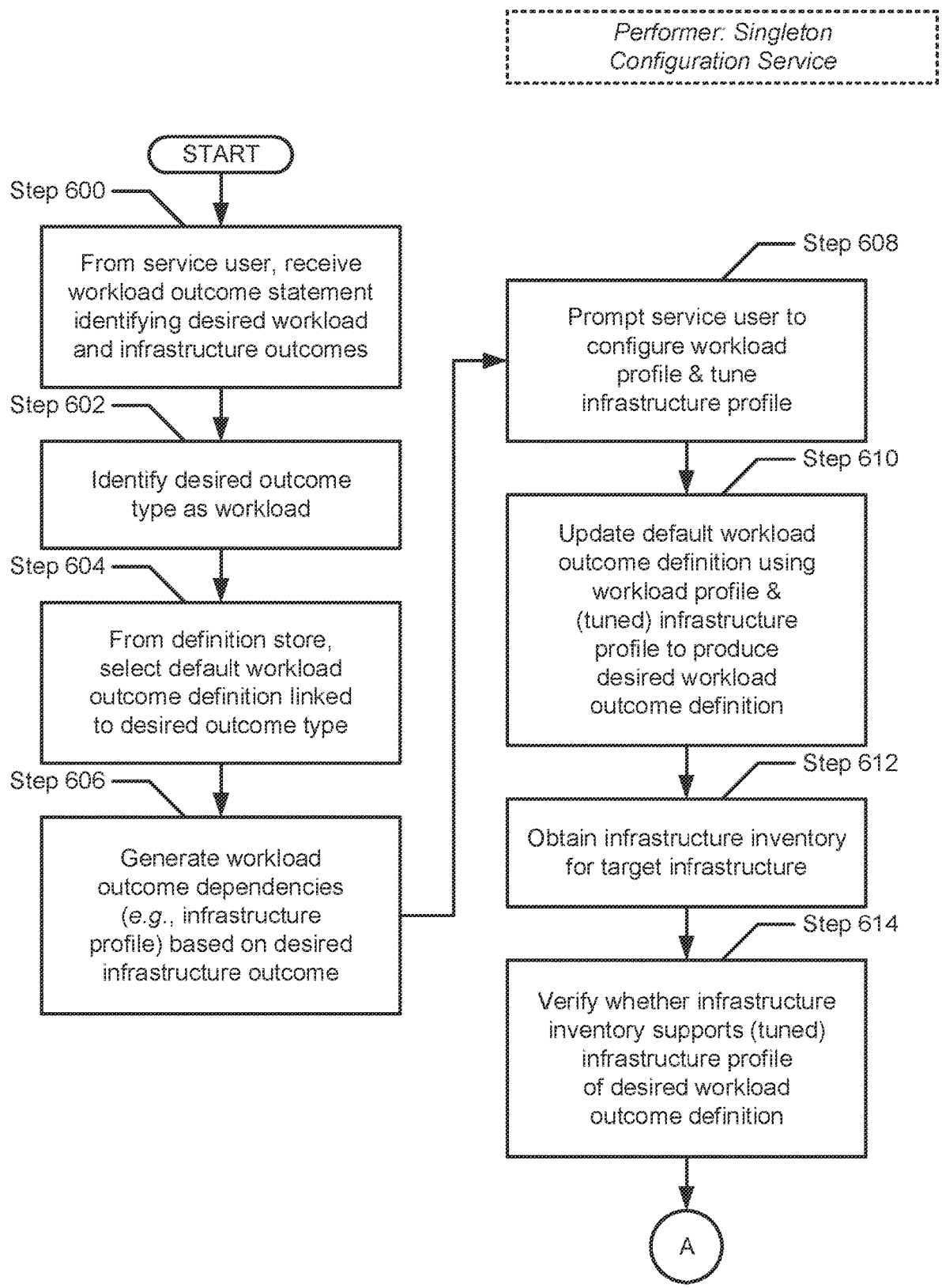
FIGS. 6A and 6B show a flowchart describing a method for outcome-based workload configurations for information technology environments in accordance with one or more embodiments of the invention.
Figure 6B:
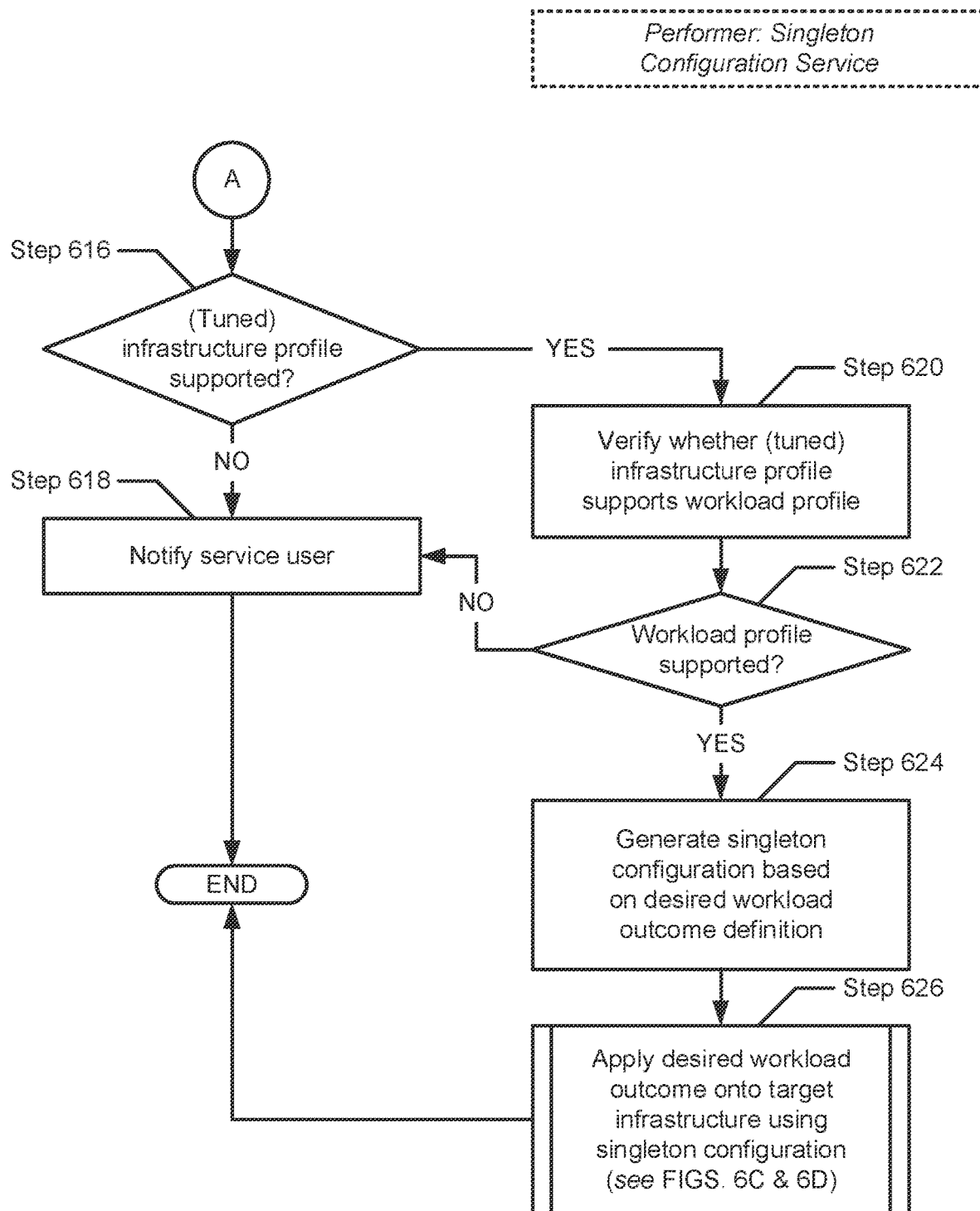

FIGS. 6A and 6B show a flowchart describing a method for outcome-based workload configurations for information technology environments in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6A, in Step 600, a workload outcome statement is received from a service user. In one embodiment of the invention, the workload outcome statement may refer to a vocal or written sentence that may express or identify the desired workload and infrastructure outcomes sought by the service user. By way of an example, the sentence "deploy a database-as-a-service instance on a hyper-converged infrastructure (HCI) cluster" may be representative of a workload outcome statement, where: transforming a target (bare-metal) infrastructure into a HCI cluster expresses the desired infrastructure outcome; and running a database-as-a-service instance on the implemented HCI cluster expresses the desired workload outcome.

In Step 602, a desired outcome type is identified from the workload outcome statement (received in Step 600). In one embodiment of the invention, with multiple desired outcomes—i.e., a desired workload outcome and a desired infrastructure outcome—being referenced in the workload outcome statement, the desired outcome type reflects that of the desired outcome associated with the higher overriding priority in the outcome hierarchy (see e.g., FIG. 2)—i.e., a workload type.

In Step 604, a default workload outcome definition is selected from a definition store (see e.g., FIG. 1). In one embodiment of the invention, the default workload outcome definition may be linked to the desired outcome type (identified in Step 602). A workload outcome definition (see e.g., FIG. 3B) may generally refer to a schema or data structure through which an outcome of the workload type may be defined. Further, the default workload outcome definition may outline a generic starting template or baseline from which any desired workload outcome definition may be derived.

In Step 606, a set of workload outcome dependencies is generated. In one embodiment of the invention, the set of workload outcome dependencies may include an infrastructure profile (see e.g., FIG. 3B), which may be generated based on the desired infrastructure outcome (expressed in Step 600).

In Step 608, the service user is prompted to configure a workload profile (see e.g., FIG. 3B). In one embodiment of the invention, the workload profile may refer to a description of the workload(s) (intended to run on the target infrastructure) and any relevant constraints needed to, at least in part, implement the desired workload outcome. Examples of the workload(s) and the relevant constraints specified in the workload profile may include, but is/are not limited to, a reference (e.g., name and/or version) to one or more sought workloads (e.g., -as-a-service service(s), software application(s), etc.); a network server type (e.g., hybrid) associated with the network server(s) on which the sought workload(s) may run; a network cluster type (e.g., HCI) associated with the network cluster(s) on which the sought workload(s) may run; and a set of minimum or preferred requirements (e.g., network server count, platform type, etc.) necessary to run the sought workload(s) on the target infrastructure In one embodiment of the invention, the service user may be further prompted to tune the set of workload outcome dependencies (e.g., infrastructure profile) (generated in Step 606). Tuning of any workload outcome dependency may entail specifying any overrides to be applied to the workload outcome dependency.

In Step 610, the default workload outcome definition (selected in Step 604) is updated using the workload profile and the set of workload outcome dependencies (configured and tuned, respectively, in Step 608). In one embodiment of the invention, in updating (or populating) the default workload outcome definition, a desired workload outcome definition may be produced.

In Step 612, an infrastructure inventory, for a target infrastructure, is obtained. In one embodiment of the invention, the infrastructure inventory may refer to a data file or a data structure within which any number of hardware components, available throughout the target infrastructure, may be specified, along with respective metadata descriptive of each hardware component. For any given target infrastructure, the infrastructure inventory may, for example, specify any subset or all of the following hardware components and associated metadata: computer processor(s) (metadata—e.g., clock frequency, instructions per cycle, cache, number of cores, etc.); computer data storage (metadata—e.g., technology, volatility, latency, data mutability, capacity, etc.); and networking (metadata—e.g., connection type, uplink/downlink speed rating, bandwidth usage, throughput, latency, etc.).

In Step 614, a verification is performed with respect to whether the infrastructure profile (tuned in Step 608) is supported by the infrastructure inventory (obtained in Step 612). In one embodiment of the invention, the verification may entail cross-checking the physical (hardware) resources specified in the infrastructure inventory with the infrastructure outcome baseline and the set of infrastructure-relevant overrides (if any) specified in the infrastructure profile. Should the physical (hardware) resources, or any portion thereof, in the infrastructure inventory meet all of the infrastructure outcome baseline and the set of infrastructure-relevant overrides (if any) in the infrastructure profile, then the infrastructure inventory supports the infrastructure profile. On the other hand, should the physical (hardware) resources, or any portion thereof, in the infrastructure inventory meet less than all of the infrastructure outcome baseline and the set of infrastructure-relevant overrides (if any) in the infrastructure profile, then the infrastructure inventory does not support the infrastructure profile.

Turning to FIG. 6B, in Step 616, a determination is made as to whether the verification (performed in Step 614) rendered that the infrastructure inventory (obtained in Step 612) supports the infrastructure profile (tuned in Step 608). In one embodiment of the invention, if it is determined that the infrastructure profile is not supported, then the method proceeds to Step 618. On the other hand, in another embodiment of the invention, if it is alternatively determined that the infrastructure profile is supported, then the method alternatively proceeds to Step 620.

In Step 618, following the determination (made in Step 616) that the infrastructure inventory (obtained in Step 612) does not support the infrastructure profile (tuned in Step 608), the service user is notified of the determination and the method does not proceed further.

In Step 620, following the alternative determination (made in Step 616) that the infrastructure inventory (obtained in Step 612) does support the infrastructure profile (tuned in Step 608), a verification is performed with respect to whether the workload profile (configured in Step 608) is supported by the infrastructure profile (tuned in Step 608). In one embodiment of the invention, the verification may entail cross-checking the infrastructure outcome baseline and the set of infrastructure-relevant overrides (if any) specified in the infrastructure profile with the requirements of the workload(s) (intended to run on the target infrastructure) and any relevant constraints specified in the workload profile. Should the infrastructure outcome baseline and the set of infrastructure-relevant overrides (if any) in the infrastructure profile meet all of the workload requirements and any relevant constraints in the workload profile, then the infrastructure profile supports the workload profile. On the other hand, should the infrastructure outcome baseline and the set of infrastructure-relevant overrides (if any) in the infrastructure profile meet less than all of the workload requirements and any relevant constraints in the workload profile, then the infrastructure profile does not support the workload profile.

In Step 622, a determination is made as to whether the verification (performed in Step 620) rendered that the infrastructure profile (tuned in Step 608) supports the workload profile (configured in Step 608). In one embodiment of the invention, if it is determined that the workload profile is not supported, then the method proceeds to Step 618 (described above). On the other hand, in another embodiment of the invention, if it is alternatively determined that the workload profile is supported, then the method alternatively proceeds to Step 624.

In Step 624, following the alternative determination (made in Step 622) that the infrastructure profile (tuned in Step 608) does support the workload profile (configured in Step 608), a singleton configuration is generated. In one embodiment of the invention, generation of the singleton configuration may rely on the desired workload outcome definition (produced in Step 610). Details outlining the generation of a singleton configuration from any outcome definition is described with respect to FIG. 4, above.

In Step 626, the desired workload and infrastructure outcomes (expressed in Step 600) are applied onto the target infrastructure using the singleton configuration (generated in Step 624). Said application of the desired workload and infrastructure outcomes is described in further detail with respect to FIGS. 6C and 6D, below.

Figure 6C:
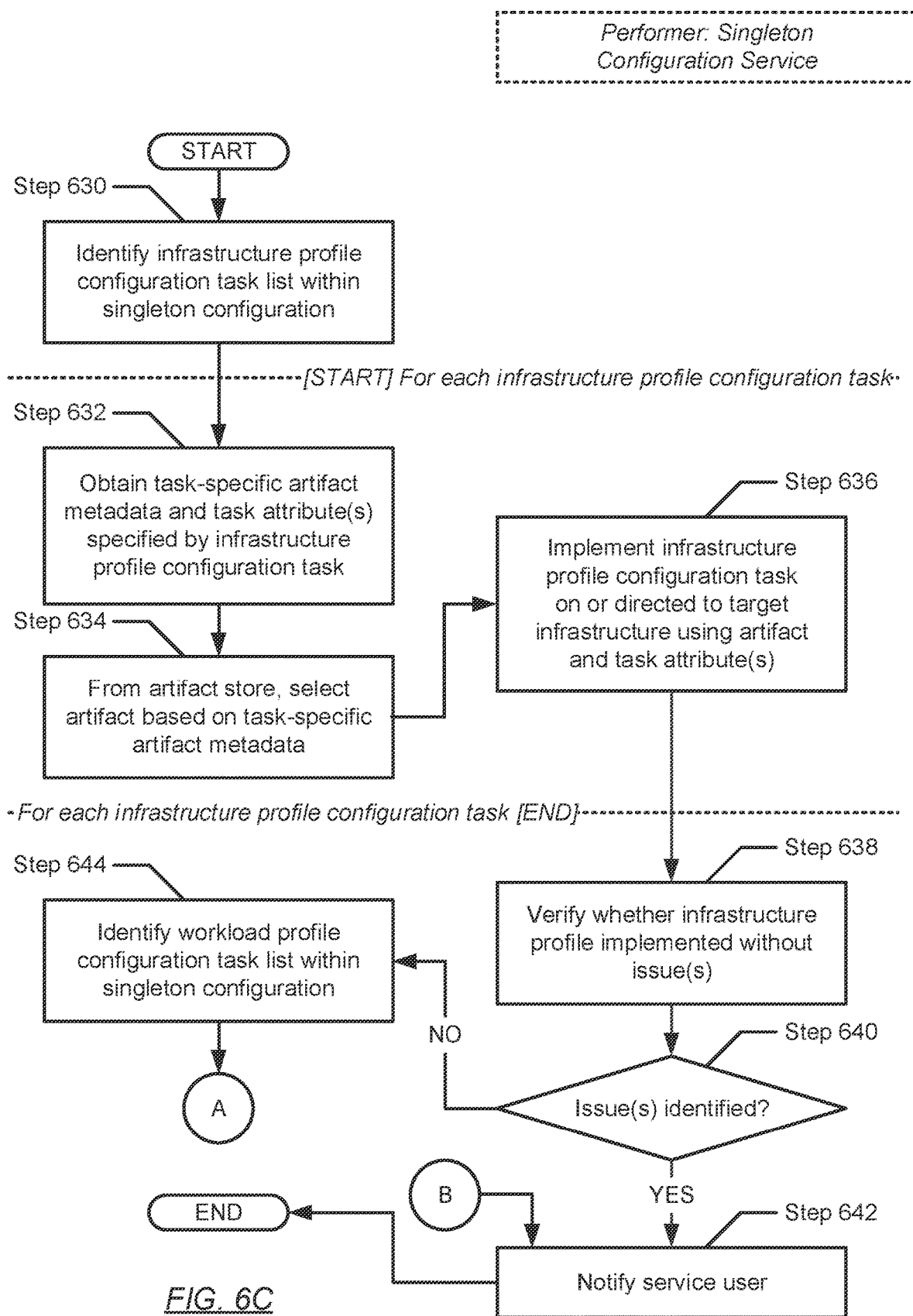
FIGS. 6C and 6D show a flowchart describing a method for applying a desired workload outcome onto a target infrastructure using a singleton configuration in accordance with one or more embodiments of the invention.
Figure 6D:
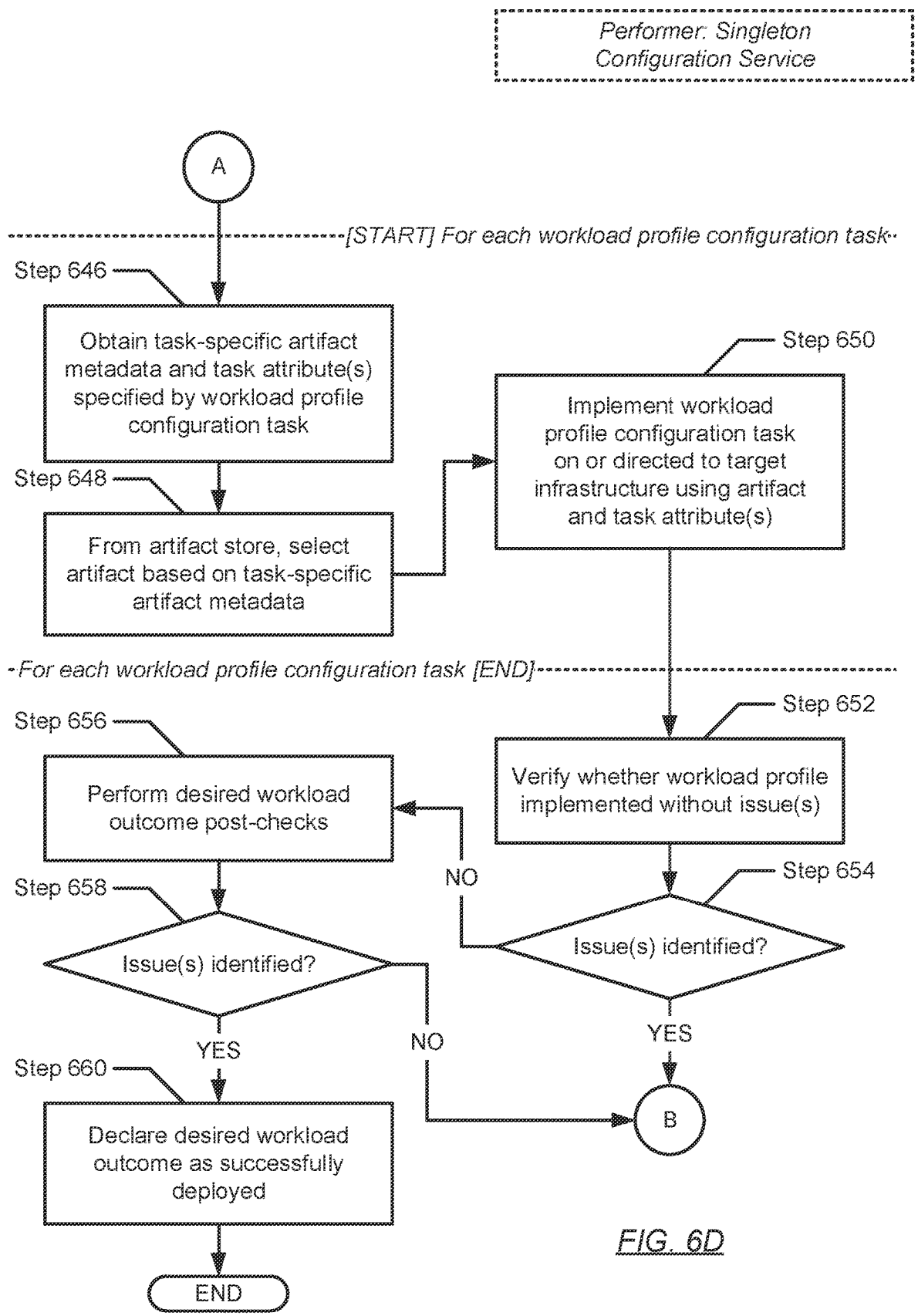

FIGS. 6C and 6D show a flowchart describing a method for applying a desired workload outcome onto a target infrastructure using a singleton configuration in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6C, in Step 630, an infrastructure profile configuration task list is identified within a singleton configuration. In one embodiment of the invention, the singleton configuration may pertain to the application of desired infrastructure and workload outcomes onto a target infrastructure. Further, the infrastructure profile configuration task list may refer to a set of configuration tasks necessary to implement an infrastructure profile of a desired workload outcome definition (see e.g., FIG. 3B).

The following three steps (i.e., Step 632, 634, and 636) are to be performed sequentially, thus forming an iteration, for each configuration task of the infrastructure profile configuration task list (identified in Step 630). That is, a first iteration of these three steps may be performed for a first configuration task; a second iteration of these steps may be performed for a second configuration task; and so forth, including a last iteration of these steps that may be performed for a last configuration task.

In Step 632, an infrastructure profile configuration task is assessed to obtain task-specific artifact metadata and a set of task attributes specified there-within. In one embodiment of the invention, the task-specific artifact metadata may refer to information descriptive of an artifact needed to implement the infrastructure profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the infrastructure profile configuration task. Said configuration parameter may also represent one of the set of inputs pertinent to the operation of the artifact referenced by the task-specific artifact metadata.

In Step 634, an artifact is selected from the artifact store based on at least a portion (i.e., the above-mentioned storage location) of the task-specific artifact metadata (obtained in Step 632).

In Step 636, the infrastructure profile configuration task is implemented on or directed to the target infrastructure using the artifact (selected in Step 634) and the set of task attributes (obtained in Step 632), where the latter may serve as input(s) to the artifact.

In Step 638, a verification is performed with respect to whether the infrastructure profile had been implemented without issue(s). In one embodiment of the invention, an issue may generally refer to a problem that may arise or manifest from an action (e.g., the implementation of infrastructure profile configuration task list (identified in Step 630)). Examples of said issues may include, but are not limited to, the failure of an update due to a corrupt binary image, the failure of an update due to one or many component functionality issues, the incorrect input of configuration parameters provided through human error, and the detection of error(s) in any automation packages. Further, when incurred, the issue(s) may shift the target infrastructure, in whole or in part, and/or the cluster(s) formed therefrom into a non-functional or non-compliant state; may induce performance issues within the target infrastructure; may lead to an inability to monitor the target infrastructure (e.g., for outcome drift); and may lead to an inability to collect relevant telemetry that may be used for future analysis(es) and/or forecasting.

In Step 640, a determination is made as to whether one or more issues had been identified as a result of the verification (performed in Step 638). In one embodiment of the invention, if it is determined that at least one issue had been identified, then the method proceeds to Step 642. On the other hand, in another embodiment of the invention, if it is alternatively determined that zero issues had been identified, then the method alternatively proceeds to Step 644.

In Step 642, following the determination (made in Step 640) that at least one issue had been identified as a result of the verification (performed in Step 638), a service user is notified of the issue(s) and the method does not proceed further.

In Step 644, following the alternative determination (made in Step 640) that zero issues had been identified as a result of the verification (performed in Step 638), a workload profile configuration task list is identified within the singleton configuration. In one embodiment of the invention, the workload profile configuration task list may refer to a set of configuration tasks necessary to implement a workload profile of the desired workload outcome definition (see e.g., FIG. 3B).

Turning to FIG. 6D, the following three steps (i.e., Step 646, 648, and 650) are to be performed sequentially, thus forming an iteration, for each configuration task of the workload profile configuration task list (identified in Step 644). That is, a first iteration of these three steps may be performed for a first configuration task; a second iteration of these steps may be performed for a second configuration task; and so forth, including a last iteration of these steps that may be performed for a last configuration task.

In Step 646, a workload profile configuration task is assessed to obtain task-specific artifact metadata and a set of task attributes specified there-within. In one embodiment of the invention, the task-specific artifact metadata may refer to information descriptive of an artifact needed to implement the workload profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the workload profile configuration task. Said configuration parameter may also represent one of the set of inputs pertinent to the operation of the artifact referenced by the task-specific artifact metadata.

In Step 648, an artifact is selected from the artifact store based on at least a portion (i.e., the above-mentioned storage location) of the task-specific artifact metadata (obtained in Step 646).

In Step 650, the workload profile configuration task is implemented on or directed to the target infrastructure using the artifact (selected in Step 648) and the set of task attributes (obtained in Step 646), where the latter may serve as input(s) to the artifact.

In Step 652, a verification is performed with respect to whether the workload profile had been implemented without issue(s). In one embodiment of the invention, an issue may generally refer to a problem that may arise or manifest from an action (e.g., the implementation of workload profile configuration task list (identified in Step 644)). Examples of said issues may include, but are not limited to, the incomplete installation of one or many desired workload(s) on the target infrastructure. Further, when incurred, the issue(s) may render the target infrastructure, in whole or in part, non-functional and/or non-compliant.

In Step 654, a determination is made as to whether one or more issues had been identified as a result of the verification (performed in Step 652). In one embodiment of the invention, if it is determined that at least one issue had been identified, then the method proceeds to Step 642 (described above) (see e.g., FIG. 6C). On the other hand, in another embodiment of the invention, if it is alternatively determined that zero issues had been identified, then the method alternatively proceeds to Step 656.

In Step 656, following the alternative determination (made in Step 654) that zero issues had been identified as a result of the verification (performed in Step 652), a set of desired workload outcome post-checks is performed. Examples of the desired workload outcome post-check(s) may include, but are not limited to, checking overall target infrastructure functionality, and checking overall workload functionality on the target infrastructure.

Further, in performing the set of desired workload outcome post-checks, zero or more issues may be identified. An issue may generally refer to a problem that may arise or manifest from an action (e.g., performance of the desired workload outcome post-checks). Examples of said issues may include, but are not limited to, performance issue(s), compatibility issue(s), and functionality issue(s).

In Step 658, a determination is made as to whether one or more issues had been identified as a result of the desired workload outcome post-checks (performed in Step 656). In one embodiment of the invention, if it is determined that at least one issue had been identified, then the method proceeds to Step 642 (described above) (see e.g., FIG. 6C). On the other hand, in another embodiment of the invention, if it is alternatively determined that zero issues had been identified, then the method alternatively proceeds to Step 660.

In Step 660, following the alternative determination (made in Step 658) that zero issues had been identified as a result of the desired workload outcome post-checks (performed in Step 656), the desired workload and infrastructure outcomes, now implemented on the target infrastructure, are declared as successfully deployed.

Figure 7A:
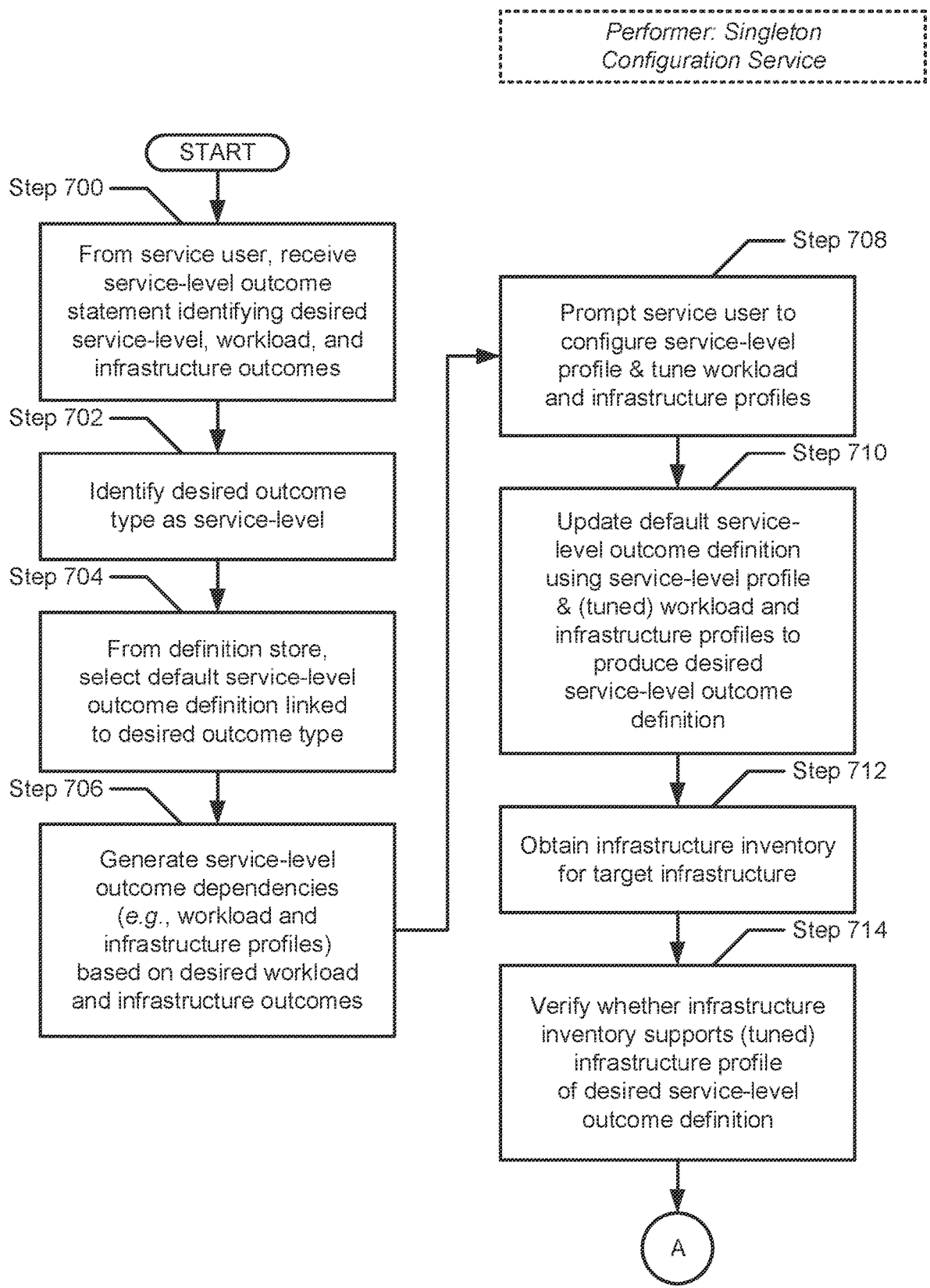
FIGS. 7A and 7B show a flowchart describing a method for outcome-based service-level configurations for information technology environments in accordance with one or more embodiments of the invention.
Figure 7B:
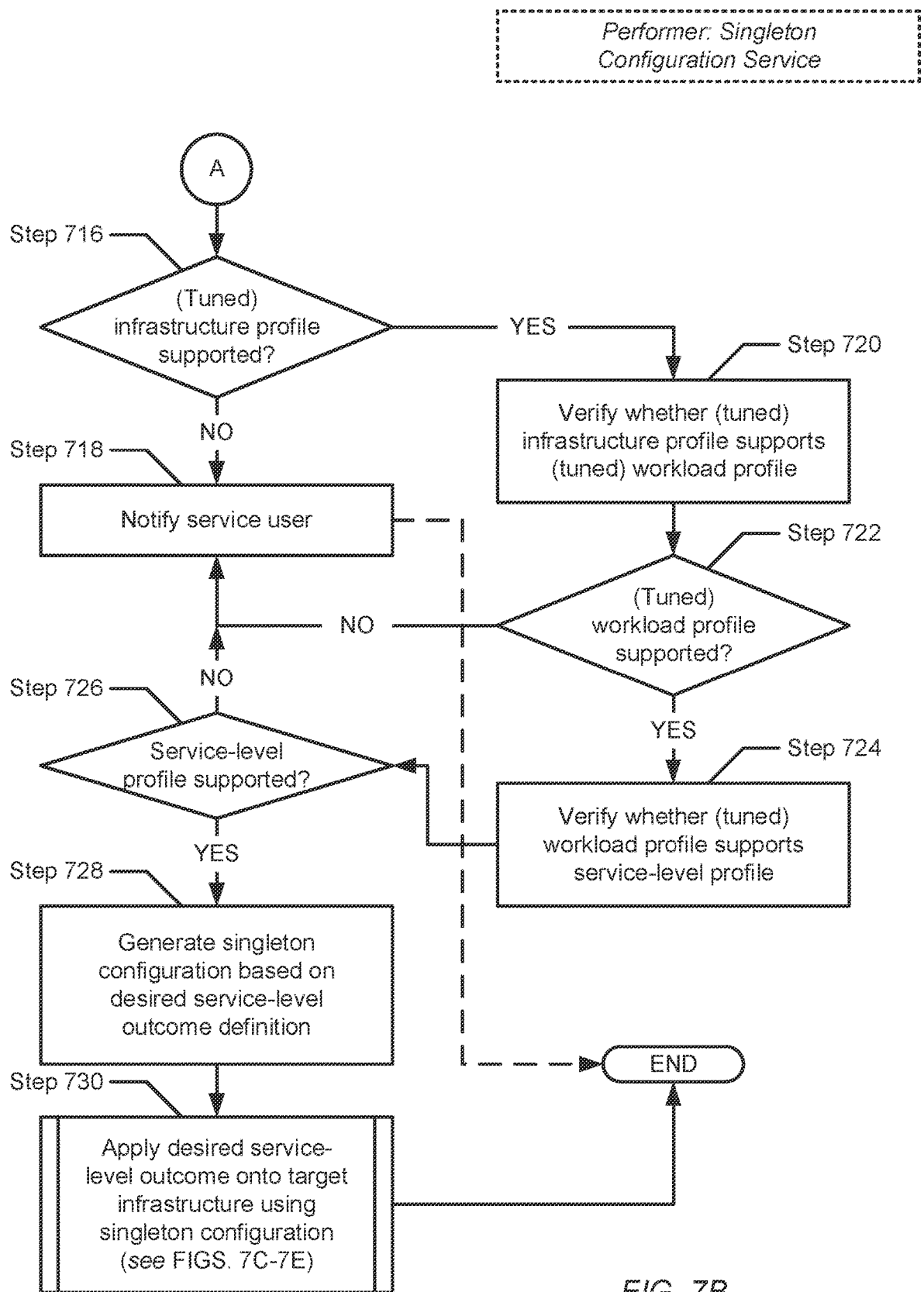

FIGS. 7A and 7B show a flowchart describing a method for outcome-based service-level configurations for information technology environments in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 7A, in Step 700, a service-level outcome statement is received from a service user. In one embodiment of the invention, the service-level outcome statement may refer to a vocal or written sentence that may express or identify the desired service-level, workload, and infrastructure outcomes sought by the service user. By way of an example, the sentence "deploy a database-as-a-service instance optimized to run 100K transactions per second with a 1 nanosecond (ns) response time on a hyper-converged infrastructure (HCI) cluster" may be representative of a service-level outcome statement, where: transforming a target (bare-metal) infrastructure into a HCI cluster expresses the desired infrastructure outcome; running a database-as-a-service instance on the implemented HCI cluster expresses the desired workload outcome; and optimizing the implemented database-as-a-service instance to handle the specified number of transactions and have the required response time expresses the desired service-level outcome.

In Step 702, a desired outcome type is identified from the service-level outcome statement (received in Step 700). In one embodiment of the invention, with multiple desired outcomes—i.e., a desired service-level outcome, a desired workload outcome, and a desired infrastructure outcome—being referenced in the service-level outcome statement, the desired outcome type reflects that of the desired outcome associated with the higher overriding priority in the outcome hierarchy (see e.g., FIG. 2)—i.e., a service-level type.

In Step 704, a default service-level outcome definition is selected from a definition store (see e.g., FIG. 1). In one embodiment of the invention, the default service-level outcome definition may be linked to the desired outcome type (identified in Step 702). A service-level outcome definition (see e.g., FIG. 3C) may generally refer to a schema or data structure through which an outcome of the service-level type may be defined. Further, the default service-level outcome definition may outline a generic starting template or baseline from which any desired service-level outcome definition may be derived.

In Step 706, a set of service-level outcome dependencies is generated. In one embodiment of the invention, the set of service-level outcome dependencies may include a workload profile and an infrastructure profile (see e.g., FIG. 3C), which may be generated based on the desired workload and infrastructure outcomes (expressed in Step 700), respectively.

In Step 708, the service user is prompted to configure a service-level profile (see e.g., FIG. 3C). In one embodiment of the invention, the service-level profile may refer to a description of service-level agreement (SLA) or performance requirements needed to, at least in part, implement the given service-level outcome. Examples of the SLA/performance requirements specified in the service-level profile may include, but is/are not limited to, a service tier (e.g., performance-optimized) identifying a class of service and capabilities thereof sought to maintain the workload(s) running on the target infrastructure; a resiliency configuration (e.g., always-available) sought to be associated with the workload(s) running on the target infrastructure; and other performance pertinent characteristics (e.g., usage threshold, instance scaling, etc.) sought to be applied to the workload(s) running on the target infrastructure.

In one embodiment of the invention, the service user may be further prompted to tune the set of service-level outcome dependencies (e.g., workload and infrastructure profiles) (generated in Step 706). Tuning of any workload outcome dependency may entail specifying any overrides to be applied to the workload outcome dependency.

In Step 710, the default service-level outcome definition (selected in Step 704) is updated using the service-level profile and the set of workload outcome dependencies (configured and tuned, respectively, in Step 708). In one embodiment of the invention, in updating (or populating) the default service-level outcome definition, a desired service-level outcome definition may be produced.

In Step 712, an infrastructure inventory, for a target infrastructure, is obtained. In one embodiment of the invention, the infrastructure inventory may refer to a data file or a data structure within which any number of hardware components, available throughout the target infrastructure, may be specified, along with respective metadata descriptive of each hardware component. For any given target infrastructure, the infrastructure inventory may, for example, specify any subset or all of the following hardware components and associated metadata: computer processor(s) (metadata—e.g., clock frequency, instructions per cycle, cache, number of cores, etc.); computer data storage (metadata—e.g., technology, volatility, latency, data mutability, capacity, etc.); and networking (metadata—e.g., connection type, uplink/downlink speed rating, bandwidth usage, throughput, latency, etc.).

In Step 714, a verification is performed with respect to whether the infrastructure profile (tuned in Step 708) is supported by the infrastructure inventory (obtained in Step 712). In one embodiment of the invention, the verification may entail cross-checking the physical (hardware) resources specified in the infrastructure inventory with the infrastructure outcome baseline and the set of infrastructure-relevant overrides (if any) specified in the infrastructure profile. Should the physical (hardware) resources, or any portion thereof, in the infrastructure inventory meet all of the infrastructure outcome baseline and the set of infrastructure-relevant overrides (if any) in the infrastructure profile, then the infrastructure inventory supports the infrastructure profile. On the other hand, should the physical (hardware) resources, or any portion thereof, in the infrastructure inventory meet less than all of the infrastructure outcome baseline and the set of infrastructure-relevant overrides (if any) in the infrastructure profile, then the infrastructure inventory does not support the infrastructure profile.

Turning to FIG. 7B, in Step 716, a determination is made as to whether the verification (performed in Step 714) rendered that the infrastructure inventory (obtained in Step 712) supports the infrastructure profile (tuned in Step 708). In one embodiment of the invention, if it is determined that the infrastructure profile is not supported, then the method proceeds to Step 718. On the other hand, in another embodiment of the invention, if it is alternatively determined that the infrastructure profile is supported, then the method alternatively proceeds to Step 720.

In Step 718, following the determination (made in Step 716) that the infrastructure inventory (obtained in Step 712) does not support the infrastructure profile (tuned in Step 708), the service user is notified of the determination and the method does not proceed further.

In Step 720, following the alternative determination (made in Step 716) that the infrastructure inventory (obtained in Step 712) does support the infrastructure profile (tuned in Step 708), a verification is performed with respect to whether the workload profile (tuned in Step 708) is supported by the infrastructure profile (tuned in Step 708). In one embodiment of the invention, the verification may entail cross-checking the infrastructure outcome baseline and the set of infrastructure-relevant overrides (if any) specified in the infrastructure profile with the requirements of the workload(s) (intended to run on the target infrastructure) and any relevant constraints specified in the workload profile. Should the infrastructure outcome baseline and the set of infrastructure-relevant overrides (if any) in the infrastructure profile meet all of the workload requirements and any relevant constraints in the workload profile, then the infrastructure profile supports the workload profile. On the other hand, should the infrastructure outcome baseline and the set of infrastructure-relevant overrides (if any) in the infrastructure profile meet less than all of the workload requirements and any relevant constraints in the workload profile, then the infrastructure profile does not support the workload profile.

In Step 722, a determination is made as to whether the verification (performed in Step 720) rendered that the infrastructure profile (tuned in Step 708) supports the workload profile (tuned in Step 708). In one embodiment of the invention, if it is determined that the workload profile is not supported, then the method proceeds to Step 718 (described above). On the other hand, in another embodiment of the invention, if it is alternatively determined that the workload profile is supported, then the method alternatively proceeds to Step 724.

In Step 724, following the alternative determination (made in Step 722) that the infrastructure profile (tuned in Step 708) does support the workload profile (tuned in Step 708), a verification is performed with respect to whether the service-level profile (configured in Step 708) is supported by the workload profile (tuned in Step 708). In one embodiment of the invention, the verification may entail cross-checking the workload outcome baseline and the set of workload-relevant overrides (if any) specified in the workload profile with the service-level agreement (SLA) or performance requirements specified in the service-level profile. Should the workload outcome baseline and the set of workload-relevant overrides (if any) in the workload profile meet all of the service-level agreement (SLA) or performance requirements in the workload profile, then the workload profile supports the service-level profile. On the other hand, should the workload outcome baseline and the set of workload-relevant overrides (if any) in the workload profile meet less than all of the service-level agreement (SLA) or performance requirements in the service-level profile, then the workload profile does not support the service-level profile.

In Step 726, a determination is made as to whether the verification (performed in Step 724) rendered that the workload profile (tuned in Step 708) supports the service-level profile (configured in Step 708). In one embodiment of the invention, if it is determined that the service-level profile is not supported, then the method proceeds to Step 718 (described above). On the other hand, in another embodiment of the invention, if it is alternatively determined that the service-level profile is supported, then the method alternatively proceeds to Step 728.

In Step 728, following the alternative determination (made in Step 726) that the workload profile (tuned in Step 708) does support the service-level profile (configured in Step 708), a singleton configuration is generated. In one embodiment of the invention, generation of the singleton configuration may rely on the desired service-level outcome definition (produced in Step 710). Details outlining the generation of a singleton configuration from any outcome definition is described with respect to FIG. 4, above.

In Step 730, the desired service-level, workload, and infrastructure outcomes (expressed in Step 700) are applied onto the target infrastructure using the singleton configuration (generated in Step 728). Said application of the desired service-level, workload, and infrastructure outcomes is described in further detail with respect to FIGS. 7C-7E, below.

Figure 7C:
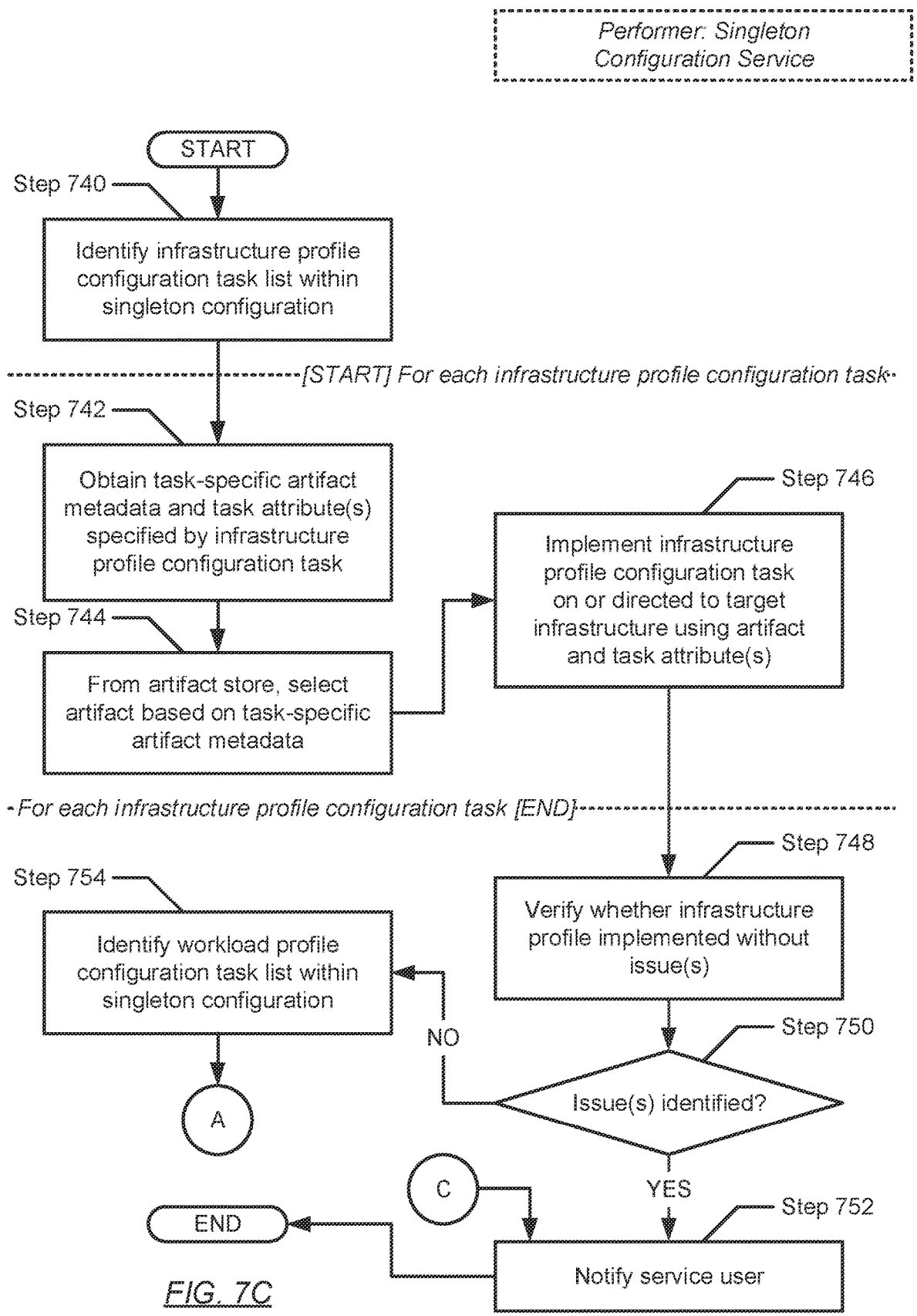
FIGS. 7C-7E show a flowchart describing a method for applying a desired service-level outcome onto a target infrastructure using a singleton configuration in accordance with one or more embodiments of the invention.
Figure 7D:
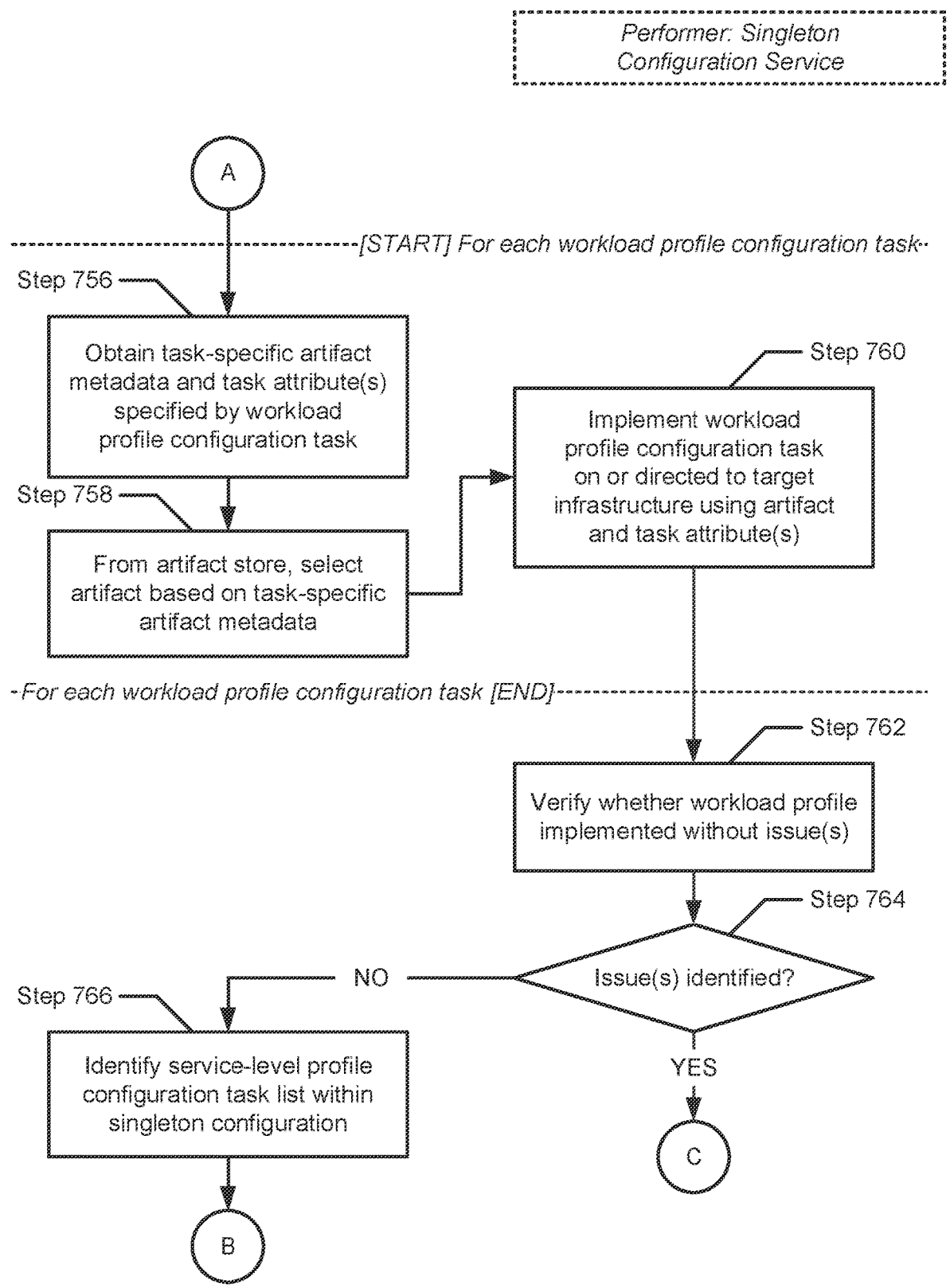
Figure 7E:
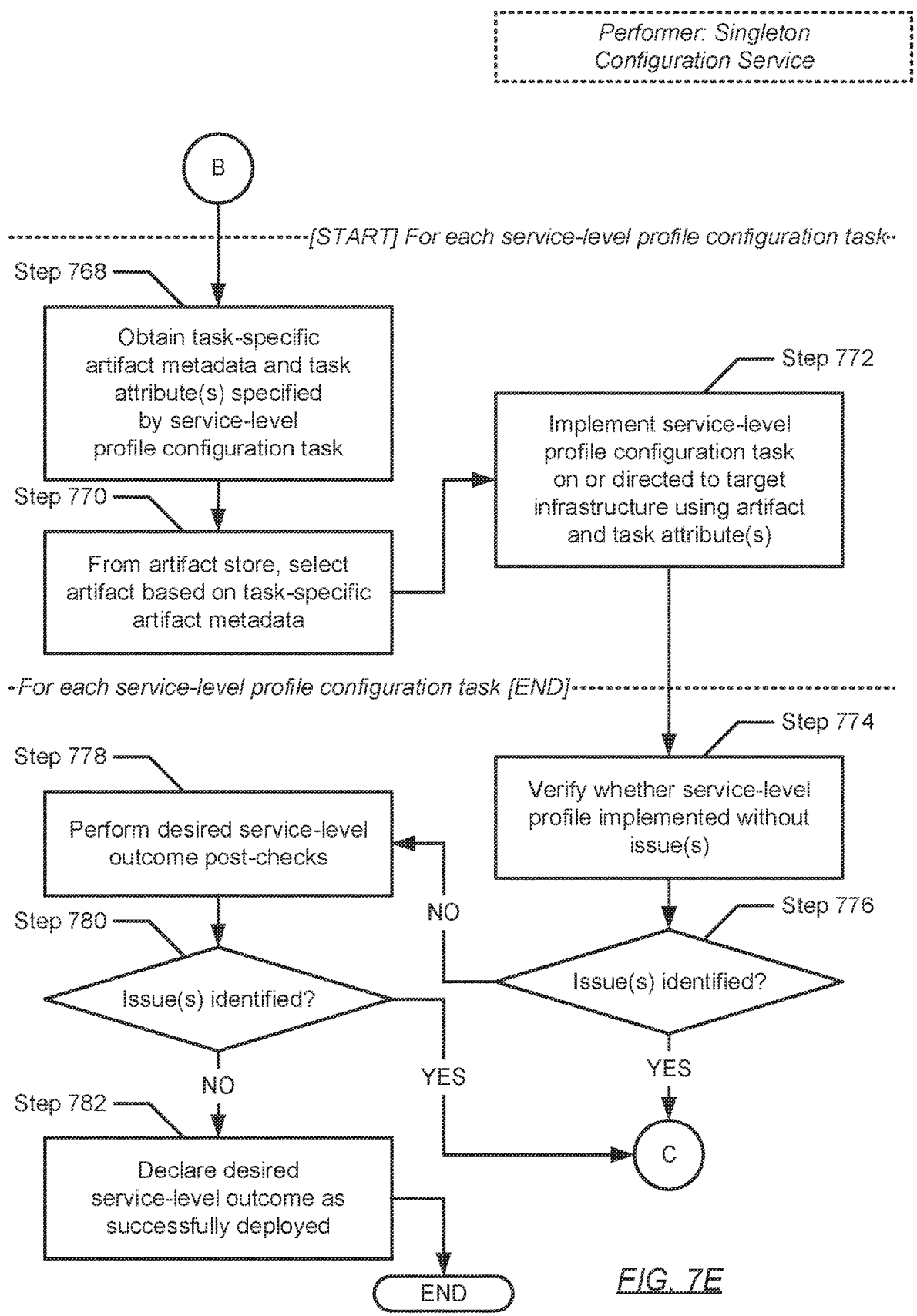

FIGS. 7C-7E show a flowchart describing a method for applying a desired service-level outcome onto a target infrastructure using a singleton configuration in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 7C, in Step 740, an infrastructure profile configuration task list is identified within a singleton configuration. In one embodiment of the invention, the singleton configuration may pertain to the application of desired infrastructure, workload, and service-level outcomes onto a target infrastructure. Further, the infrastructure profile configuration task list may refer to a set of configuration tasks necessary to implement an infrastructure profile of a desired service-level outcome definition (see e.g., FIG. 3C).

The following three steps (i.e., Step 742, 744, and 746) are to be performed sequentially, thus forming an iteration, for each configuration task of the infrastructure profile configuration task list (identified in Step 740). That is, a first iteration of these three steps may be performed for a first configuration task; a second iteration of these steps may be performed for a second configuration task; and so forth, including a last iteration of these steps that may be performed for a last configuration task.

In Step 742, an infrastructure profile configuration task is assessed to obtain task-specific artifact metadata and a set of task attributes specified there-within. In one embodiment of the invention, the task-specific artifact metadata may refer to information descriptive of an artifact needed to implement the infrastructure profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the infrastructure profile configuration task. Said configuration parameter may also represent one of the set of inputs pertinent to the operation of the artifact referenced by the task-specific artifact metadata.

In Step 744, an artifact is selected from the artifact store based on at least a portion (i.e., the above-mentioned storage location) of the task-specific artifact metadata (obtained in Step 742).

In Step 746, the infrastructure profile configuration task is implemented on or directed to the target infrastructure using the artifact (selected in Step 744) and the set of task attributes (obtained in Step 742), where the latter may serve as input(s) to the artifact.

In Step 748, a verification is performed with respect to whether the infrastructure profile had been implemented without issue(s). In one embodiment of the invention, an issue may generally refer to a problem that may arise or manifest from an action (e.g., the implementation of infrastructure profile configuration task list (identified in Step 740)). Examples of said issues may include, but are not limited to, the failure of an update due to a corrupt binary image, the failure of an update due to one or many component functionality issues, the incorrect input of configuration parameters provided through human error, and the detection of error(s) in any automation packages. Further, when incurred, the issue(s) may shift the target infrastructure, in whole or in part, and/or the cluster(s) formed therefrom into a non-functional or non-compliant state; may induce performance issues within the target infrastructure; may lead to an inability to monitor the target infrastructure (e.g., for outcome drift); and may lead to an inability to collect relevant telemetry that may be used for future analysis(es) and/or forecasting.

In Step 750, a determination is made as to whether one or more issues had been identified as a result of the verification (performed in Step 748). In one embodiment of the invention, if it is determined that at least one issue had been identified, then the method proceeds to Step 752. On the other hand, in another embodiment of the invention, if it is alternatively determined that zero issues had been identified, then the method alternatively proceeds to Step 754.

In Step 752, following the determination (made in Step 750) that at least one issue had been identified as a result of the verification (performed in Step 748), a service user is notified of the issue(s) and the method does not proceed further.

In Step 754, following the alternative determination (made in Step 750) that zero issues had been identified as a result of the verification (performed in Step 748), a workload profile configuration task list is identified within the singleton configuration. In one embodiment of the invention, the workload profile configuration task list may refer to a set of configuration tasks necessary to implement a workload profile of the desired service-level outcome definition (see e.g., FIG. 3C).

Turning to FIG. 7D, the following three steps (i.e., Step 756, 758, and 760) are to be performed sequentially, thus forming an iteration, for each configuration task of the workload profile configuration task list (identified in Step 754). That is, a first iteration of these three steps may be performed for a first configuration task; a second iteration of these steps may be performed for a second configuration task; and so forth, including a last iteration of these steps that may be performed for a last configuration task.

In Step 756, a workload profile configuration task is assessed to obtain task-specific artifact metadata and a set of task attributes specified there-within. In one embodiment of the invention, the task-specific artifact metadata may refer to information descriptive of an artifact needed to implement the workload profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the workload profile configuration task. Said configuration parameter may also represent one of the set of inputs pertinent to the operation of the artifact referenced by the task-specific artifact metadata.

In Step 758, an artifact is selected from the artifact store based on at least a portion (i.e., the above-mentioned storage location) of the task-specific artifact metadata (obtained in Step 756).

In Step 760, the workload profile configuration task is implemented on or directed to the target infrastructure using the artifact (selected in Step 758) and the set of task attributes (obtained in Step 756), where the latter may serve as input(s) to the artifact.

In Step 762, a verification is performed with respect to whether the workload profile had been implemented without issue(s). In one embodiment of the invention, an issue may generally refer to a problem that may arise or manifest from an action (e.g., the implementation of workload profile configuration task list (identified in Step 754)). Examples of said issues may include, but are not limited to, the incomplete installation of one or many desired workload(s) on the target infrastructure. Further, when incurred, the issue(s) may render the target infrastructure, in whole or in part, non-functional and/or non-compliant.

In Step 764, a determination is made as to whether one or more issues had been identified as a result of the verification (performed in Step 762). In one embodiment of the invention, if it is determined that at least one issue had been identified, then the method proceeds to Step 752 (described above) (see e.g., FIG. 7C). On the other hand, in another embodiment of the invention, if it is alternatively determined that zero issues had been identified, then the method alternatively proceeds to Step 766.

In Step 766, following the alternative determination (made in Step 764) that zero issues had been identified as a result of the verification (performed in Step 762), a service-level profile configuration task list is identified within the singleton configuration. In one embodiment of the invention, the service-level profile configuration task list may refer to a set of configuration tasks necessary to implement a service-level profile of the desired service-level outcome definition (see e.g., FIG. 3C).

Turning to FIG. 7E, the following three steps (i.e., Step 768, 770, and 772) are to be performed sequentially, thus forming an iteration, for each configuration task of the service-level profile configuration task list (identified in Step 766). That is, a first iteration of these three steps may be performed for a first configuration task; a second iteration of these steps may be performed for a second configuration task; and so forth, including a last iteration of these steps that may be performed for a last configuration task.

In Step 768, a service-level profile configuration task is assessed to obtain task-specific artifact metadata and a set of task attributes specified there-within. In one embodiment of the invention, the task-specific artifact metadata may refer to information descriptive of an artifact needed to implement the service-level profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the service-level profile configuration task. Said configuration parameter may also represent one of the set of inputs pertinent to the operation of the artifact referenced by the task-specific artifact metadata.

In Step 770, an artifact is selected from the artifact store based on at least a portion (i.e., the above-mentioned storage location) of the task-specific artifact metadata (obtained in Step 768).

In Step 772, the service-level profile configuration task is implemented on or directed to the target infrastructure using the artifact (selected in Step 770) and the set of task attributes (obtained in Step 768), where the latter may serve as input(s) to the artifact.

In Step 774, a verification is performed with respect to whether the service-level profile had been implemented without issue(s). In one embodiment of the invention, an issue may generally refer to a problem that may arise or manifest from an action (e.g., the implementation of service-level profile configuration task list (identified in Step 766)). Examples of said issues may include, but are not limited to, the failure in provisioning elastic workload configurations and the failure in provisioning performance optimization(s) onto the implemented workload(s) and/or the target infrastructure. Further, when incurred, said issues may lead to an inability to scale service instance(s) up and/or down; and inhibit the compliant placement of service instance(s) and/or data.

In Step 776, a determination is made as to whether one or more issues had been identified as a result of the verification (performed in Step 774). In one embodiment of the invention, if it is determined that at least one issue had been identified, then the method proceeds to Step 752 (described above) (see e.g., FIG. 7C). On the other hand, in another embodiment of the invention, if it is alternatively determined that zero issues had been identified, then the method alternatively proceeds to Step 778.

In Step 778, following the alternative determination (made in Step 776) that zero issues had been identified as a result of the verification (performed in Step 774), a set of desired service-level outcome post-checks is performed. Examples of the desired service-level outcome post-check(s) may include, but are not limited to, checking an elasticity (e.g., up or down scaling) of the implemented workload(s) based, at least in part, on performance metrics and/or pre-defined rules; checking overall target infrastructure functionality; checking overall workload functionality on the target infrastructure; and checking overall service-level functionality imposed over the workload(s) and/or target infrastructure.

Further, in performing the set of desired service-level outcome post-checks, zero or more issues may be identified. An issue may generally refer to a problem that may arise or manifest from an action (e.g., performance of the desired service-level outcome post-checks). Examples of said issues may include, but are not limited to, performance issue(s), compatibility issue(s), and functionality issue(s); failure to automate scaling benefitting any implemented service instances; and failure in meeting expected workload and/or target infrastructure performance goals.

In Step 780, a determination is made as to whether one or more issues had been identified as a result of the desired service-level outcome post-checks (performed in Step 778). In one embodiment of the invention, if it is determined that at least one issue had been identified, then the method proceeds to Step 752 (described above) (see e.g., FIG. 7C). On the other hand, in another embodiment of the invention, if it is alternatively determined that zero issues had been identified, then the method alternatively proceeds to Step 782.

In Step 782, following the alternative determination (made in Step 780) that zero issues had been identified as a result of the desired service-level outcome post-checks (performed in Step 778), the desired service-level, workload, and infrastructure outcomes, now implemented on the target infrastructure, are declared as successfully deployed.

Figure 8A:
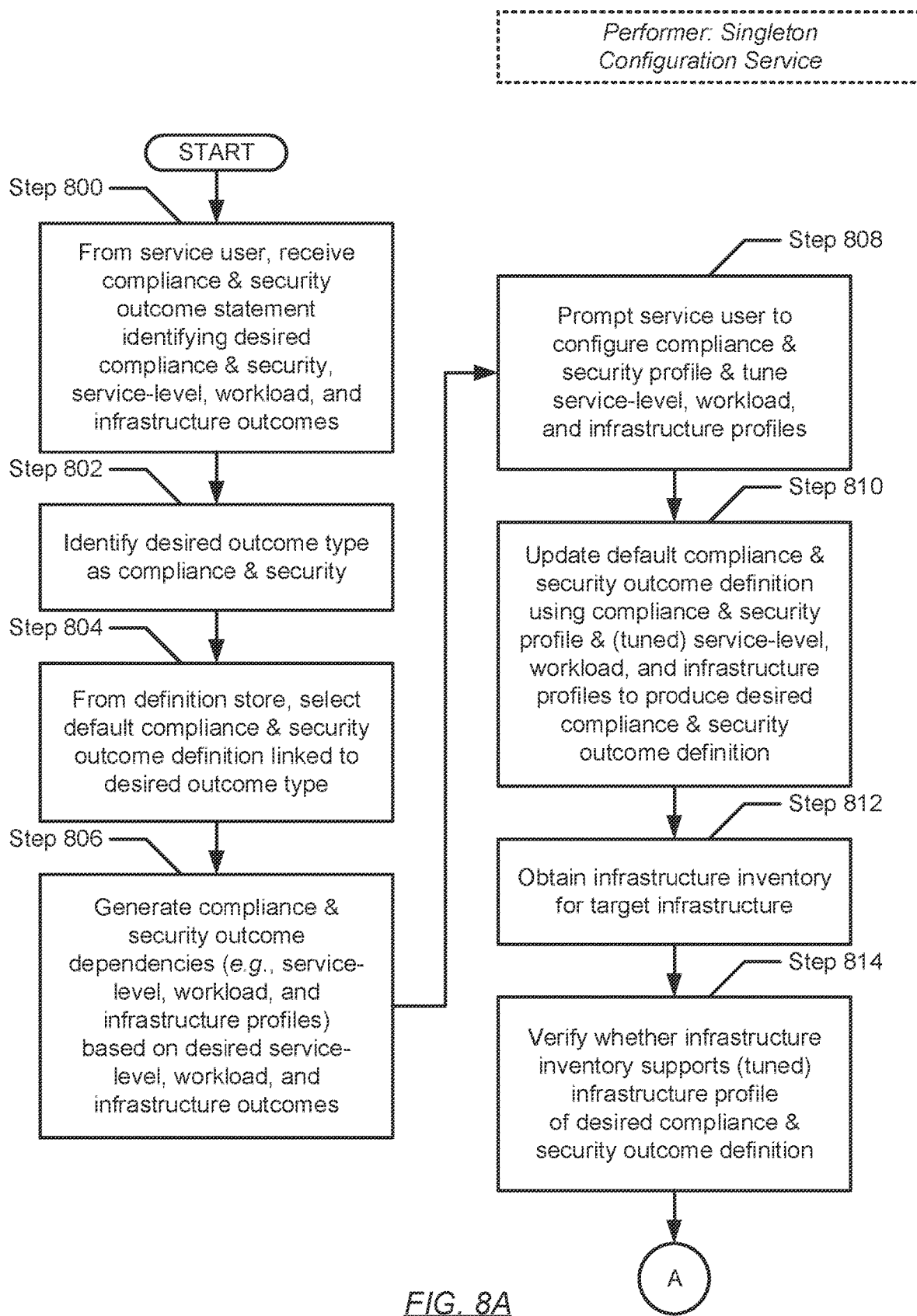
FIGS. 8A and 8B show a flowchart describing a method for outcome-based compliance and security configurations for information technology environments in accordance with one or more embodiments of the invention.
Figure 8B:
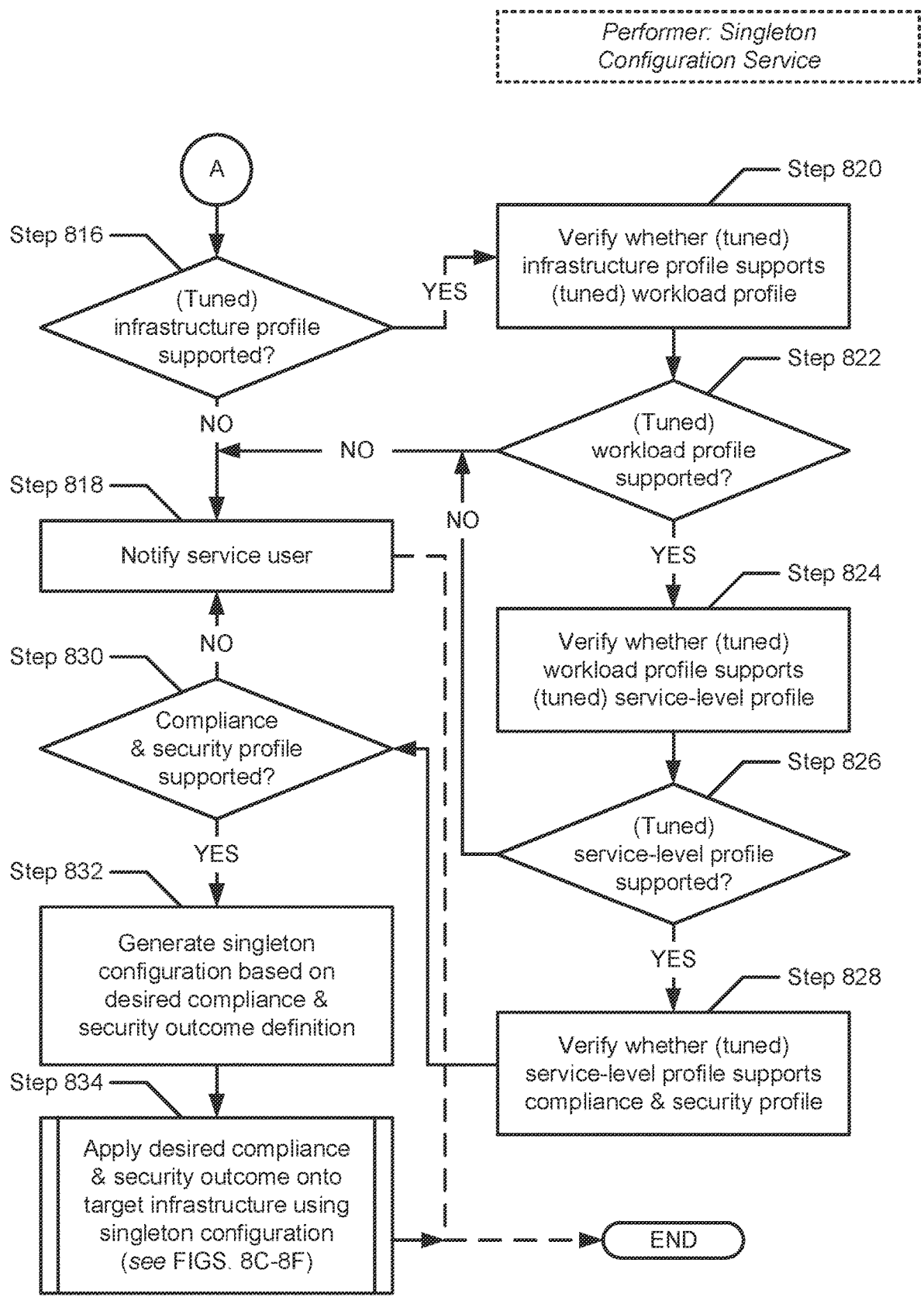

FIGS. 8A and 8B show a flowchart describing a method for outcome-based compliance and security configurations for information technology environments in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 8A, in Step 800, a compliance and security outcome statement is received from a service user. In one embodiment of the invention, the compliance and security outcome statement may refer to a vocal or written sentence that may express or identify the desired compliance and security, service-level, workload, and infrastructure outcomes sought by the service user. By way of an example, the sentence "deploy a database-as-a-service instance optimized to run 100K transactions per second with a 1 nanosecond (ns) response time on a hyper-converged infrastructure (HCI) cluster with five-nines data availability and data to be encrypted using Secure Hash Algorithm (SHA)-256 and to be placed in accordance with General Data Protection Regulation (GDPR) policies" may be representative of a compliance and security outcome statement, where: transforming a target (bare-metal) infrastructure into a HCI cluster expresses the desired infrastructure outcome; running a database-as-a-service instance on the implemented HCI cluster expresses the desired workload outcome; optimizing the implemented database-as-a-service instance to handle the specified number of transactions and have the required response time expresses the desired service-level outcome; and constraining the overall implemented system to the specified data availability and data encryption standards, as well as to the required regulatory policies, expresses the desired compliance and security outcome.

In Step 802, a desired outcome type is identified from the compliance and security outcome statement (received in Step 800). In one embodiment of the invention, with multiple desired outcomes—i.e., a desired compliance and security outcome, a desired service-level outcome, a desired workload outcome, and a desired infrastructure outcome—being referenced in the compliance and security outcome statement, the desired outcome type reflects that of the desired outcome associated with the higher overriding priority in the outcome hierarchy (see e.g., FIG. 2)—i.e., a compliance and security type.

In Step 804, a default compliance and security outcome definition is selected from a definition store (see e.g., FIG. 1). In one embodiment of the invention, the default compliance and security outcome definition may be linked to the desired outcome type (identified in Step 802). A compliance and security outcome definition (see e.g., FIG. 3C) may generally refer to a schema or data structure through which an outcome of the compliance and security type may be defined. Further, the default compliance and security outcome definition may outline a generic starting template or baseline from which any desired compliance and security outcome definition may be derived.

In Step 806, a set of compliance and security outcome dependencies is generated. In one embodiment of the invention, the set of compliance and security outcome dependencies may include a service-level profile, a workload profile, and an infrastructure profile (see e.g., FIG. 3D), which may be generated based on the desired service-level, workload, and infrastructure outcomes (expressed in Step 800), respectively.

In Step 808, the service user is prompted to configure a compliance and security profile (see e.g., FIG. 3D). In one embodiment of the invention, the compliance and security profile may refer to a description of security and/or regulatory constraints needed to, at least in part, implement the given compliance and security outcome. Examples of the security and/or regulatory constraint(s) specified in the compliance and security profile may include, but is/are not limited to, one or more data encryption policies indicating the sought enablement or disablement of data encryption to be imposed on data throughout the target infrastructure, and the sought data encryption algorithm (if encryption is enabled); one or more data accessibility policies indicating the sought data accessibility scheme (e.g., authorization token, etc.) to be imposed on data throughout the target infrastructure; and one or more data placement policies indicating the sought enablement or disablement of the compliance to regulatory privacy laws to be imposed on data throughout the target infrastructure, and the sought regulatory privacy laws (e.g., the European Union's GDPR, etc.) (if compliance is enabled).

In one embodiment of the invention, the service user may be further prompted to tune the set of compliance and security outcome dependencies (e.g., service-level, workload, and infrastructure profiles) (generated in Step 806). Tuning of any compliance and security outcome dependency may entail specifying any overrides to be applied to the compliance and security outcome dependency.

In Step 810, the default compliance and security outcome definition (selected in Step 804) is updated using the compliance and security profile and the set of compliance and security outcome dependencies (configured and tuned, respectively, in Step 808). In one embodiment of the invention, in updating (or populating) the default compliance and security outcome definition, a desired compliance and security outcome definition may be produced.

In Step 812, an infrastructure inventory, for a target infrastructure, is obtained. In one embodiment of the invention, the infrastructure inventory may refer to a data file or a data structure within which any number of hardware components, available throughout the target infrastructure, may be specified, along with respective metadata descriptive of each hardware component. For any given target infrastructure, the infrastructure inventory may, for example, specify any subset or all of the following hardware components and associated metadata: computer processor(s) (metadata—e.g., clock frequency, instructions per cycle, cache, number of cores, etc.); computer data storage (metadata—e.g., technology, volatility, latency, data mutability, capacity, etc.); and networking (metadata—e.g., connection type, uplink/downlink speed rating, bandwidth usage, throughput, latency, etc.).

In Step 814, a verification is performed with respect to whether the infrastructure profile (tuned in Step 808) is supported by the infrastructure inventory (obtained in Step 812). In one embodiment of the invention, the verification may entail cross-checking the physical (hardware) resources specified in the infrastructure inventory with the infrastructure outcome baseline and the set of infrastructure-relevant overrides (if any) specified in the infrastructure profile. Should the physical (hardware) resources, or any portion thereof, in the infrastructure inventory meet all of the infrastructure outcome baseline and the set of infrastructure-relevant overrides (if any) in the infrastructure profile, then the infrastructure inventory supports the infrastructure profile. On the other hand, should the physical (hardware) resources, or any portion thereof, in the infrastructure inventory meet less than all of the infrastructure outcome baseline and the set of infrastructure-relevant overrides (if any) in the infrastructure profile, then the infrastructure inventory does not support the infrastructure profile.

Turning to FIG. 8B, in Step 816, a determination is made as to whether the verification (performed in Step 814) rendered that the infrastructure inventory (obtained in Step 812) supports the infrastructure profile (tuned in Step 808). In one embodiment of the invention, if it is determined that the infrastructure profile is not supported, then the method proceeds to Step 818. On the other hand, in another embodiment of the invention, if it is alternatively determined that the infrastructure profile is supported, then the method alternatively proceeds to Step 820.

In Step 818, following the determination (made in Step 816) that the infrastructure inventory (obtained in Step 812) does not support the infrastructure profile (tuned in Step 808), the service user is notified of the determination and the method does not proceed further.

In Step 820, following the alternative determination (made in Step 816) that the infrastructure inventory (obtained in Step 812) does support the infrastructure profile (tuned in Step 808), a verification is performed with respect to whether the workload profile (tuned in Step 808) is supported by the infrastructure profile (tuned in Step 808). In one embodiment of the invention, the verification may entail cross-checking the infrastructure outcome baseline and the set of infrastructure-relevant overrides (if any) specified in the infrastructure profile with the requirements of the workload(s) (intended to run on the target infrastructure) and any relevant constraints specified in the workload profile. Should the infrastructure outcome baseline and the set of infrastructure-relevant overrides (if any) in the infrastructure profile meet all of the workload requirements and any relevant constraints in the workload profile, then the infrastructure profile supports the workload profile. On the other hand, should the infrastructure outcome baseline and the set of infrastructure-relevant overrides (if any) in the infrastructure profile meet less than all of the workload requirements and any relevant constraints in the workload profile, then the infrastructure profile does not support the workload profile.

In Step 822, a determination is made as to whether the verification (performed in Step 820) rendered that the infrastructure profile (tuned in Step 808) supports the workload profile (tuned in Step 808). In one embodiment of the invention, if it is determined that the workload profile is not supported, then the method proceeds to Step 818 (described above). On the other hand, in another embodiment of the invention, if it is alternatively determined that the workload profile is supported, then the method alternatively proceeds to Step 824.

In Step 824, following the alternative determination (made in Step 822) that the infrastructure profile (tuned in Step 808) does support the workload profile (tuned in Step 808), a verification is performed with respect to whether the service-level profile (tuned in Step 808) is supported by the workload profile (tuned in Step 808). In one embodiment of the invention, the verification may entail cross-checking the workload outcome baseline and the set of workload-relevant overrides (if any) specified in the workload profile with the service-level agreement (SLA) or performance requirements specified in the service-level profile. Should the workload outcome baseline and the set of workload-relevant overrides (if any) in the workload profile meet all of the service-level agreement (SLA) or performance requirements in the workload profile, then the workload profile supports the service-level profile. On the other hand, should the workload outcome baseline and the set of workload-relevant overrides (if any) in the workload profile meet less than all of the service-level agreement (SLA) or performance requirements in the service-level profile, then the workload profile does not support the service-level profile.

In Step 826, a determination is made as to whether the verification (performed in Step 824) rendered that the workload profile (tuned in Step 808) supports the service-level profile (tuned in Step 808). In one embodiment of the invention, if it is determined that the service-level profile is not supported, then the method proceeds to Step 818 (described above). On the other hand, in another embodiment of the invention, if it is alternatively determined that the service-level profile is supported, then the method alternatively proceeds to Step 828.

In Step 828, following the alternative determination (made in Step 826) that the workload profile (tuned in Step 808) does support the service-level profile (tuned in Step 808), a verification is performed with respect to whether the compliance and security profile (configured in Step 808) is supported by the service-level profile (tuned in Step 808). In one embodiment of the invention, the verification may entail cross-checking the service-level outcome baseline and the set of service-level-relevant overrides (if any) specified in the service-level profile with the security and/or regulatory constraints specified in the compliance and security profile. Should the service-level outcome baseline and the set of service-level-relevant overrides (if any) in the service-level profile meet all of the security and/or regulatory constraints in the compliance and security profile, then the service-level profile supports the compliance and security profile. On the other hand, should the service-level outcome baseline and the set of service-level-relevant overrides (if any) in the service-level profile meet less than all of the security and/or regulatory constraints in the compliance and security profile, then the service-level profile does not support the compliance and security profile.

In Step 830, a determination is made as to whether the verification (performed in Step 828) rendered that the service-level profile (tuned in Step 808) supports the compliance and security profile (configured in Step 808). In one embodiment of the invention, if it is determined that the compliance and security profile is not supported, then the method proceeds to Step 818 (described above). On the other hand, in another embodiment of the invention, if it is alternatively determined that the compliance and security profile is supported, then the method alternatively proceeds to Step 832.

In Step 832, following the alternative determination (made in Step 830) that the service-level profile (tuned in Step 808) does support the compliance and security profile (configured in Step 808), a singleton configuration is generated. In one embodiment of the invention, generation of the singleton configuration may rely on the desired compliance and security outcome definition (produced in Step 810). Details outlining the generation of a singleton configuration from any outcome definition is described with respect to FIG. 4, above.

In Step 834, the desired compliance and security, service-level, workload, and infrastructure outcomes (expressed in Step 800) are applied onto the target infrastructure using the singleton configuration (generated in Step 832). Said application of the desired compliance and security, service-level, workload, and infrastructure outcomes is described in further detail with respect to FIGS. 8C-8F, below.

FIGS. 8C-8F show a flowchart describing a method for applying a desired compliance and security outcome onto a target infrastructure using a singleton configuration in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Figure 8C:
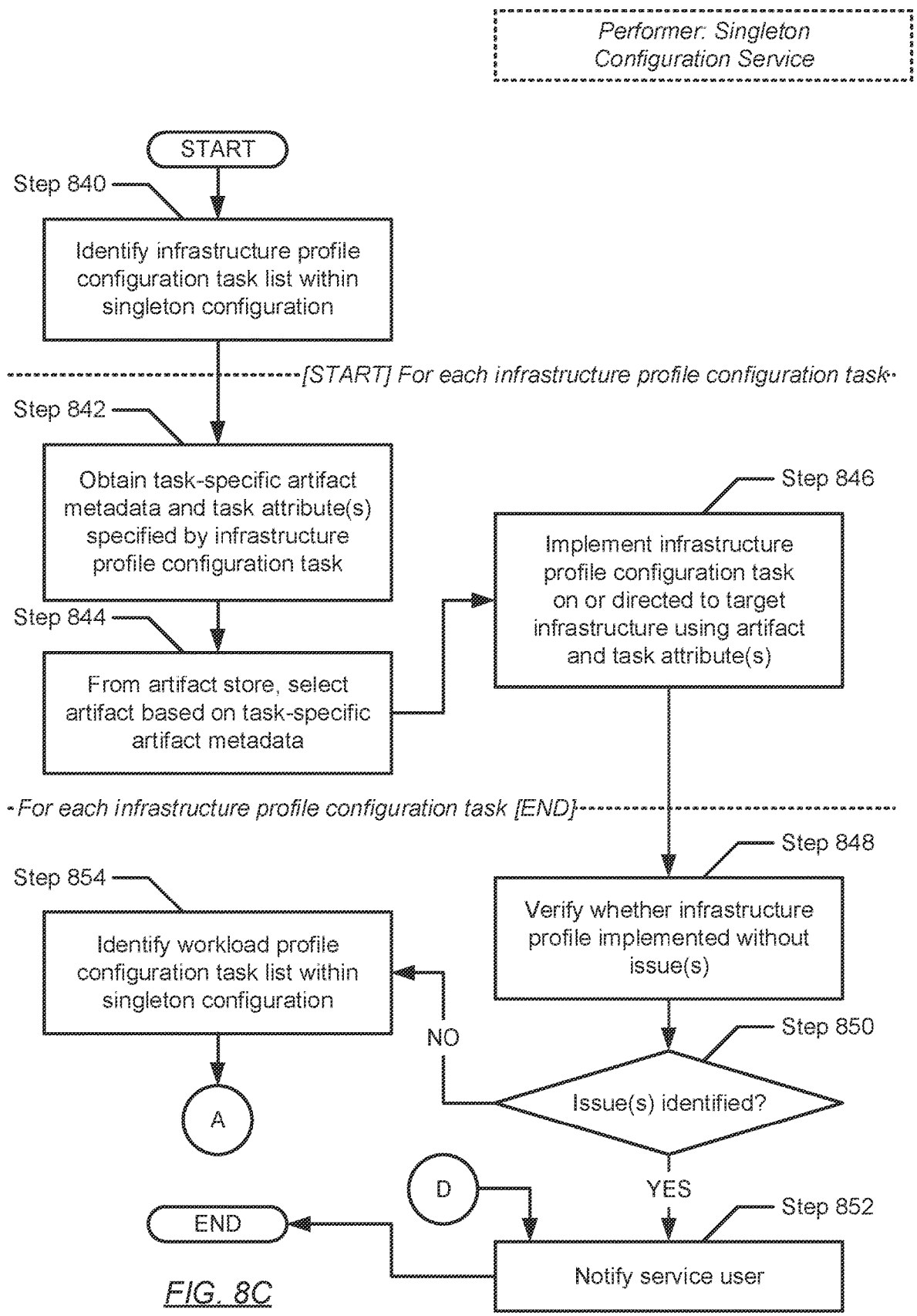

Turning to FIG. 8C, in Step 840, an infrastructure profile configuration task list is identified within a singleton configuration. In one embodiment of the invention, the singleton configuration may pertain to the application of desired infrastructure, workload, service-level, and compliance and security outcomes onto a target infrastructure. Further, the infrastructure profile configuration task list may refer to a set of configuration tasks necessary to implement an infrastructure profile of a desired compliance and security outcome definition (see e.g., FIG. 3D).

The following three steps (i.e., Step 842, 844, and 846) are to be performed sequentially, thus forming an iteration, for each configuration task of the infrastructure profile configuration task list (identified in Step 840). That is, a first iteration of these three steps may be performed for a first configuration task; a second iteration of these steps may be performed for a second configuration task; and so forth, including a last iteration of these steps that may be performed for a last configuration task.

In Step 842, an infrastructure profile configuration task is assessed to obtain task-specific artifact metadata and a set of task attributes specified there-within. In one embodiment of the invention, the task-specific artifact metadata may refer to information descriptive of an artifact needed to implement the infrastructure profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the infrastructure profile configuration task. Said configuration parameter may also represent one of the set of inputs pertinent to the operation of the artifact referenced by the task-specific artifact metadata.

In Step 844, an artifact is selected from the artifact store based on at least a portion (i.e., the above-mentioned storage location) of the task-specific artifact metadata (obtained in Step 842).

In Step 846, the infrastructure profile configuration task is implemented on or directed to the target infrastructure using the artifact (selected in Step 844) and the set of task attributes (obtained in Step 842), where the latter may serve as input(s) to the artifact.

In Step 848, a verification is performed with respect to whether the infrastructure profile had been implemented without issue(s). In one embodiment of the invention, an issue may generally refer to a problem that may arise or manifest from an action (e.g., the implementation of infrastructure profile configuration task list (identified in Step 840)). Examples of said issues may include, but are not limited to, the failure of an update due to a corrupt binary image, the failure of an update due to one or many component functionality issues, the incorrect input of configuration parameters provided through human error, and the detection of error(s) in any automation packages. Further, when incurred, the issue(s) may shift the target infrastructure, in whole or in part, and/or the cluster(s) formed therefrom into a non-functional or non-compliant state; may induce performance issues within the target infrastructure; may lead to an inability to monitor the target infrastructure (e.g., for outcome drift); and may lead to an inability to collect relevant telemetry that may be used for future analysis(es) and/or forecasting.

In Step 850, a determination is made as to whether one or more issues had been identified as a result of the verification (performed in Step 848). In one embodiment of the invention, if it is determined that at least one issue had been identified, then the method proceeds to Step 852. On the other hand, in another embodiment of the invention, if it is alternatively determined that zero issues had been identified, then the method alternatively proceeds to Step 854.

In Step 852, following the determination (made in Step 850) that at least one issue had been identified as a result of the verification (performed in Step 848), a service user is notified of the issue(s) and the method does not proceed further.

In Step 854, following the alternative determination (made in Step 850) that zero issues had been identified as a result of the verification (performed in Step 848), a workload profile configuration task list is identified within the singleton configuration. In one embodiment of the invention, the workload profile configuration task list may refer to a set of configuration tasks necessary to implement a workload profile of the desired compliance and security outcome definition (see e.g., FIG. 3D).

Figure 8D:
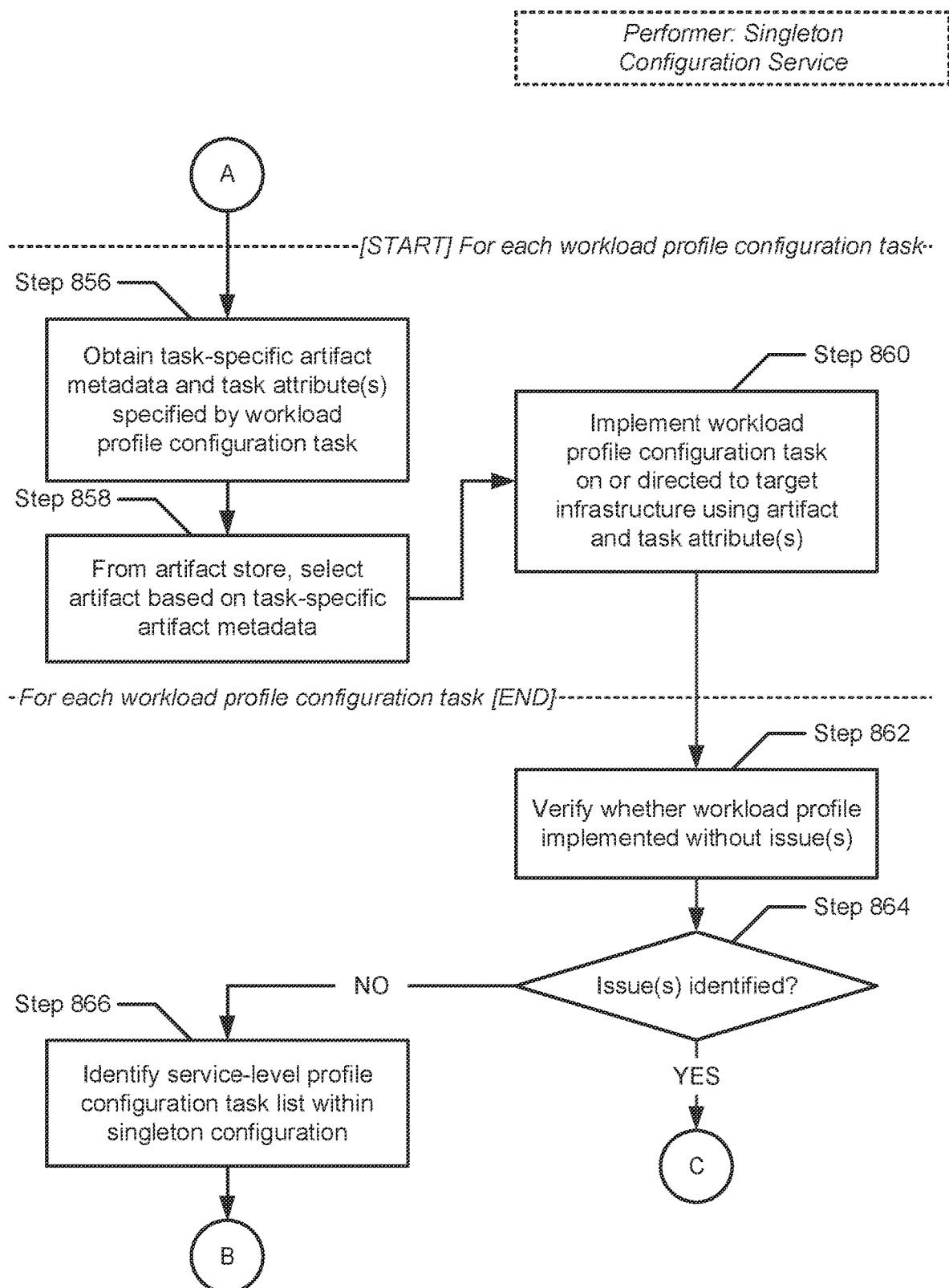

Turning to FIG. 8D, the following three steps (i.e., Step 856, 858, and 860) are to be performed sequentially, thus forming an iteration, for each configuration task of the workload profile configuration task list (identified in Step 854). That is, a first iteration of these three steps may be performed for a first configuration task; a second iteration of these steps may be performed for a second configuration task; and so forth, including a last iteration of these steps that may be performed for a last configuration task.

In Step 856, a workload profile configuration task is assessed to obtain task-specific artifact metadata and a set of task attributes specified there-within. In one embodiment of the invention, the task-specific artifact metadata may refer to information descriptive of an artifact needed to implement the workload profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the workload profile configuration task. Said configuration parameter may also represent one of the set of inputs pertinent to the operation of the artifact referenced by the task-specific artifact metadata.

In Step 858, an artifact is selected from the artifact store based on at least a portion (i.e., the above-mentioned storage location) of the task-specific artifact metadata (obtained in Step 856).

In Step 860, the workload profile configuration task is implemented on or directed to the target infrastructure using the artifact (selected in Step 858) and the set of task attributes (obtained in Step 856), where the latter may serve as input(s) to the artifact.

In Step 862, a verification is performed with respect to whether the workload profile had been implemented without issue(s). In one embodiment of the invention, an issue may generally refer to a problem that may arise or manifest from an action (e.g., the implementation of workload profile configuration task list (identified in Step 854)). Examples of said issues may include, but are not limited to, the incomplete installation of one or many desired workload(s) on the target infrastructure. Further, when incurred, the issue(s) may render the target infrastructure, in whole or in part, non-functional and/or non-compliant.

In Step 864, a determination is made as to whether one or more issues had been identified as a result of the verification (performed in Step 862). In one embodiment of the invention, if it is determined that at least one issue had been identified, then the method proceeds to Step 852 (described above) (see e.g., FIG. 8C). On the other hand, in another embodiment of the invention, if it is alternatively determined that zero issues had been identified, then the method alternatively proceeds to Step 866.

In Step 866, following the alternative determination (made in Step 864) that zero issues had been identified as a result of the verification (performed in Step 862), a service-level profile configuration task list is identified within the singleton configuration. In one embodiment of the invention, the service-level profile configuration task list may refer to a set of configuration tasks necessary to implement a service-level profile of the desired compliance and security outcome definition (see e.g., FIG. 3D).

Figure 8E:
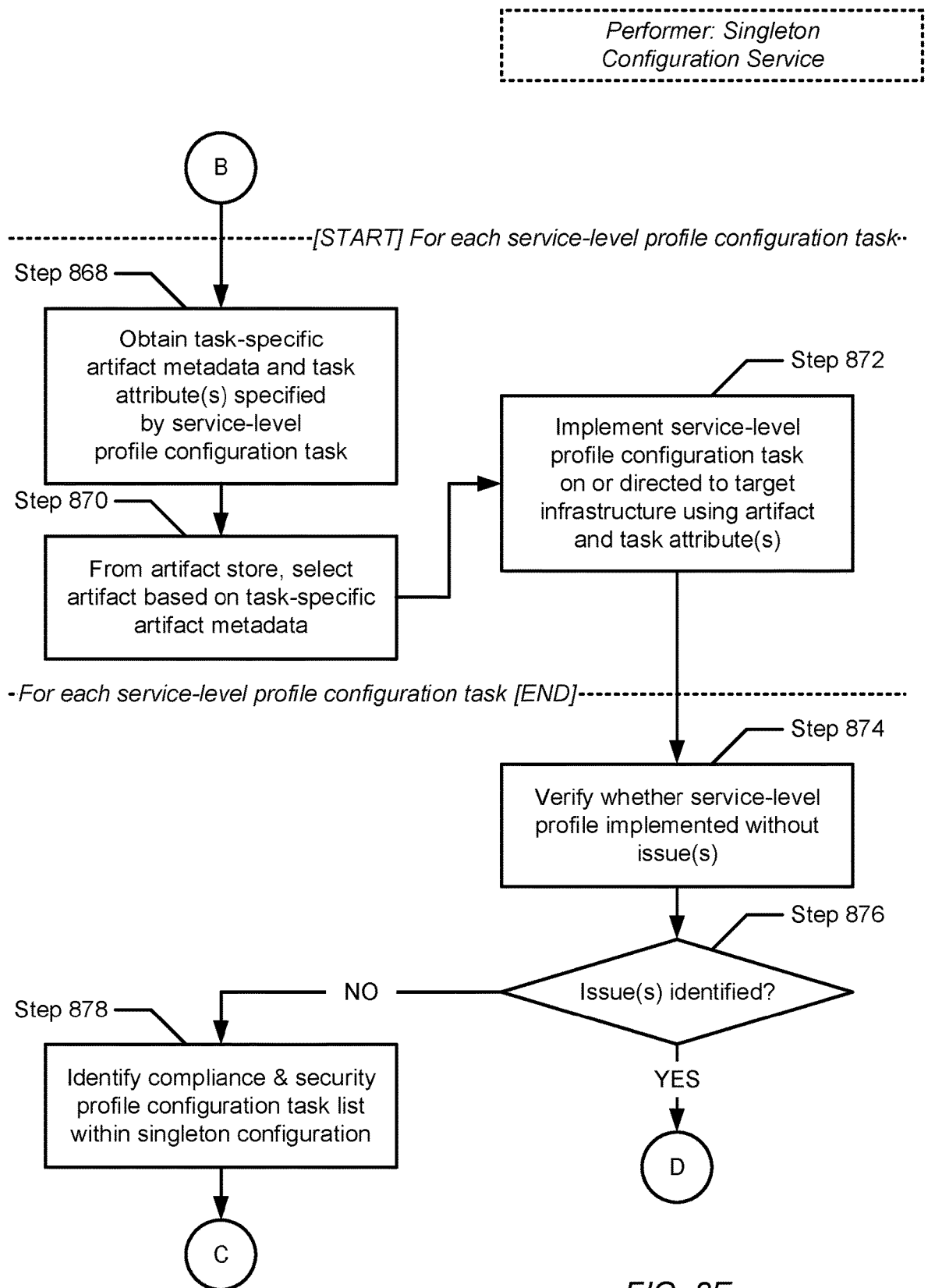
Figure 8E:
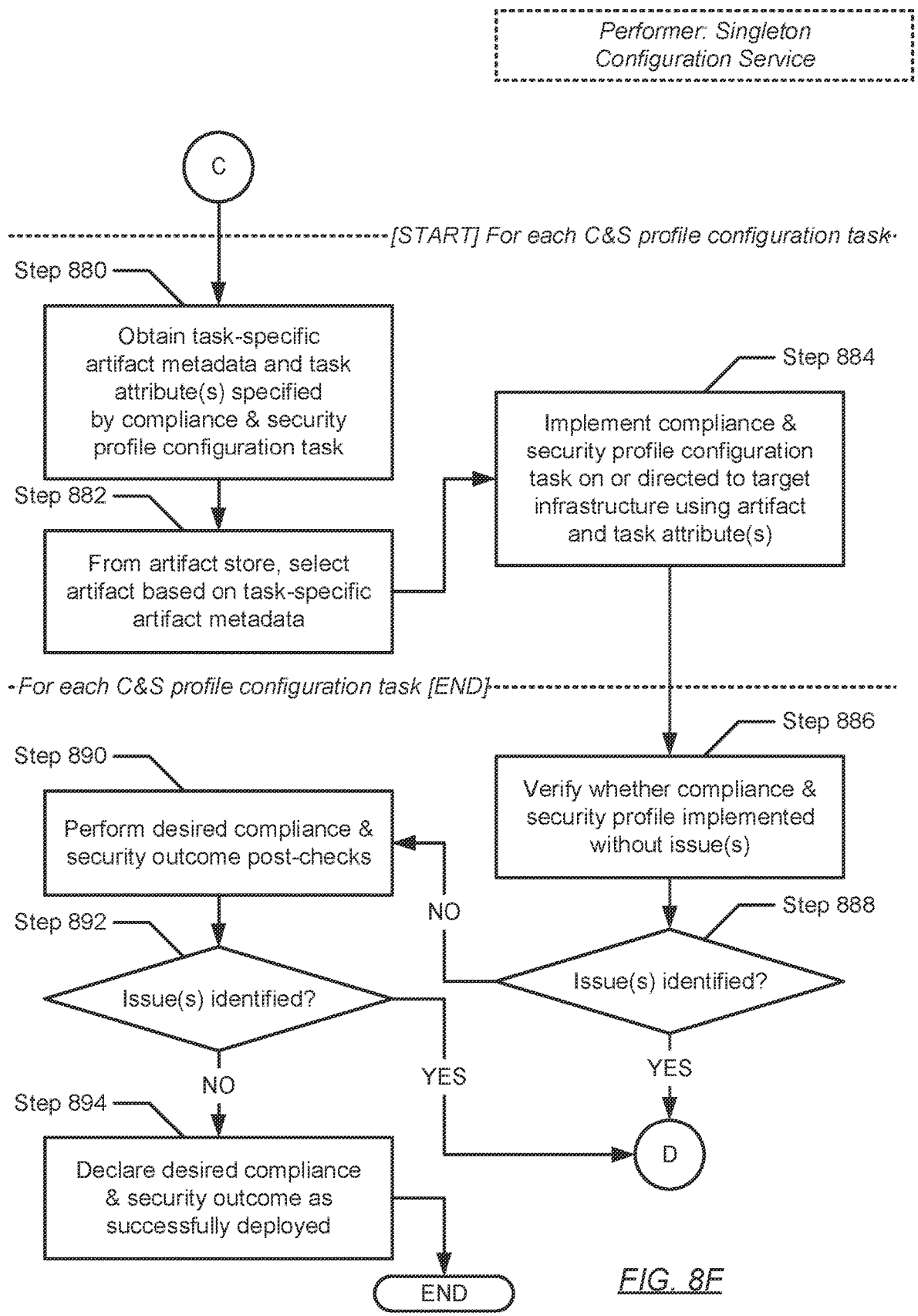

Turning to FIG. 8E, the following three steps (i.e., Step 868, 870, and 872) are to be performed sequentially, thus forming an iteration, for each configuration task of the service-level profile configuration task list (identified in Step 866). That is, a first iteration of these three steps may be performed for a first configuration task; a second iteration of these steps may be performed for a second configuration task; and so forth, including a last iteration of these steps that may be performed for a last configuration task.

In Step 868, a service-level profile configuration task is assessed to obtain task-specific artifact metadata and a set of task attributes specified there-within. In one embodiment of the invention, the task-specific artifact metadata may refer to information descriptive of an artifact needed to implement the service-level profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the service-level profile configuration task. Said configuration parameter may also represent one of the set of inputs pertinent to the operation of the artifact referenced by the task-specific artifact metadata.

In Step 870, an artifact is selected from the artifact store based on at least a portion (i.e., the above-mentioned storage location) of the task-specific artifact metadata (obtained in Step 868).

In Step 872, the service-level profile configuration task is implemented on or directed to the target infrastructure using the artifact (selected in Step 870) and the set of task attributes (obtained in Step 868), where the latter may serve as input(s) to the artifact.

In Step 874, a verification is performed with respect to whether the service-level profile had been implemented without issue(s). In one embodiment of the invention, an issue may generally refer to a problem that may arise or manifest from an action (e.g., the implementation of service-level profile configuration task list (identified in Step 866)). Examples of said issues may include, but are not limited to, the failure in provisioning elastic workload configurations and the failure in provisioning performance optimization(s) onto the implemented workload(s) and/or the target infrastructure. Further, when incurred, said issues may lead to an inability to scale service instance(s) up and/or down; and inhibit the compliant placement of service instance(s) and/or data.

In Step 876, a determination is made as to whether one or more issues had been identified as a result of the verification (performed in Step 874). In one embodiment of the invention, if it is determined that at least one issue had been identified, then the method proceeds to Step 852 (described above) (see e.g., FIG. 8C). On the other hand, in another embodiment of the invention, if it is alternatively determined that zero issues had been identified, then the method alternatively proceeds to Step 878.

In Step 878, following the alternative determination (made in Step 876) that zero issues had been identified as a result of the verification (performed in Step 874), a compliance and security profile configuration task list is identified within the singleton configuration. In one embodiment of the invention, the compliance and security profile configuration task list may refer to a set of configuration tasks necessary to implement a compliance and security profile of the desired compliance and security outcome definition (see e.g., FIG. 3D).

Turning to FIG. 8F, the following three steps (i.e., Step 880, 882, and 884) are to be performed sequentially, thus forming an iteration, for each configuration task of the compliance and security profile configuration task list (identified in Step 878). That is, a first iteration of these three steps may be performed for a first configuration task; a second iteration of these steps may be performed for a second configuration task; and so forth, including a last iteration of these steps that may be performed for a last configuration task.

In Step 880, a compliance and security profile configuration task is assessed to obtain task-specific artifact metadata and a set of task attributes specified there-within. In one embodiment of the invention, the task-specific artifact metadata may refer to information descriptive of an artifact needed to implement the service-level profile configuration task. Said information may include, but is not limited to, a storage location within an artifact store (see e.g., FIG. 1) where the artifact may be stored; and operational instructions for employing the artifact, including a set of inputs pertinent to the operation of the artifact. Meanwhile, each task attribute of the set of task attributes may refer to a configuration parameter pertinent to the compliance and security profile configuration task. Said configuration parameter may also represent one of the set of inputs pertinent to the operation of the artifact referenced by the task-specific artifact metadata.

In Step 882, an artifact is selected from the artifact store based on at least a portion (i.e., the above-mentioned storage location) of the task-specific artifact metadata (obtained in Step 880).

In Step 884, the compliance and security profile configuration task is implemented on or directed to the target infrastructure using the artifact (selected in Step 882) and the set of task attributes (obtained in Step 880), where the latter may serve as input(s) to the artifact.

In Step 886, a verification is performed with respect to whether the compliance and security profile had been implemented without issue(s). In one embodiment of the invention, an issue may generally refer to a problem that may arise or manifest from an action (e.g., the implementation of compliance and security profile configuration task list (identified in Step 878)). Examples of said issues may include, but are not limited to, failure in installing the sought compliance and/or security policies. Further, when incurred, the issue(s) may hamper service instance and/or data access due to authorization difficulties.

In Step 888, a determination is made as to whether one or more issues had been identified as a result of the verification (performed in Step 886). In one embodiment of the invention, if it is determined that at least one issue had been identified, then the method proceeds to Step 852 (described above) (see e.g., FIG. 8C). On the other hand, in another embodiment of the invention, if it is alternatively determined that zero issues had been identified, then the method alternatively proceeds to Step 890.

In Step 890, following the alternative determination (made in Step 888) that zero issues had been identified as a result of the verification (performed in Step 886), a set of desired compliance and security outcome post-checks is performed. Examples of the desired compliance and security outcome post-check(s) may include, but are not limited to, checking service instance and/or data placement on the target infrastructure is/are in compliance with policies; ensuring the inability for unauthorized access to service instance(s) and/or data; checking overall target infrastructure functionality; checking overall workload functionality on the target infrastructure; checking overall service-level functionality imposed over the workload(s) and/or target infrastructure; and checking overall compliance and security policy enforcement.

Further, in performing the set of desired compliance and security outcome post-checks, zero or more issues may be identified. An issue may generally refer to a problem that may arise or manifest from an action (e.g., performance of the desired compliance and security outcome post-checks). Examples of said issues may include, but are not limited to, performance issue(s), compatibility issue(s), and functionality issue(s); failure to automate scaling benefitting any implemented service instances; failure in meeting expected workload and/or target infrastructure performance goals; the unauthorized access of service instance(s) and/or data on the target infrastructure; and non-compliance concerning service instance and/or data placement in accordance with policies.

In Step 892, a determination is made as to whether one or more issues had been identified as a result of the desired compliance and security outcome post-checks (performed in Step 890). In one embodiment of the invention, if it is determined that at least one issue had been identified, then the method proceeds to Step 852 (described above) (see e.g., FIG. 8C). On the other hand, in another embodiment of the invention, if it is alternatively determined that zero issues had been identified, then the method alternatively proceeds to Step 894.

In Step 894, following the alternative determination (made in Step 892) that zero issues had been identified as a result of the desired compliance and security outcome post-checks (performed in Step 890), the desired compliance and security, service-level, workload, and infrastructure outcomes, now implemented on the target infrastructure, are declared as successfully deployed.

Figure 9A:
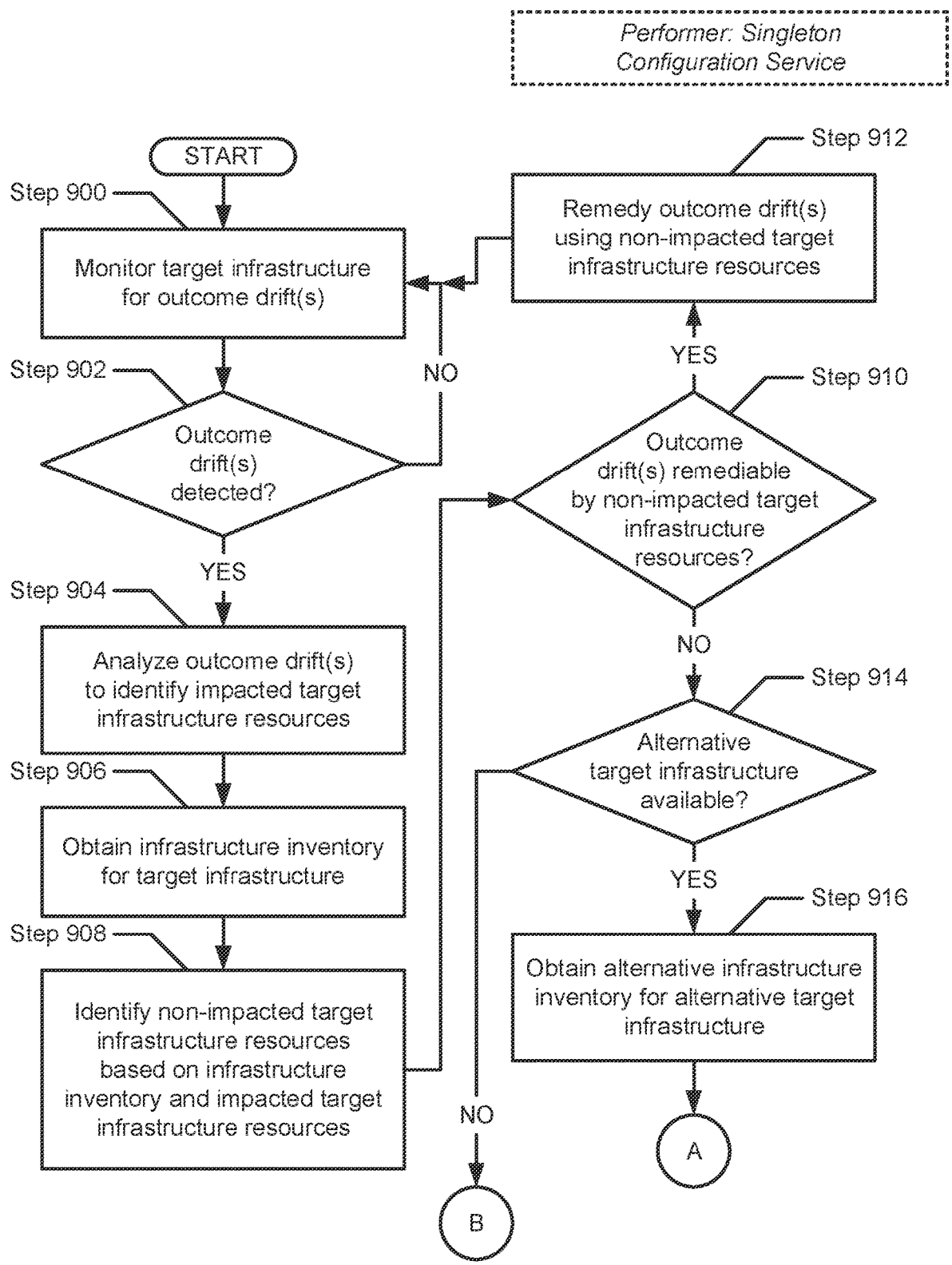
FIGS. 9A and 9B show a flowchart describing a method for drift remediation of outcome-based configurations for information technology environments in accordance with one or more embodiments of the invention.
Figure 9B:
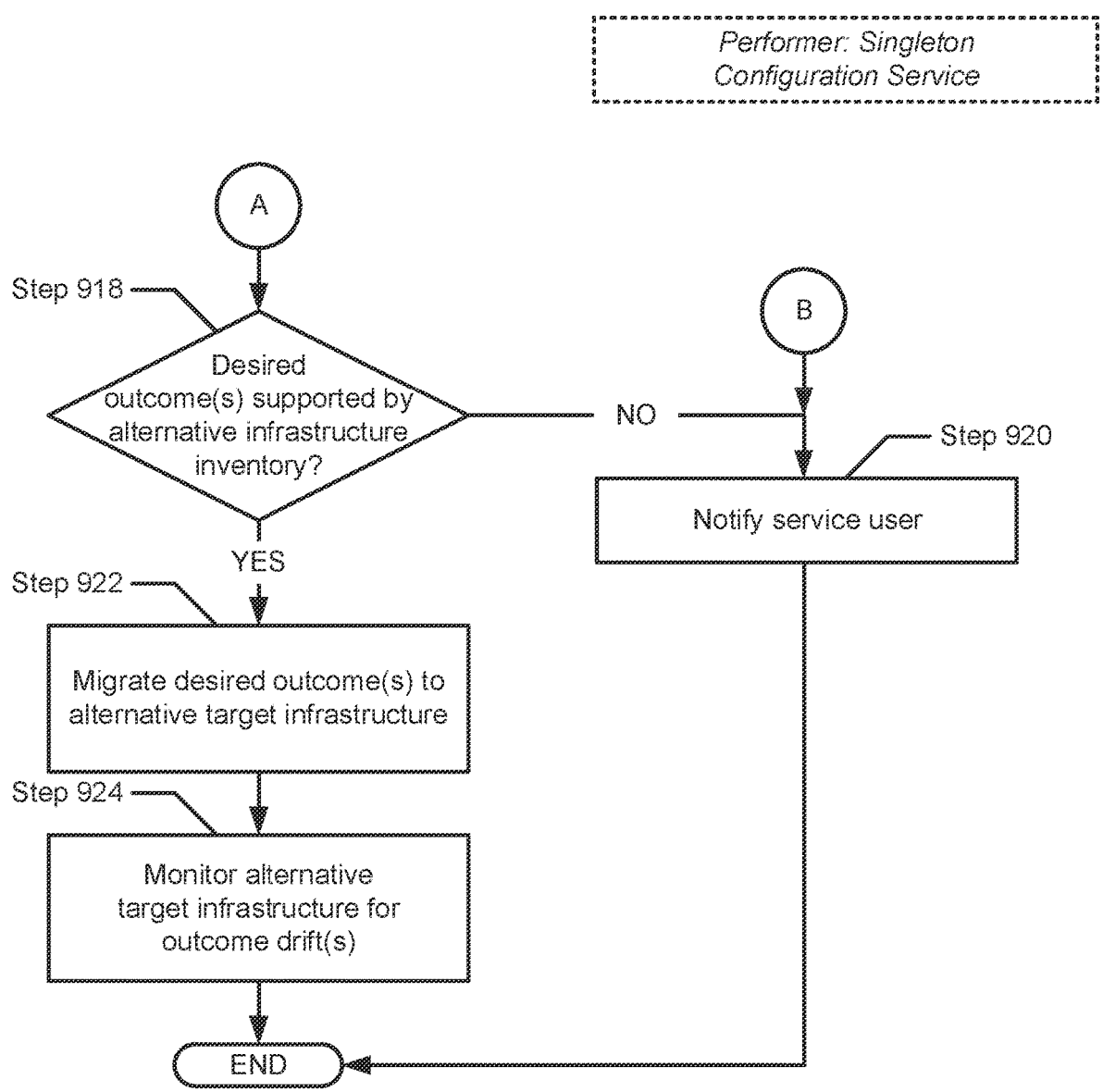

FIGS. 9A and 9B show a flowchart describing a method for drift remediation of outcome-based configurations for information technology environments in accordance with one or more embodiments of the invention. The various steps outlined below may be performed by the singleton configuration service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 9A, in Step 900, a target infrastructure is monitored for one or more outcome drifts. In one embodiment of the invention, the target infrastructure may have one or more of the following outcomes implemented thereon: a desired infrastructure outcome; a desired workload outcome; a desired service-level outcome; and/or a desired compliance and security outcome. Further, an outcome drift may refer to a change from a desired state on the target infrastructure that had been implemented thereon by one or more outcomes.

In Step 902, a determination is made as to whether one or more outcome drifts have been detected. In one embodiment of the invention, if it is determined that zero outcome drifts have been detected, then the method proceeds to Step 900 (described above). On the other hand, in another embodiment of the invention, if it is alternatively determined that at least one outcome drift has been detected, then the method alternatively proceeds to Step 904.

In Step 904, following the alternative determination (made in Step 902) that at least one outcome drift has been detected on the target infrastructure (monitored in Step 900), the outcome drift(s) is/are analyzed to identify a set of impacted target infrastructure resources. In one embodiment of the invention, an impacted target infrastructure resource may refer to a physical (hardware) component, provisioned or allocated to support one or more implemented outcomes, which may have experienced a problem. The experienced problem may include, but is not limited to, damage incurred through lack of maintenance or other environmental factors; and partial or complete failure caused by any number of known hardware failure triggers. Further, the experienced problem may have directly or indirectly influenced the outcome drift(s).

In Step 906, an infrastructure inventory, for the target infrastructure, is obtained. In one embodiment of the invention, the infrastructure inventory may refer to a data file or a data structure within which any number of hardware components, available throughout the target infrastructure, may be specified, along with respective metadata descriptive of each hardware component. For any given target infrastructure, the infrastructure inventory may, for example, specify any subset or all of the following hardware components and associated metadata: computer processor(s) (metadata—e.g., clock frequency, instructions per cycle, cache, number of cores, etc.); computer data storage (metadata—e.g., technology, volatility, latency, data mutability, capacity, etc.); and networking (metadata—e.g., connection type, uplink/downlink speed rating, bandwidth usage, throughput, latency, etc.).

In Step 908, a set of non-impacted target infrastructure resources is identified. In one embodiment of the invention, a non-impacted target infrastructure resource may refer to a physical (hardware) component, yet to be provisioned or allocated to support one or more implemented outcomes and, accordingly, can be provisioned/allocated if necessary to address scalability and an equivalent or similar, yet defective, physical (hardware) component (e.g., an impacted target infrastructure resource).

In Step 910, a determination is made as to whether the outcome drift(s) (analyzed in Step 904) is/are remediable by the non-impacted target infrastructure resources (identified in Step 908). The determination may entail verifying whether any given non-impacted target infrastructure resource can replace any given equivalent or similar, yet defective, impacted target infrastructure resource; and further, verify whether the given non-impacted target infrastructure resource can support the desired outcome(s) implemented on the target infrastructure in place of the given impacted target infrastructure resource. To that end, in one embodiment of the invention, if it is determined that the outcome drift(s) can be remedied using the non-impacted target infrastructure resources, then the method proceeds to Step 912. On the other hand, in another embodiment of the invention, if it is determined that the outcome drift(s) cannot be remedied using the non-impacted target infrastructure resources, then the method alternatively proceeds to Step 914.

In Step 912, following the determination (made in Step 910) that the outcome drift(s) (analyzed in Step 904) can be remedied using the non-impacted target infrastructure resources (identified in Step 908), the outcome drift(s) is/are thus remedied accordingly. From here, the method proceeds to Step 900 (described above).

In Step 914, following the alternative determination (made in Step 910) that the outcome drift(s) (analyzed in Step 904) cannot be remedied using the non-impacted target infrastructure resources (identified in Step 908), a determination is made as to whether an alternative target infrastructure is available. An alternative target infrastructure (if available) may refer to any substitute bare-metal IT environment, also belonging to the same single IT customer or tenant to which the target infrastructure belongs, which may or may not include the same components, features, and/or capabilities of the target infrastructure. Accordingly, in one embodiment of the invention, if it is determined that an alternative target infrastructure is available, then the method proceeds to Step 916. On the other hand, in another embodiment of the invention, if it is alternatively determined that an alternative target infrastructure is not available, then the method alternatively proceeds to Step 920 (see e.g., FIG. 9B).

In Step 916, following the determination (made in Step 914) that an alternative target infrastructure is available, an alternative infrastructure inventory, for the alternative target infrastructure, is obtained. In one embodiment of the invention, the alternative infrastructure inventory may refer to a data file or a data structure within which any number of hardware components, available throughout the alternative target infrastructure, may be specified, along with respective metadata descriptive of each hardware component. For any given alternative target infrastructure, the alternative infrastructure inventory may, for example, specify any subset or all of the following hardware components and associated metadata: computer processor(s) (metadata—e.g., clock frequency, instructions per cycle, cache, number of cores, etc.); computer data storage (metadata—e.g., technology, volatility, latency, data mutability, capacity, etc.); and networking (metadata—e.g., connection type, uplink/downlink speed rating, bandwidth usage, throughput, latency, etc.).

Turning to FIG. 9B, in Step 918, a determination is made as to whether the desired outcome(s) (e.g. a desired infrastructure outcome; a desired workload outcome; a desired service-level outcome; and/or a desired compliance and security outcome) implemented on the target infrastructure is/are supported by the alternative infrastructure inventory (obtained in Step 916) (described above) (see e.g., FIG. 9A). The determination may entail cross-checking the physical (hardware) resources specified in the alternative infrastructure inventory with the information specified in the desired outcome(s). Further, the specified information may differ depending on the constituent profiles (see e.g., FIGS. 3A-3D) pertinent to the outcome definition of the desired outcome. Generally, however, should the physical (hardware) resources, or any portion thereof, in the alternative infrastructure inventory meet all of the specified information associated with the desired outcome(s), then the alternative infrastructure inventory supports the desired outcome(s). On the other hand, should the physical (hardware) resources, or any portion thereof, in the alternative infrastructure inventory meet less than all of the specified information associated with the desired outcome(s), then the alternative infrastructure inventory does not support the desired outcome(s). Accordingly, in one embodiment of the invention, if it is determined that the desired outcome(s) is/are not supported, then the method proceeds to Step 920. On the other hand, in another embodiment of the invention, if it is alternatively determined that the desired outcome(s) is/are supported, then the method alternatively proceeds to Step 922.

In Step 920, following the determination (made in Step 918) that the alternative infrastructure inventory (obtained in Step 916) (see e.g., FIG. 9A) does not support the desired outcome(s) implemented on the target infrastructure, the service user is notified of the determination and the method does not proceed further.

In Step 922, following the alternative determination (made in Step 918) that the alternative infrastructure inventory (obtained in Step 916) (see e.g., FIG. 9A) does support the desired outcome(s) implemented on the target infrastructure, the desired outcome(s) is/are thus migrated to the alternative target infrastructure. In one embodiment of the invention, migration of the desired outcome(s) onto the alternative target infrastructure may entail: obtaining a singleton configuration including a set of profile configuration task lists for each desired outcome; and based on an outcome hierarchy arranging the desired outcome(s) (see e.g., FIG. 2), implementing, in accordance with an order of implementation associated with the outcome hierarchy, each desired outcome onto the alternative target infrastructure using the set of profile configuration task lists for the desired outcome.

In Step 924, the alternative target infrastructure is subsequently monitored for one or more outcome drifts (described above). Hereafter, though not shown in the flowchart, the method may proceed to Step 902, where steps therefrom may be performed with the alternative target infrastructure as the (new) target infrastructure.

Figure 10:
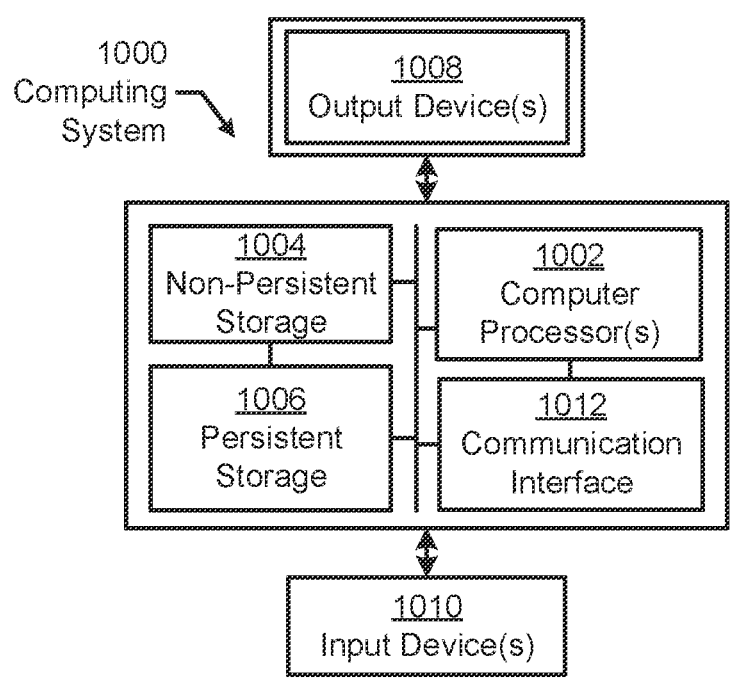
FIG. 10 shows an exemplary computing system in accordance with one or more embodiments of the invention.

FIG. 10 shows an exemplary computing system in accordance with one or more embodiments of the invention. The computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), input devices (1010), output devices (1008), and numerous other elements (not shown) and functionalities. Each of these components is described below.

In one embodiment of the invention, the computer processor(s) (1002) may be an integrated circuit for processing instructions. For example, the computer processor(s) may be one or more cores or micro-cores of a central processing unit (CPU) and/or a graphics processing unit (GPU). The computing system (1000) may also include one or more input devices (1010), such as a touchscreen, keyboard, mouse, microphone, touchpad, electronic pen, or any other type of input device. Further, the communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

In one embodiment of the invention, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing outcome-based compliance and security configurations, the method comprising:
   receiving, from a service user, an outcome statement comprising a set of desired outcomes, wherein the set of desired outcomes comprises a desired compliance and security outcome, a desired service-level outcome, a desired workload outcome, and a desired infrastructure outcome;
   identifying an outcome type associated with the outcome statement, wherein the outcome type reflects a compliance and security type;
   selecting a default compliance and security outcome definition linked to the outcome type;
   generating a set of compliance and security outcome dependencies based on the desired service-level outcome, the desired workload outcome, and the desired infrastructure outcome;
   prompting the service user to configure a compliance and security profile;
   prompting the service user to tune the set of compliance and security outcome dependencies to obtain a set of tuned compliance and security outcome dependencies;

updating the default compliance and security outcome definition using the compliance and security profile and the set of tuned compliance and security outcome dependencies;

producing, based on updating the default compliance and security outcome definition, a desired compliance and security outcome definition;

generating a singleton configuration derived from the desired compliance and security outcome definition; and implementing, onto a target infrastructure, the set of desired outcomes using the singleton configuration.

2. The method of claim 1, wherein to identify the outcome type, the method further comprises:

determining, based on an order of overriding priority of an outcome hierarchy, that the desired compliance and security outcome is associated with a highest overriding priority amongst the set of desired outcomes.

3. The method of claim 1, wherein the set of tuned compliance and security outcome dependencies comprises a service-level profile representative of the desired service-level outcome, a workload profile representative of the desired workload outcome, and an infrastructure profile representative of the desired infrastructure outcome.

4. The method of claim 3, wherein the singleton configuration comprises a profile configuration task list for each of the infrastructure profile, the workload profile, the service-level profile, and the compliance and security profile.

5. The method of claim 4, wherein to implement the set of desired outcomes using the singleton configuration, the method further comprises:

implementing a first profile configuration task list associated with the infrastructure profile;

making a determination that the first profile configuration task list has been implemented without issues;

implementing, based on the determination, a second profile configuration task list associated with the workload profile;

making a second determination that the second profile configuration task list has been implemented without issues;

implementing, based on the second determination, a third profile configuration task list associated with the service-level profile;

making a third determination that the third profile configuration task list has been implemented without issues;

implementing, based on the third determination, a fourth profile configuration task list associated with the compliance and security profile; and making a fourth determination that the fourth profile configuration task list has been implemented without issues.

6. The method of claim 5, wherein to implement the first profile configuration task list, the method further comprises:

for each profile configuration task in the first profile configuration task list:

obtaining, as specified in the profile configuration task, task-specific artifact metadata and a set of task attributes;

selecting an artifact based on at least a portion of the task-specific artifact metadata; and implementing the profile configuration task using the artifact and the set of task attributes.

7. The method of claim 3, the method further comprising:

prior to generating the singleton configuration:

obtaining an infrastructure inventory for the target infrastructure;

making a determination that the infrastructure inventory supports the infrastructure profile;

making a second determination, based on the determination, that the infrastructure profile supports the workload profile;

making a third determination, based on the second determination, that the workload profile supports the service-level profile; and making a fourth determination, based on the third determination, that the service-level profile supports the compliance and security profile, wherein the singleton configuration is generated based on the fourth determination.

8. A non-transitory computer readable medium (CRM) comprising computer readable program code, which when executed by a computer processor, enables the computer processor to perform a method for implementing outcome-based compliance and security configurations, the method comprising:

receiving, from a service user, an outcome statement comprising a set of desired outcomes, wherein the set of desired outcomes comprises a desired compliance and security outcome, a desired service-level outcome, a desired workload outcome, and a desired infrastructure outcome;

identifying an outcome type associated with the outcome statement, wherein the outcome type reflects a compliance and security type;

selecting a default compliance and security outcome definition linked to the outcome type;

generating a set of compliance and security outcome dependencies based on the desired service-level outcome, the desired workload outcome, and the desired infrastructure outcome;

prompting the service user to configure a compliance and security profile;

prompting the service user to tune the set of compliance and security outcome dependencies to obtain a set of tuned compliance and security outcome dependencies;

updating the default compliance and security outcome definition using the compliance and security profile and the set of tuned compliance and security outcome dependencies;

producing, based on updating the default compliance and security outcome definition, a desired compliance and security outcome definition;

generating a singleton configuration derived from the desired compliance and security outcome definition; and implementing, onto a target infrastructure, the set of desired outcomes using the singleton configuration.

9. The non-transitory CRM of claim 8, wherein to identify the outcome type, the method further comprises:

determining, based on an order of overriding priority of an outcome hierarchy, that the desired compliance and security outcome is associated with a highest overriding priority amongst the set of desired outcomes.

10. The non-transitory CRM of claim 8, wherein the set of tuned compliance and security outcome dependencies comprises a service-level profile representative of the desired service-level outcome, a workload profile representative of the desired workload outcome, and an infrastructure profile representative of the desired infrastructure outcome.

11. The non-transitory CRM of claim 10, wherein the singleton configuration comprises a profile configuration task list for each of the infrastructure profile, the workload profile, the service-level profile, and the compliance and security profile.

12. The non-transitory CRM of claim 11, wherein to implement the set of desired outcomes using the singleton configuration, the method further comprises:
   implementing a first profile configuration task list associated with the infrastructure profile;
   making a determination that the first profile configuration task list has been implemented without issues;
   implementing, based on the determination, a second profile configuration task list associated with the workload profile;
   making a second determination that the second profile configuration task list has been implemented without issues;
   implementing, based on the second determination, a third profile configuration task list associated with the service-level profile;
   making a third determination that the third profile configuration task list has been implemented without issues;
   implementing, based on the third determination, a fourth profile configuration task list associated with the compliance and security profile; and
   making a fourth determination that the fourth profile configuration task list has been implemented without issues.

13. The non-transitory CRM of claim 12, wherein to implement the first profile configuration task list, the method further comprises:
   for each profile configuration task in the first profile configuration task list:
      obtaining, as specified in the profile configuration task, task-specific artifact metadata and a set of task attributes;
      selecting an artifact based on at least a portion of the task-specific artifact metadata; and
      implementing the profile configuration task using the artifact and the set of task attributes.

14. The non-transitory CRM of claim 10, the method further comprising:
   prior to generating the singleton configuration:
      obtaining an infrastructure inventory for the target infrastructure;
      making a determination that the infrastructure inventory supports the infrastructure profile;
      making a second determination, based on the determination, that the infrastructure profile supports the workload profile;
      making a third determination, based on the second determination, that the workload profile supports the service-level profile; and
      making a fourth determination, based on the third determination, that the service-level profile supports the compliance and security profile,
   wherein the singleton configuration is generated based on the fourth determination.

15. A system, the system comprising:
   a target infrastructure; and
   a singleton configuration service operatively connected to the target infrastructure,
   wherein the singleton configuration service comprises a computer processor programmed to perform a method for implementing outcome-based compliance and security configurations, the method comprising:
      receiving, from a service user, an outcome statement comprising a set of desired outcomes, wherein the set of desired outcomes comprises a desired compliance and security outcome, a desired service-level outcome, a desired workload outcome, and a desired infrastructure outcome;
      identifying an outcome type associated with the outcome statement, wherein the outcome type reflects a compliance and security type;
      selecting a default compliance and security outcome definition linked to the outcome type;
      generating a set of compliance and security outcome dependencies based on the desired service-level outcome, the desired workload outcome, and the desired infrastructure outcome;
      prompting the service user to configure a compliance and security profile;
      prompting the service user to tune the set of compliance and security outcome dependencies to obtain a set of tuned compliance and security outcome dependencies;
      updating the default compliance and security outcome definition using the compliance and security profile and the set of tuned compliance and security outcome dependencies;
      producing, based on updating the default compliance and security outcome definition, a desired compliance and security outcome definition;
      generating a singleton configuration derived from the desired compliance and security outcome definition; and
      implementing, onto the target infrastructure, the set of desired outcomes using the singleton configuration.

16. The system of claim 15, wherein the target infrastructure comprises a bare-metal information technology (IT) environment.

* * * * *